(12) United States Patent
Cuk

(10) Patent No.: US 7,915,874 B1
(45) Date of Patent: Mar. 29, 2011

(54) STEP-DOWN CONVERTER HAVING A RESONANT INDUCTOR, A RESONANT CAPACITOR AND A HYBRID TRANSFORMER

(75) Inventor: Slobodan Cuk, Laguna Niguel, CA (US)

(73) Assignee: Cuks, LLC, Irvine, CA (US)

( * ) Notice: Subject to any disclaimer, the term of this patent is extended or adjusted under 35 U.S.C. 154(b) by 0 days.

(21) Appl. No.: 12/924,743

(22) Filed: Oct. 4, 2010

(51) Int. Cl.
*G05F 1/613* (2006.01)
*G05F 1/00* (2006.01)

(52) U.S. Cl. ........ 323/224; 323/233; 323/293; 323/290; 323/259

(58) Field of Classification Search .................. 323/224, 323/233, 288, 290, 293, 259
See application file for complete search history.

(56) References Cited

U.S. PATENT DOCUMENTS

| | | | |
|---|---|---|---|
| 6,486,642 B1 * | 11/2002 | Qian | 323/259 |
| 6,525,513 B1 * | 2/2003 | Zhao | 323/222 |
| 7,215,101 B2 * | 5/2007 | Chang | 323/224 |

* cited by examiner

*Primary Examiner* — Shawn Riley

(57) ABSTRACT

Unlike buck converter and tapped-inductor buck converters, which use only inductive energy transfer, the present invention employs the capacitive energy transfer in addition to inductive energy transfer. The hybrid transformer performs the double duty simultaneously: transfers the input inductive energy storage to the load through a taped-inductor turns ratio n but also transfers the resonant capacitor discharge current to the load during OFF-time interval amplified by turns ratio m of the hybrid transformer.

Despite the presence of the resonant inductor current during the OFF-time interval, the output voltage is neither dependent on resonant component values nor on the load current as in conventional resonant converters but depends on duty ratio D and turns ratio n of the hybrid transformer. Hence a simple regulation of output voltage is achieved using duty ratio control.

20 Claims, 43 Drawing Sheets

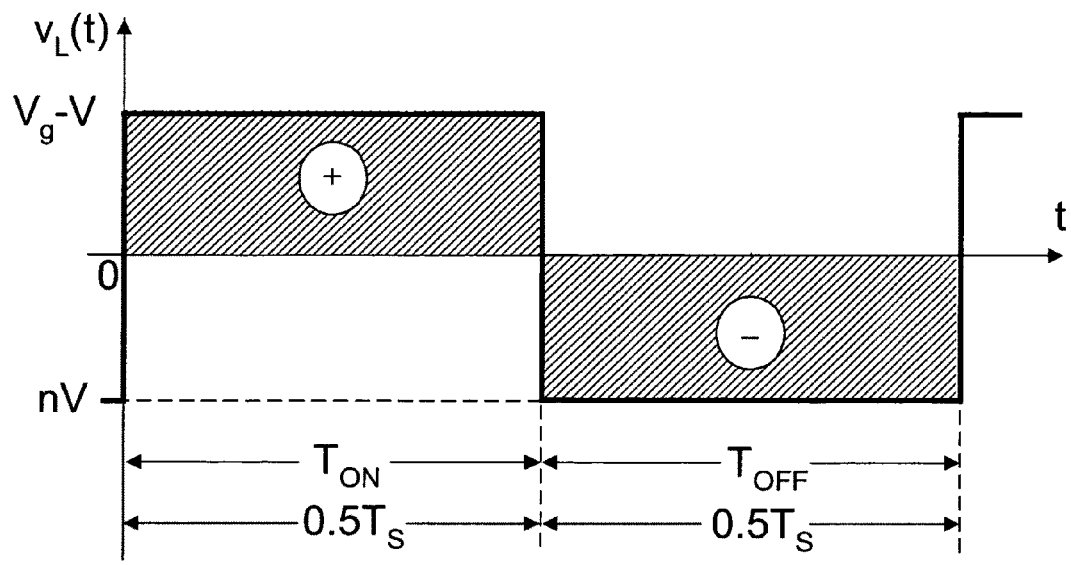
Fig. 4a (Prior-art)
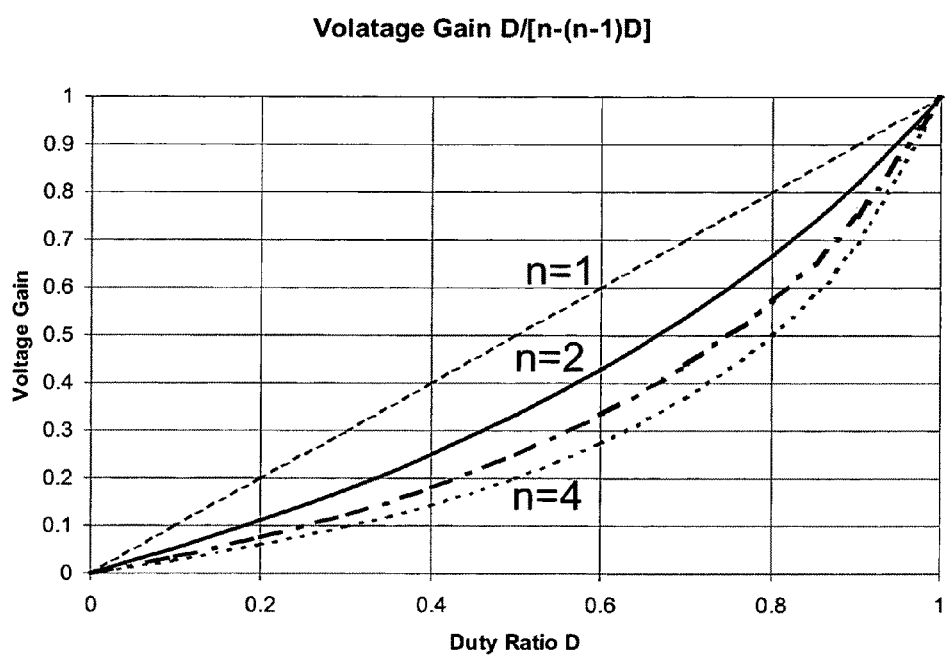
Fig. 4b (Prior-art)

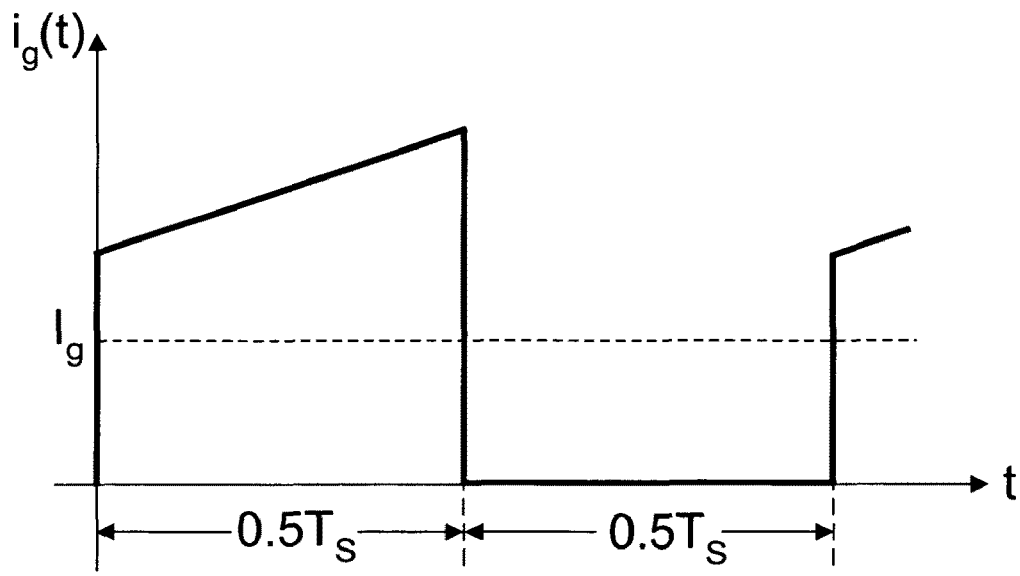
Fig. 5a (Prior-art)
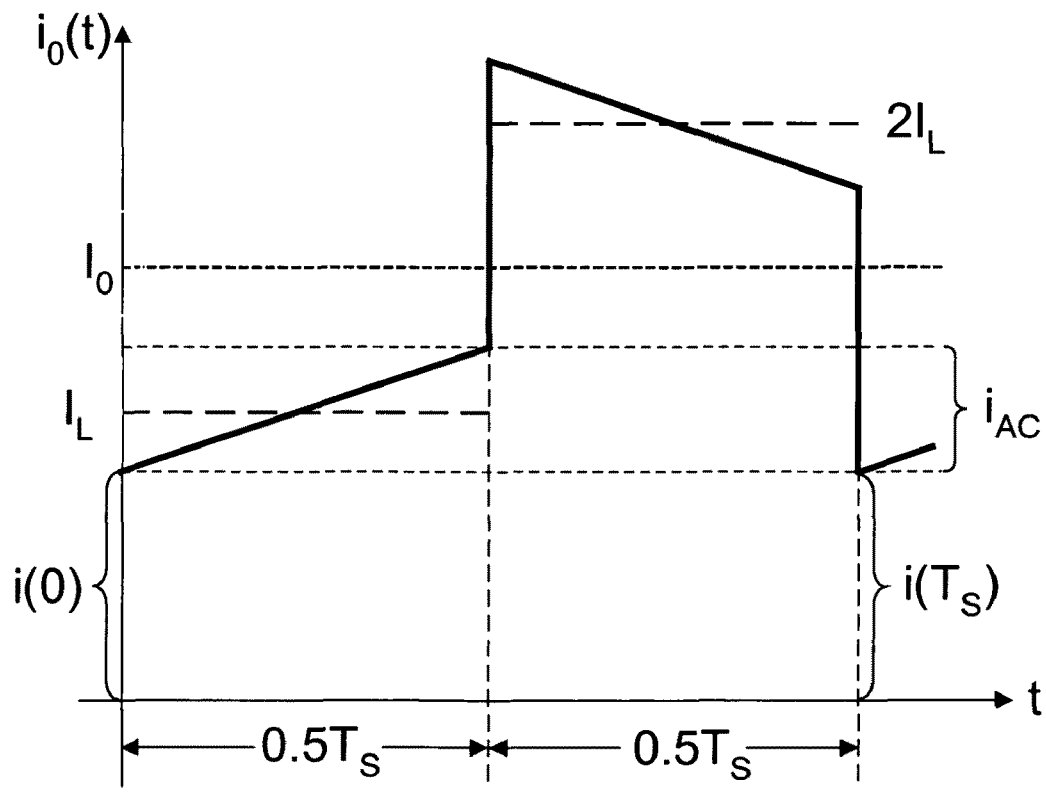
Fig. 5b (Prior-art)

STEP-DOWN CONVERTER HAVING A RESONANT INDUCTOR, A RESONANT CAPACITOR AND A HYBRID TRANSFORMER

FIELD OF THE INVENTION

The non-isolated switching DC-to-DC converters can be broadly divided into three basic categories based on their input to output DC voltage conversion characteristics: a) step-down only (buck converter), step-up only (boost converter) and step-down/step-up such as flyback, SEPIC, and Ćuk converters (1,2). This invention relates to the step-down class of switching DC-to-DC power converters such as buck converter.

Many Point of Load Applications (POL) and Voltage Regulator Modules (VRM's) require a rather large step-down conversion ratios, such as 12:1 or even 24:1 to convert the standard 12V input voltage to 1V or 0.5V output regulated voltage required by the modern microprocessors and other electronic loads. This invention also relates to this particular subset of the step-down converters. However, it is equally applicable to a broader class of other moderate to high step-down voltage conversions.

Classifications of currently known switching converters can also be made based on the type of the voltage and current waveforms exhibited by the switches into three broad categories:

a) Square-wave switched-mode converters in which inductors, transformers and autotransformers are subjected to square-wave like voltage excitations and are volt-second (flux) balanced over the entire switching period (1,2).

b) Resonant converters (sometimes also called true resonant converters) such as series resonant and parallel resonant converters (3) in which a single resonant inductor is inserted into topology of conventional square-wave switched-mode, such as bridge-type converters, and is therefore flux balanced over the entire switching period so that either switch voltages or switch currents are sinusoidal-like over the entire switching cycle with their peak magnitude several times higher than their square-wave equivalent resulting in higher voltage and/or current switch stresses than square-wave converters;

c) Resonant-switch converters, also referred to as multi-resonant converters (4) in which resonant components (resonant inductors and resonant capacitors are added to the switches of the Square-wave converters with the similar increase in the peak voltage and peak currents of the switches and likewise having their resonance's extended over the entire switching cycle (4).

The present invention creates an entirely different new fourth category of the hybrid-switching converters consisting of a resonant inductor and a resonant capacitor forming a resonant circuit for a part of a switching period and a hybrid transformer obeying square-wave switching laws over the entire switching period while the resonant inductor is fully flux balanced during only one part of the switching cycle, either ON-time interval or OFF-time interval. This results in unique three-switch converter topologies as opposed to the two or four switch topologies, which are required in all prior-art converters of the three categories described above. Because of the mixed use of the square-wave switching and unique resonant inductor switching a term hybrid-switching method is proposed for this new switching power conversion method. The resonant capacitor takes a dual role, as it forms a resonant circuit during OFF-time interval with the resonant inductor, while during ON-time interval operates like a capacitive energy storage and transfer device such as, for example, in the Ćuk converter (1,2).

Another classification can be made with respect to number of switches used, such as two, four, six etc. The present Square-Wave Switching or Pulse Width Modulated (PWM) switched-mode power conversion theory (and their resonant modifications described above) a-priori excludes the converter topologies with the odd number of switches, such as 3 switches, 5 switches (5). The PWM switching method is based on the classical square-wave switching characterized by square-wave like current and voltage waveforms of its switches over the entire switching period. The direct consequence is that switches come in complementary pairs: when one switch is closed its complementary switch is open and vice versa. Thus when half of the switches are ON their complementary switches are OFF and vice versa for second OFF-time interval. Thus, the converters are characterized by two distinct switching intervals (ON-time interval and OFF-time interval) and even number of switches, such as 2, 4, 6, and cannot have an odd number of switches, such as 3, 5, etc.

The present invention breaks the new ground by introducing the switching converters featuring three switches, which results in hybrid switched-mode power conversion method and very high conversion efficiency.

The present invention also breaks another new ground by having a resonant inductor placed in series with the active switch in direct violation of the heretofore fundamental assumption that such connection is not permissible as leading to large voltage over-stresses on those switches (5).

The present invention also breaks anther new ground by using a hybrid transformer in a dual role of transferring inductive and capacitive energy storage through it. Present modifications of the buck converter such as tapped-inductor buck use tapped inductor but no separate resonant inductor.

OBJECTIVES

The main objective is to provide an alternative to the present buck converter and tapped inductor buck converter to provide the converter with large step-down conversion ratios needed, such as 24:1 and achieve that with much improved efficiency while providing simultaneously magnetic size reductions and a fast transient response. This is achieved by providing step-down converter with a hybrid transformer, which in addition to inductive energy transfer of tapped-inductor buck converter, provides a simultaneous transfer of the resonant capacitor discharge current to the load via same two winding magnetic structure but now operating as a true ac transformer, hence the proposed name hybrid transformer. Both energy transfer mechanisms provide the increased total power to the load thereby increasing efficiency and simultaneously reducing the size and weight.

Although one of the main applications of the present invention is for the large step-down (12:1) and low output voltages such as 1V, the same advantages described are also applicable to other output voltages and moderate step-down conversion ratios such as 48V to 12V and 15V to 5V conversion.

DEFINITIONS AND CLASSIFICATIONS

The following notation is consistently used throughout this text in order to facilitate easier delineation between various quantities:

1. DC—Shorthand notation historically referring to Direct Current but by now has acquired wider meaning and refers generically to circuits with DC quantities;

2. AC—Shorthand notation historically referring to Alternating Current but by now has acquired wider meaning and refers to all Alternating electrical quantities (current and voltage);
3. $i_1$, $v_2$—The instantaneous time domain quantities are marked with lower case letters, such as $i_1$ and $v_2$ for current and voltage;
4. $I_1$, $V_2$—The DC components of the instantaneous periodic time domain quantities are designated with corresponding capital letters, such as $I_1$ and $V_2$;
5. $\Delta v_r$—The AC ripple voltage on resonant capacitor $C_r$;
6. $\Delta v$—The AC ripple voltage on output capacitor C;
7. $f_S$—Switching frequency of converter;
8. $T_S$—Switching period of converter inversely proportional to switching frequency $f_S$;
9. $S_1$, $S_1$ and $S_3$ switches—switch $S_1$ operates in complementary way to switches $S_2$ and $S_3$: when $S_1$ is closed, $S_1$ and $S_3$ are open, and vice versa.
10. $T_{ON}$—ON-time interval $T_{ON}=DT_S$ during which switch $S_1$ is turned-ON;
11. $T_{OFF}$—OFF-time interval $T_{OFF}=D'T_S$ during which switch $S_1$ is turned OFF and switch $S_2$ turned ON;
12. D—Duty ratio of the main controlling switch $S_1$.
13. D'—Complementary duty ratio D'=1-D of the switch $S_1$.
14. $f_r$—Resonant frequency defined by resonant inductor $L_r$ and resonant capacitor $C_r$;
15. $T_r$—Resonant period defined as $T_r=1/f_r$;
16. CR—two terminal Current Rectifier whose ON and OFF states depend on switch states of controlling switch $S_1$.
17. $L_r$—Resonant inductor obeying resonant switching laws.
18. $C_r$—Resonant capacitor obeying both resonant switching laws for OFF-time interval and square wave PWM switching laws for ON-time interval.
19. HT—Hybrid transformer obeying PWM square-wave switching laws.
20. $N_1$—primary number of turns of the hybrid transformer;
21. $N_2$—secondary number of turns of the hybrid transformer.
22. N—sum of the primary turns $N_1$ and secondary turns $N_2$ of the hybrid transformer.
22. $n=N/N_2$ is voltage conversion ratio of hybrid transformer and also voltage conversion ratio of the tapped-inductor buck converter.
23. $m=N_1/N_2$ is current conversion ratio of the hybrid transformer during the OFF-time interval.

BRIEF DESCRIPTION OF THE DRAWINGS

FIG. 3a shows the prior-art tapped-inductor buck converter and FIG. 3b shows the duty ratio control of the converter of FIG. 3a.
FIG. 4a shows the voltage waveform on the primary side of the tapped-inductor buck converter in FIG. 3a and FIG. 4b shows the family of the DC voltage gains for different turns ratio n of tapped-inductor in FIG. 3a.
FIG. 5a illustrates the input current of the converter in FIG. 3a for $N_1=N_2$ and FIG. 5b shows the output current of the converter in FIG. 3a for $N_1=N_2$.
FIG. 6a shows a first embodiment of the present invention and FIG. 6b shows the state of the two controllable switches for the converter of FIG. 6a.
FIG. 12a shows the predicted half-wave sinusoidal resonant inductor current for the converter of FIG. 6a and FIG. 12b shows the experimental waveform measurement of the same resonant current in experimental prototype of the converter in FIG. 6a.
FIG. 13a illustrates a voltage waveform across the N turns of the hybrid transformer of the converter in FIG. 6a, and FIG. 13b shows the resonant capacitor voltage of the converter in FIG. 6a and FIG. 13c shows the resonant inductor current $i_r$ of the converter in FIG. 6a.

PRIOR-ART

Prior-Art Buck Converter

Figure 1A:
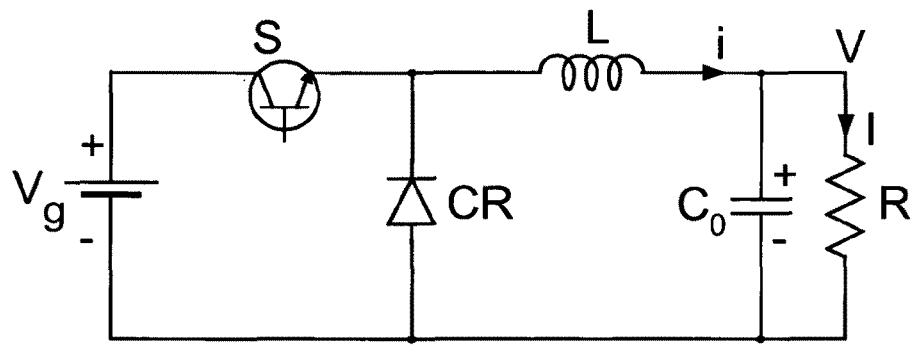
FIG. 1a illustrates a prior-art buck converter.
Figure 1B:
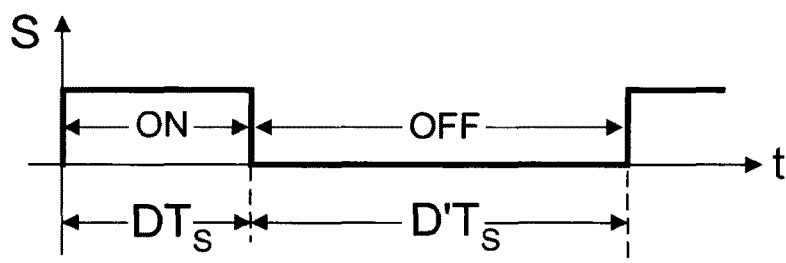
FIG. 1b illustrates the duty ratio control of the switch S of FIG. 1a, and FIG. 1c shows the graph of the DC voltage gain as a function of duty ratio D.

The non-isolated prior-art Pulse Width Modulated (PWM) buck switching converter shown in FIG. 1a consists of two complementary switches: when S is ON, CR is OFF and vice versa (in continuous conduction mode) as shown by the switch states in FIG. 1b. It is capable of step-down only of the input DC voltage dependent of operating duty ratio D, which is the ratio of the ON-time of switch S and switching period $T_S$.

Figure 1C:
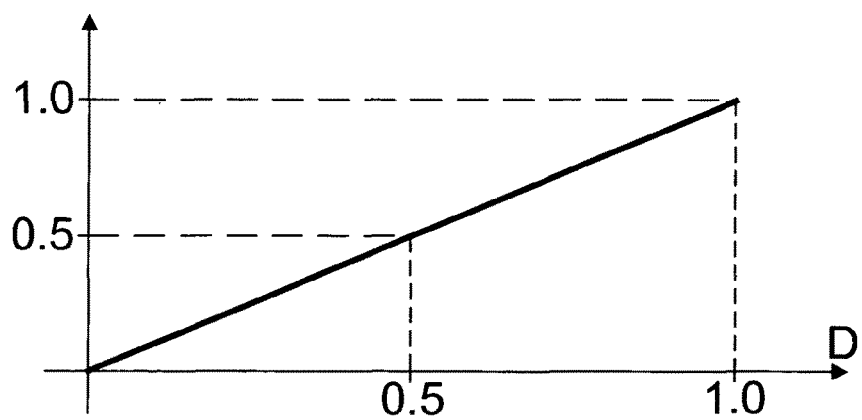

The minimum implementation of semiconductor switches in buck converter is shown on FIG. 1a where switch S is a bipolar transistor and switch CR is a current rectifier. The linear step-down DC gain characteristic of the buck converter as a function of duty ratio D is illustrated in FIG. 1c and given by:

$$V = DV_g \qquad (1)$$

There are three fundamental problems associated with the buck converter when it is required to operate at a large step-down conversion ratios such as 12:1 and 24:1 as needed for modern microprocessors requiring 1V or 0.5V voltage from a 12V input source:
1. Duty ratio is very small at 1/12 for 1V and ultimately 1/24 for 0.5V output. This coupled with typical 1 MHz switching frequencies used in many present converters leaves less than 40 nanoseconds of the ON-time and severally limits its operation. (FIG. 2a)
2. The input switch is turned-OFF at a peak current even higher than the DC load current (FIG. 2a) resulting in high turn-OFF losses of the main input switch S with severe degradation of efficiency.
3. Inductor size is negatively impacted as the inductor operates near maximum ac flux region at point A in FIG. 2b, which illustrates the inductor ac flux reduction with duty ratio increase. For example, if the converter were able to operate at 2/3 duty ratio at point B in FIG. 2b, the inductor ac flux will be reduced 3 times and inductor size proportionally reduced three times.

Some of these problems are addressed in the prior-art tapped-inductor buck converter, but new problems effecting efficiency are introduced as described next.

Prior-Art Tapped-Inductor Buck Converter

Figure 3A:
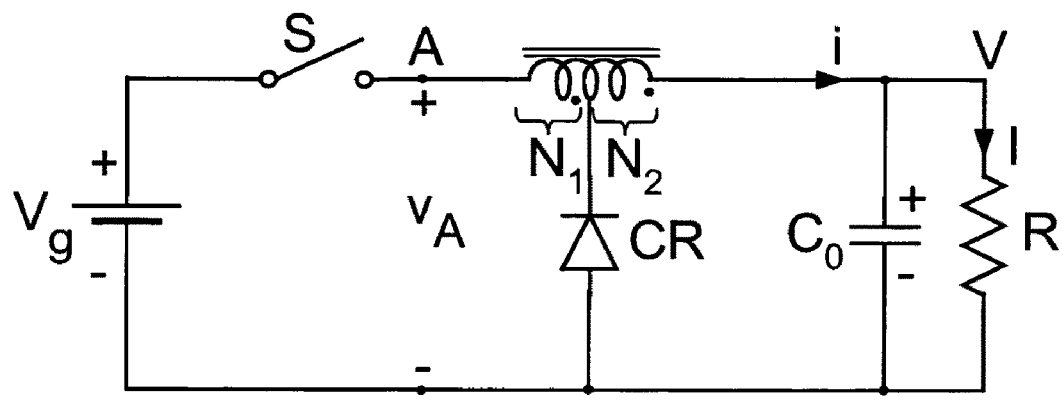
Figure 3B:
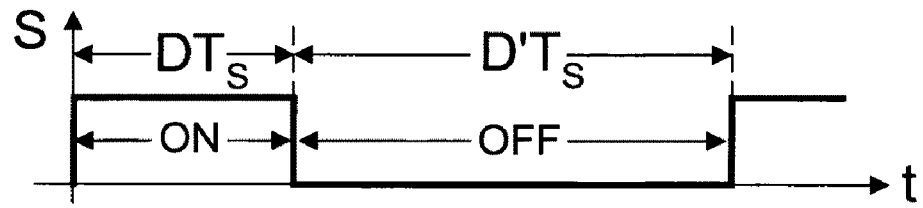

In order to solve the problem of the prior-art buck converter which must operate at 4% duty ratio to achieve the large 24:1 step-down conversion needed, a prior-art tapped-inductor buck converter of FIG. 3a and its duty ratio controlled switch as in FIG. 3b is offered as an alternative.

The following definition of the tapped-inductor in FIG. 3a is made:

Turns $N_1$ and $N_2$ of the tapped-inductor and their dot connections are made with reference to their designations in FIG. 3a so that:

$$N=N_1+N_2 \quad (2)$$

wherein N is an integer number for primary number of turns of the tapped-inductor and $N_2$ is another integer number for number of turns of the secondary of the tapped-inductor. Note that this makes $N_2$ turns common to both primary and secondary windings. Note also when switch S is turned-OFF there is no current in $N_1$ turns and the inductive energy stored in the tapped-inductor magnetizing inductance during ON-time interval is released to the load during OFF-time interval.

In special applications requiring large step-down and low output voltage, the small size of tapped-inductor indicates that the secondary winding turns $N_2$ can be reduced just to one turn:

$$N_2=1 \quad (3)$$

so that the two turns ratios can now be defined:

$$n=N/N_2=N; \quad (4)$$

We will use this turns ratio n as parameters in subsequent analysis and comparisons. However, the turns $N_1$ and $N_2$ will also be invoked at some instances, where the reference is needed to particular windings to refer to the current flowing through them or voltage across them.

The voltage waveform on the primary side of the tapped-inductor with N turns as defined in FIG. 3a and with respect to dot connection is illustrated in FIG. 4a for a general case of tapped-inductor step-down ratio "n". By applying the volt-second balance using voltage waveform in FIG. 4a the DC voltage gain is obtained as follows:

$$V_g DT_S = Vn(1-D)T_S \quad (5)$$

$$M=V/V_g=D/(n-(n-1)D) \quad (6)$$

where M is a DC voltage gain as a function of the duty ratio D and the turns ratio "n". The family of the DC voltage gains for increasing values of integer value "n" from 1, 2, 3, 4 etc. is shown by graphs in FIG. 4b. Note that for n=1, tapped-inductor buck converter reduces to an ordinary single inductor buck (FIG. 1a) and therefore has a usual linear DC gain function shown in dotted line in FIG. 4b.

The tapped-inductor does provide an additional step-down in voltage conversion ratio from primary to secondary winding as per (6), but it also produces at a transition point an unwanted jump in instantaneous current during the transition form ON-time interval to OFF-time interval as seen in waveforms of the input current (FIG. 5a) and the output current (FIG. 5b). Note in particular the 2:1 step-up in the load current at the end of ON-time interval which is obtained for n=2 as illustrated in FIG. 5b for duty ratio D=0.5. Clearly for n=4 there will be a factor of 4 times jump in current. Clearly such an instantaneous jump in current will cause a large spike in the voltage due to the leakage inductance of the tapped-inductor as the current through $N_1$ turns of the primary windings is abruptly interrupted with the no current path provided for that current. This clearly leads to significant losses due to energy stored in that leakage inductance as well a rather large voltage spikes in the waveform of voltage $v_A$ at point A in FIG. 3a.

Finally, note how the turn's ratios greater than 2 contribute only a small incremental additional step-down conversion gain for duty ratios lower than 0.5 (FIG. 4b).

SUMMARY OF THE INVENTION

Figure 6A:
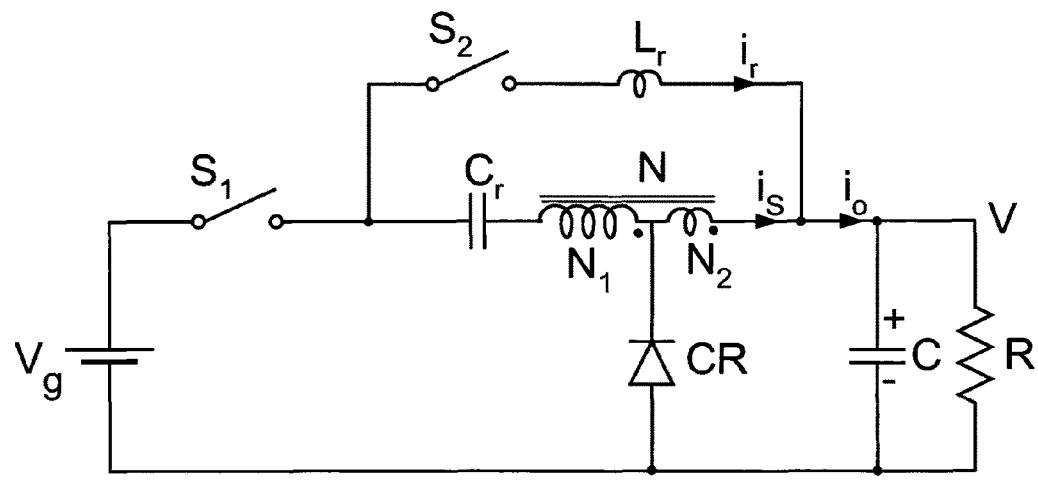
Figure 6B:
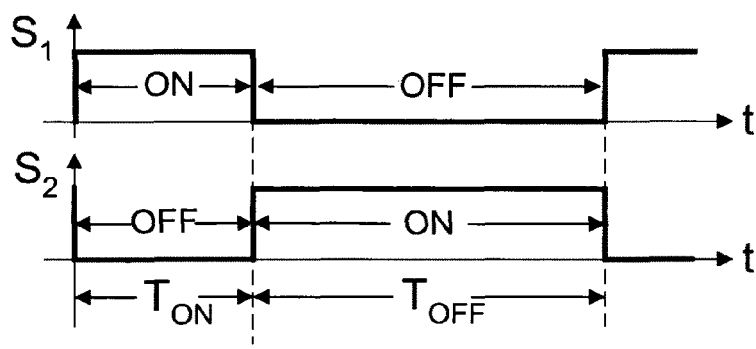

Basic Operation of the Step-down Converter with a Resonant Inductor and a Hybrid Transformer The present invention is shown in FIG. 6a in its basic form with two ideal active switches $S_1$ and $S_2$ operating out of phase as in state-diagram of FIG. 6b and a current rectifier CR connected to the common point between the $N_1$ turns and $N_2$ turns of the hybrid transformer with the direction of magnetic coupling illustrated by the dot markings on the respective windings. A resonant capacitor $C_r$ is connected on one side to the main switch $S_1$ and on the other side to the $N_1$ winding, while the other end of $N_2$ winding is connected to the load. Finally, a resonant inductor $L_r$ is connected on one side to the switch $S_2$ and on the other side to the load. We now introduce another turn's ratio m, the current conversion ratio of the hybrid transformer as:

$$m=N_1/N_2 \quad (7)$$

which has an additional role of amplifying the capacitor resonant discharge current by this turns ratio and deliver it via transformer secondary turns $N_2$ to the load during the OFF-time interval.

Figure 7A:
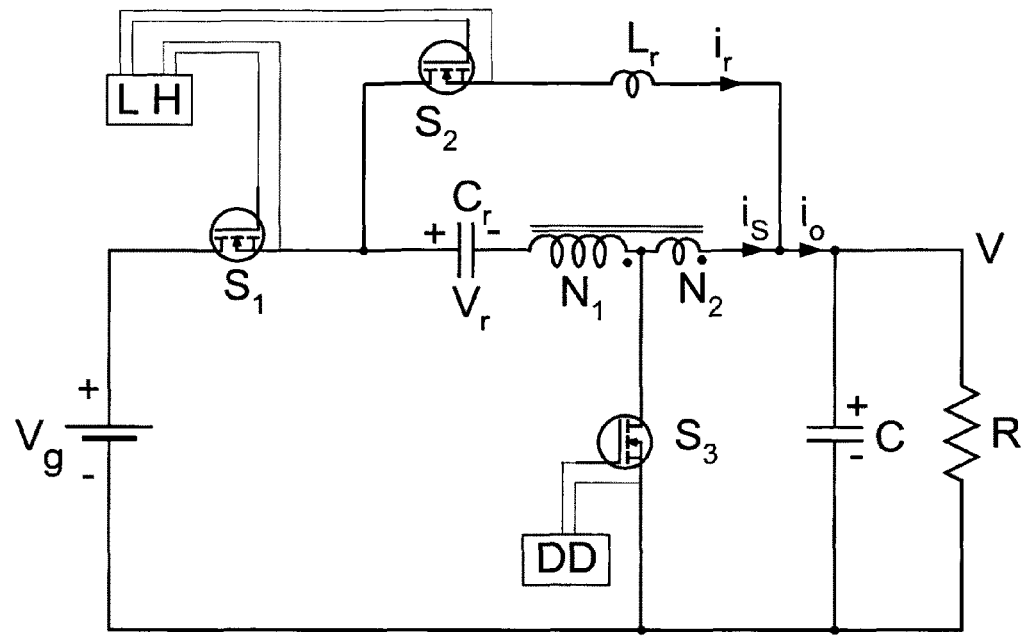
FIG. 7a illustrates an all MOSFET implementation for the three switches of the converter in FIG. 6a and FIG. 7b shows the state of all three switches.
Figure 7B:
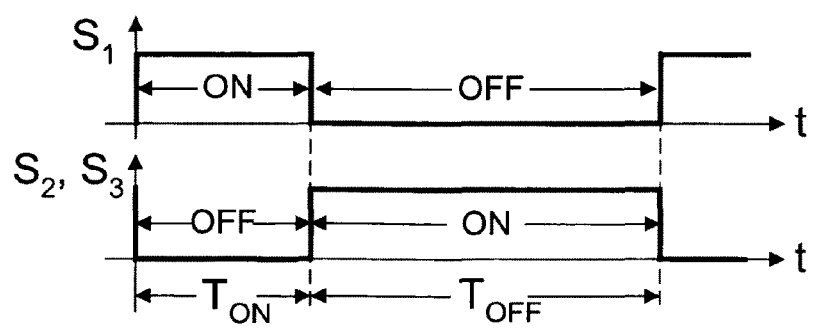

For low voltage applications an all n-channel MOSFET implementation shown in FIG. 7a is desirable in which the current rectifier CR is replaced with the MOSFET switch $S_3$ operated as a synchronous rectifier to reduce conduction losses at low voltage outputs as per state-diagrams shown in FIG. 7b. Note also a convenient Direct-Drive (DD) applied to switch $S_3$ due to its grounded source position. This is of practical importance, as it will be shown later that this switch will have by far the highest rms current of all three switches for large step-down conversion, so that direct drive is an distinct advantage for this switch.

The other two switches $S_1$ and $S_2$ will in comparison have much-reduced rms currents. Note also their desirable connection, so that as seen in FIG. 7a a high side driver LH could be used referenced to the output low voltage of 1V, so that $S_2$ switch is low side switch and $S_1$ switch is considered as a high side switch. As the subsequent analyses will show, the voltage on the resonant inductor Lr is also rather low, so that high side driver could be implemented in a straightforward way. Thus, this already resolves one of the problems of the prior-art tapped-inductor buck converter having the main switch floating and thus requiring isolated or other complex drives schemes.

The switching topology of FIG. 7a features a rather unorthodox configuration consisting of three switches, a resonant capacitor $C_r$ and a resonant inductor $L_r$ together with a hybrid transformer. The state of the three switches is shown in FIG. 7b confirming that the converter operates with just two switching intervals: ON-time interval $T_{ON}$ and OFF-time interval $T_{OFF}$ within a single switching cycle $T_S$.

Such a configuration with three switches is not possible in conventional square-wave PWM and conventional true resonant switching converters (1, 2, 5). However, here it is essential for its operation and is made possible by the new hybrid-switching method, which uses a unique combination of the square-wave switching and resonant switching.

Figure 8A:
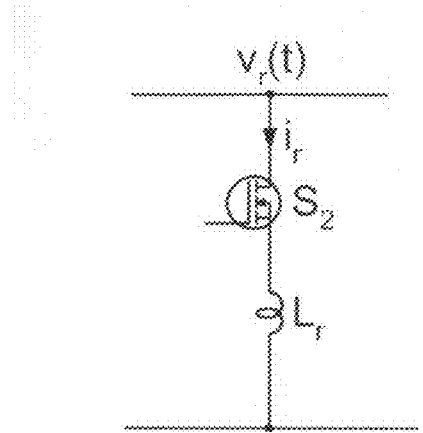
FIG. 8a illustrates a branch comprising a MOSFET transistor in series with an inductor.
Figure 8B:
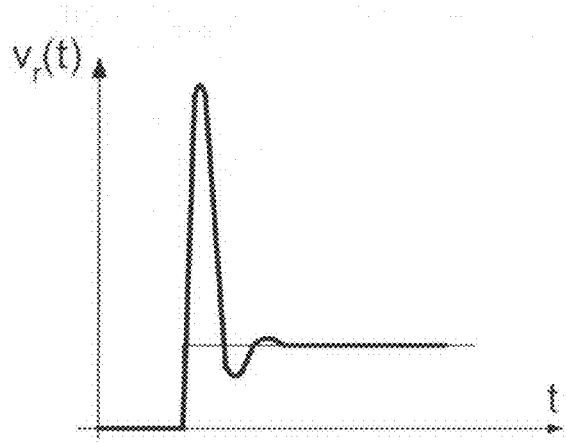
FIG. 8b illustrates the voltage waveforms of the inductor when current through MOSFET transistor in FIG. 8a is suddenly interrupted.

The switching topology of FIG. 7a has another unorthodox feature not possible in prior-art converters. In addition to the hybrid transformer connected to the load, this converter also has a separate resonant inductor $L_r$ connected in the branch with an active switch $S_2$ as illustrated in FIG. 8a. Conventional square-wave converters explicitly forbid such a placement of the inductor for apparently obvious reason: the inductor current cannot be interrupted as it will develop a huge voltage spike across inductor and result in large voltage exceeding rating of the switch and hence in its destruction as illustrated in FIG. 8b. The following detailed analysis will, however, show that the converter topology of the present invention and its operation not only permit such placement of the inductor $L_r$ in switch branch $S_2$ but are also crucial for the operation of the converter and its many advantages.

However, crucial to the understanding of the operation of the present invention of FIG. 6a and FIG. 7a is the understanding of the two windings $N_1$ and $N_2$ coupled magnetically on the common magnetic structure as designated on FIG. 6a and FIG. 7a with the double line for the magnetic coupling. Thus, the different types of magnetic coupling are reviewed first in order to explain the operation of the two winding magnetic structure of the present invention. The different type of two winding magnetic structures will be discussed with reference to the flux density B versus magnetic flux intensity H characteristics as used in different two winding magnetics structures described next.

Two Windings Coupled on the Common Magnetic Core

Although it appears that the two windings coupled on the common magnetic core could have one and only one interpretation, this is not the case as the following analysis of the presently known two winding magnetic structures are reviewed. This will also serve as the definition of the terms, which will be from here on used in describing the magnetic structure used in the present invention.

Transformer and Autotransformers in General

Faraday discovered in 1831 a principle of magnetic induction of two windings and was therefore also the inventor of the transformer used today commonly in utility AC line power transmission. The transformer, as discovered by Faraday, is a magnetic device, which does not store energy, except for the very small fraction of the input current (1% or less) circulating in transformer magnetizing inductance which is needed to establish the magnetic flux in the core and enable instantaneous transfer of the input ac power to output ac power. As there is no energy stored, the magnetic core coupling the two windings is made of high permeability magnetic material and has no air-gap thus resulting in high magnetizing inductance and low magnetizing current.

Such transformer is also capable via winding turns ratio to step-up or step-down the input ac voltage. It also provides a galvanic isolation between primary and secondary windings important for safety protection from the high voltage primary potential. An autotransformer connection can be used when galvanic isolation is not needed in which case the primary and secondary winding have one common terminal. The other terminal of the secondary winding is then provided as a tap on the primary winding. Note that we will for this case reserve the autotransformer name to indicate a magnetic structure with no energy storage.

Figure 8C:
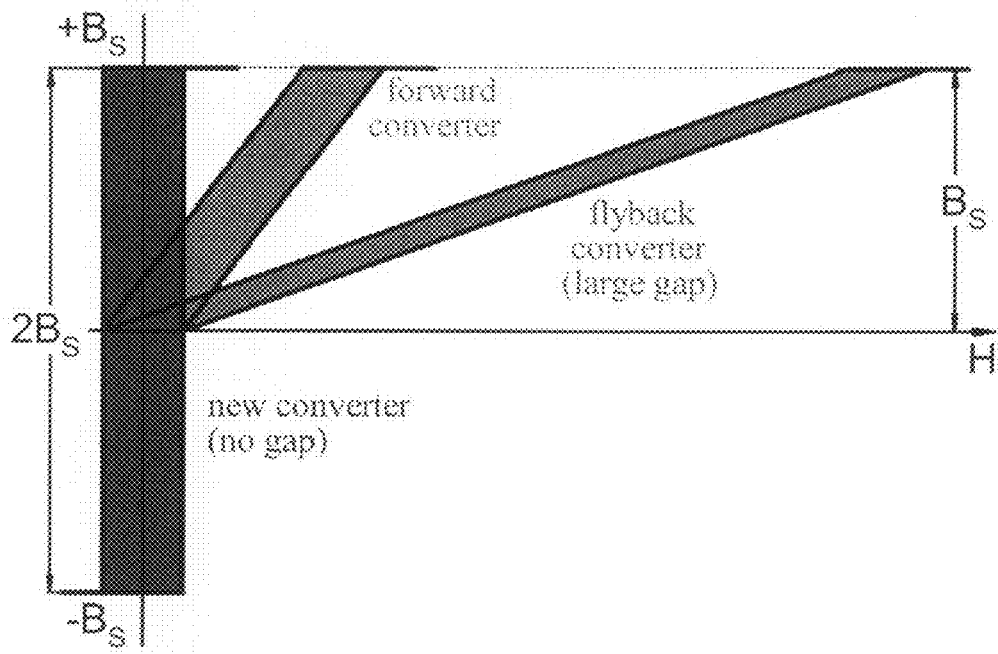
FIG. 8c shows the comparison of the operating BH loops of the transformers used Ćuk converter (marked new converter) and in conventional forward and flyback converters.

Therefore, these true ac transformers and autotransformers operate with bi-directional magnetic flux and corresponding bi-directional magnetic flux density B as shown in FIG. 8c by the BH loop with positive and negative magnetic flux densities.

Transformers as Used in Switching Converters

Ćuk-type Transformer and Bridge-Type Transformers

In switching converters, the transformers with such bi-directional flux capabilities and BH loop also exist, such as the transformer in the Ćuk converter (single ended transformer) which is designated as new converter in the FIG. 8c and the transformers in bridge type converters (bridge-type excited) and therefore these transformers have the attributes of the ac transformers discussed above.

Forward Converter Transformer Type

Another transformer utilized in the well known forward converter also has no DC bias and no stored energy but falls short of the above described ac transformer, as it utilizes only one half of the core flux capability as illustrated in FIG. 8c with BH loop for the forward converter transformer. In this type of the transformer the power is transferred during only one part of the switching period (ON-time) so that the net ampere-turns during ON-time interval are still zero (no energy storage and no air-gap needed in the magnetic core). However, as the magnetizing inductance current flow would be interrupted at the end of ON-time interval, this type of the transformer requires an additional means to reset the core flux to the origin, through a reset winding, which provides the path for the uninterrupted flow of the magnetizing current. Alternatively, a voltage clamp is also used for that purpose.

Flyback Transformer Type

Unfortunately, in switching converters, the magnetic structure used in the flyback converter is also commonly called a transformer, even though it does not meet the fundamental feature of the transformer of not storing the energy. To the contrary, this type of magnetic structure actually stores the inductive energy in the in magnetizing inductance of the transformer during ON-time interval and then releases the stored inductive energy during the subsequent OFF-time interval. Therefore, the magnetic core must have an air-gap to store that energy and prevent the saturation of the core flux due to the DC-bias of the core, as illustrated in FIG. 8c for the flyback type of the "transformer". This flyback "transformer" type has only the galvanic isolation and step-up or step-down feature of the transformer but lacks the fundamental no energy storage feature of the true ac transformer.

Tapped-Inductor Type

We have already seen this tapped-inductor structure in the tapped-inductor buck converter. The tapped-inductor, is in-fact, just a variant of the flyback "transformer" as it also stores all the inductive energy in the magnetizing inductance during ON-time interval and releases it to the load during the OFF-time interval with the only difference being that it lacks the isolation feature since part of the winding is common to both primary and secondary windings. Thus, tapped-inductor could also be designated as a flyback "autotransformer", to signify the lack of isolation feature.

Coupled-Inductor Magnetic Structure

In some switching converters, such as Cuk converter for example (1), the separate inductors have identical AC voltage excitation, so that the inductors could be coupled on the common magnetic core (1) resulting in two switching converter variants: one with the separate inductors and another with coupled-inductors with either converters being operational but with coupled-inductors bringing additional performance benefits. Note, therefore, the key difference with tapped-inductor magnetic structure as used in switching converters. For example, the tapped-inductor buck converter of FIG. 3a could not operate if two separate inductors replace the tapped-inductor.

In most current applications the coupled-inductor structure results in the DC storage of two separate inductors added together resulting in the need for a gapped core. However, it is also possible to find the coupled-inductor structures in which DC ampere turns excitations of the two inductors cancel after magnetic coupling resulting in no DC energy storage and hence in a true ac transformer-like structure with no air-gap needed for storage. Such a transformer despite the DC bias in each separate inductor could be described through coupled inductor equations modeling the ac transformer.

Hybrid Transformer

In the switching converters it is possible to have a two-winding magnetic structure such as the one in the converter of FIG. 6a in which the two types of energy transfers are employed simultaneously such as:
a) Tapped-inductor energy transfer
b) AC transformer energy transfer This is a consequence of the fact that the converter of FIG. 6a employs two separate energy storage and transfer mechanisms:
a) inductive energy storage is transferred from input to output via a tapped-inductor with N primary winding turns and $N_2$ secondary winding turns (turns ratio n) resulting in the inductive energy storage and respective DC-bias as in a tapped-inductor buck converter.
b) capacitive energy discharge of the resonant capacitor $C_r$ during the OFF-time interval and in a transformer-like manner amplifying the capacitor resonant discharge current to secondary of the hybrid transformer by a turns ratio m and delivering it to load. Note also the respective directions of the actual resonant currents in the primary winding (into the dot marked terminal) and secondary winding (out of the dot terminal) which results in the sum of ampere turns of the two windings being equal in magnitude but opposite in sign, hence in net zero ampere turns. This confirms no energy storage for this resonant current transfer through the hybrid transformer.

Clearly, this combined inductive and capacitive energy storage and transfer ultimately result in the energy storage of the hybrid transformer of FIG. 6a and therefore the need to provide the air-gap for the inductive part of the total energy transfer. Clearly, as the capacitive energy transfer did not contribute to the DC bias, but did contribute to the DC load substantially (even 50% of total DC load current load current for some duty ratio), the net DC storage in this converter will be smaller than in the buck converter and tapped-inductor buck converter resulting in smaller size magnetics.

An alternative way to calculate the net DC bias is to observe that the primary winding $N_1$ is DC blocked by resonant capacitor $C_r$ whose charge balance demands that the net DC current flowing into $N_1$ winding is zero, hence no DC bias is generated from the primary $N_1$ winding. Thus, all the DC bias is coming from the secondary $N_2$ turn winding and the respective total current in that winding during the OFF-time interval.

Because the two winding structure operates partly as a tapped-inductor (for inductive current flow) and partly as a transformer (for capacitive discharge resonant current) this two winding structure is designated as a hybrid transformer.

Combined Capacitive and Inductive Storage and Transfer

The converter of FIG. 7a will results in two distinct switching networks, one for ON-time charge interval (FIG. 9a) and another for OFF-time discharge interval (FIG. 9b) so that:
a) Charge interval $T_{ON}$: The source current is during this ON-time interval performing three tasks simultaneously: charging the resonant capacitor $C_r$ and storing capacitive energy on it, storing the inductive energy onto the hybrid transformer and delivering the inductive charging current to the load.
b) Discharge interval $T_{OFF}$: During this interval two discharges take place, inductive discharge of the stored inductive energy in the previous ON-time interval and capacitive discharge of the energy stored during ON-time interval on the resonant capacitor $C_r$.

The energy in previous ON-time interval is during this OFF-time interval being released to the load through two different charge transfer paths as described below.

Figure 9A:
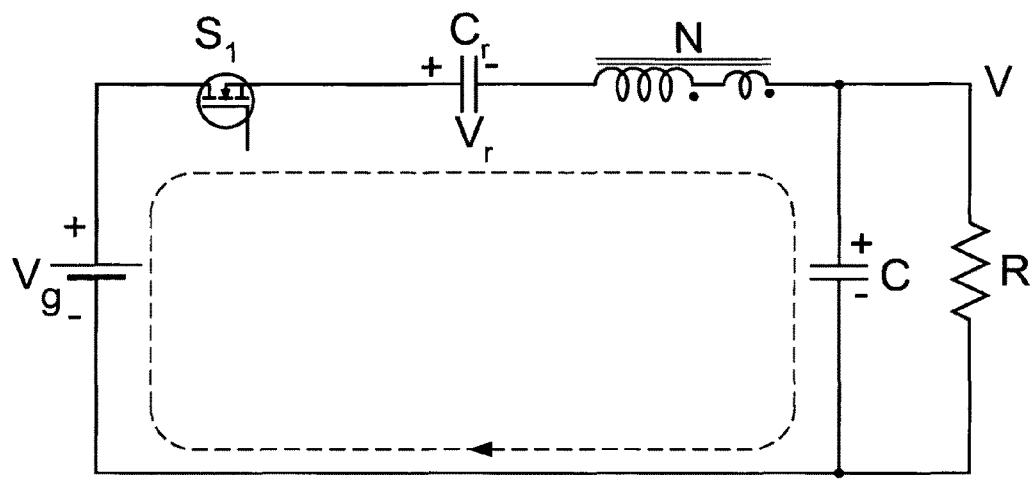
FIG. 9a illustrates a linear switched network for converter of FIG. 6a for ON-time interval DTs and FIG. 9b illustrates the linear switched networks for converter of FIG. 6a for OFF-time interval (1-D)$T_S$.
Figure 9B:
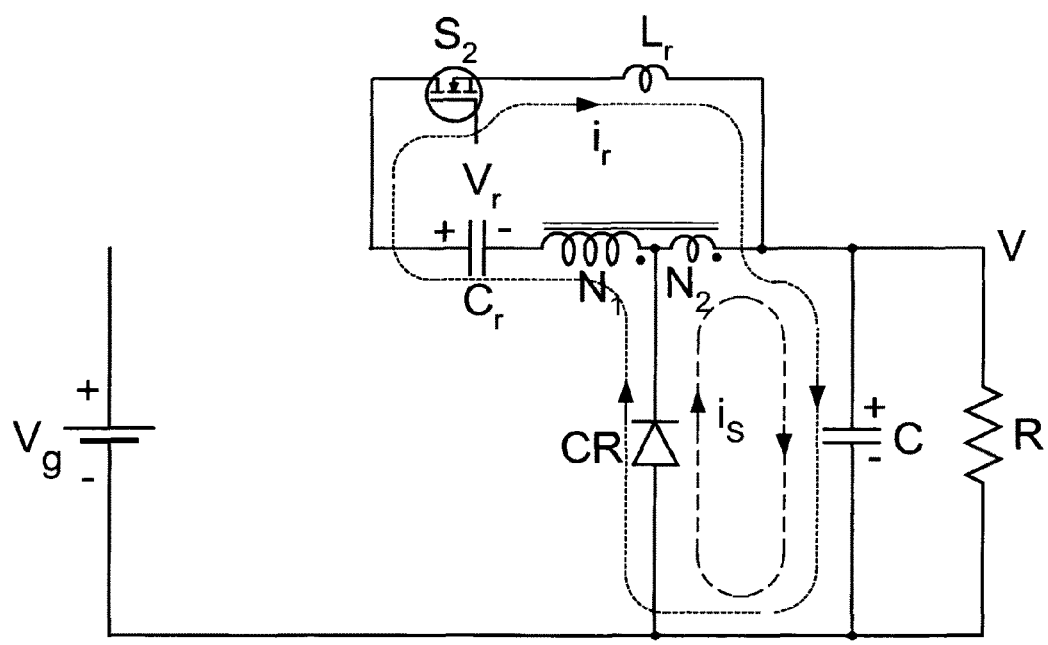
Figure 10A:
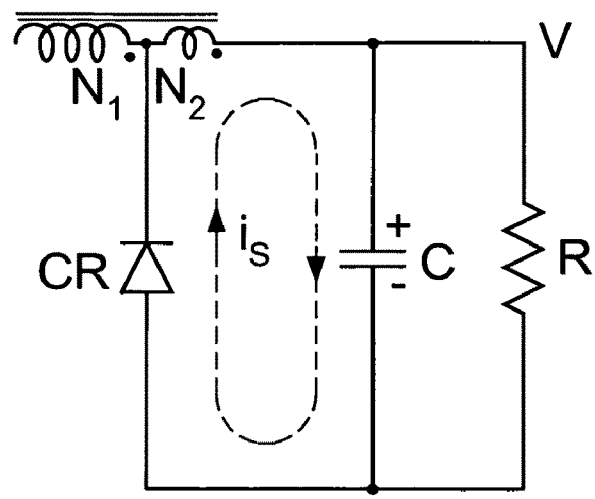
FIG. 10a illustrates one equivalent linear circuit model for linear switched network of FIG. 9b
Figure 10B:
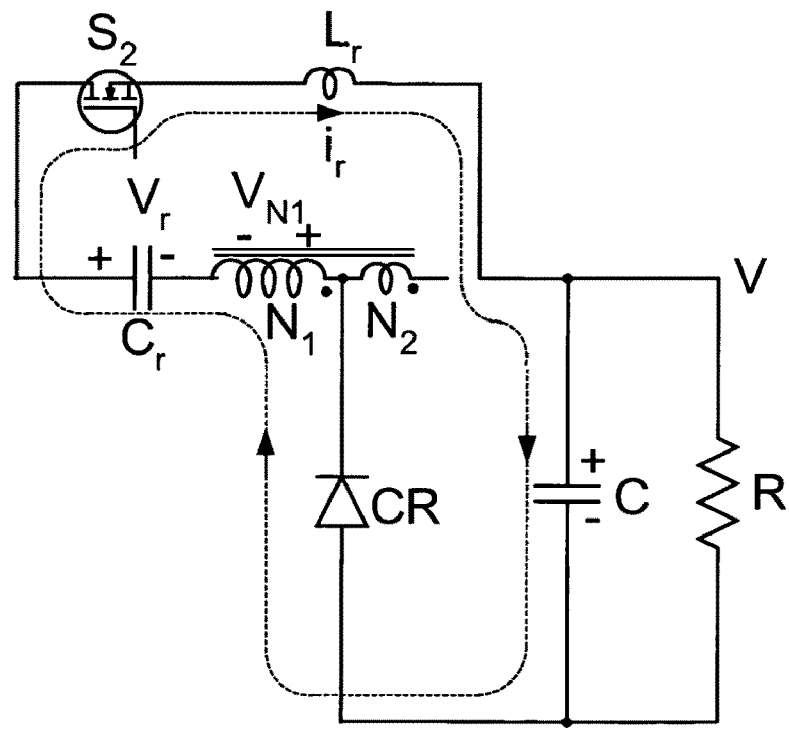
FIG. 10b illustrates the other equivalent linear circuit model for linear switched network of FIG. 9b.

By the principle of linear superposition, the equivalent circuit model for discharge interval of FIG. 9b can, in turn, be broken into two separate equivalent circuit models:
a) Secondary current discharge into the load (FIG. 10a) during which the stored inductive energy and resonant inductor current reflected on the secondary side are both discharged to the load.
b) Resonant current flow inductor current $i_r$ direct discharge into the load (FIG. 10b).

From FIG. 9a during the ON-time interval both tapped-inductor (full primary winding N) and the resonant capacitor $C_r$ are storing the energy from input source and simultaneously providing the same source current to the load.

From FIG. 9b it is apparent how during the OFF-time interval, hybrid transformer is releasing its previously stored energy through its $N_2$ secondary turns to the load. The resonant capacitor $C_r$ discharge also provide a part of the load current due to the connection of the resonant inductor to the load terminal. For example for n=2 and D=0.5, 20% of the load current is provided by this current path and the other 80% of the load current is provided through the transfer via hybrid transformer with 40% of the load contributed by the inductive energy transfer and the other 40% of the load current contributed by the capacitive energy transfer through the hybrid transformer.

This results in the first basic relationship of the present invention, that the output current $i_O$ is the sum of the resonant inductor current $i_r$ and the hybrid transformer secondary current $i_S$, which are designated in FIG. 7a, that is:

$$i_O = i_r + i_S \qquad (8)$$

Therefore, the load current is being supplied with the current during both parts of the switching interval, the ON-time interval and OFF-time interval. The conventional tapped-inductor buck converter supplies the load with the inductive energy storage and transfer only, since there is no capacitive energy storage and transfer. The present invention, on the other hand, supplies to the load an additional current based on the capacitive energy storage and transfer via hybrid transformer action. This results in a fundamentally much more effective power transfer based on combined inductive and capacitive energy storage and transfer working together and in synchronism during two switching subintervals.

The load current during the OFF-time interval $T_{OFF}$ (FIG. 10a) consists of three components:

a) Inductive energy discharge through secondary winding of hybrid transformer.

b) Resonant discharge current of the resonant capacitor amplified by transformer turns ratio m and delivered to the load via hybrid transformer secondary. Note that this part was missing in the tapped-inductor buck converter.

c) Direct contribution of the resonant inductor current to the load. Note that this part is also missing in the tapped-inductor buck converter.

Figure 11A:
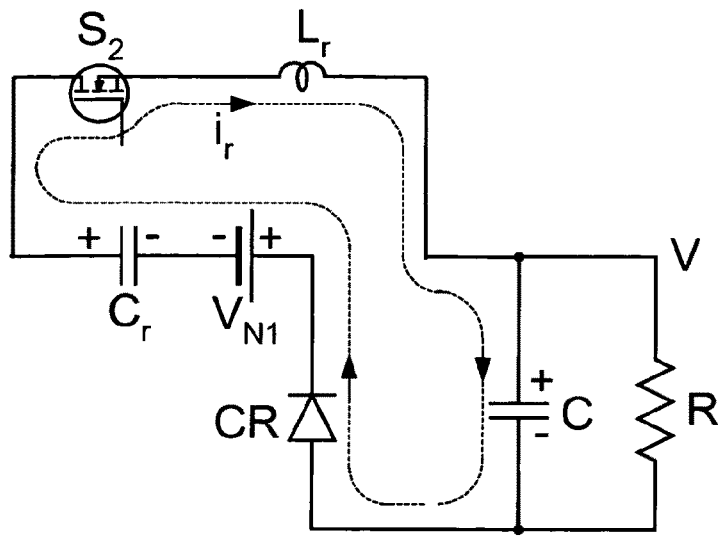
FIG. 11a illustrates simplified circuit model of FIG. 10b in which $N_1$ winding is replaced with a voltage source $V_{N1}$.
Figure 11B:
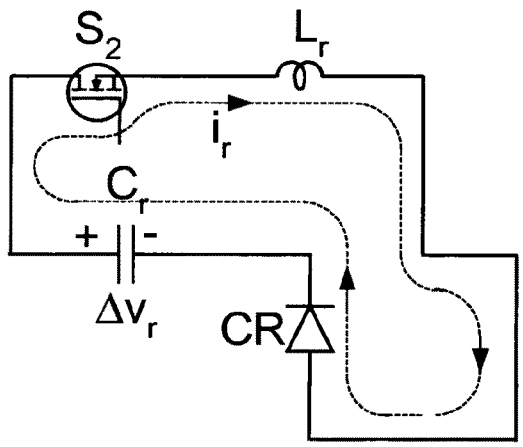
FIG. 11b illustrates an ac circuit model of FIG. 11a in which DC components are eliminated and output capacitor C shorted.
Figure 11C:
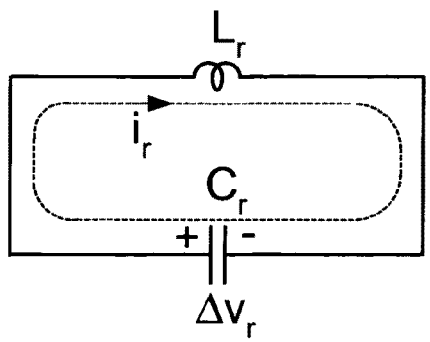
FIG. 11c shows the final linear resonant circuit model of FIG. 10b applicable for OFF-time interval.

We now analyze a series of equivalent circuit models in FIG. 11a, FIG. 11b, and FIG. 11c in order to establish two critical relationships:

a) Steady-state DC voltage $V_r$ on the resonant capacitor $C_r$ which will, in turn, lead to determination of the DC voltage gain M and b) Provide explanation for a unique one-half cycle resonant current flow of the resonant capacitor and resonant inductor current $i_r$.

From the circuit model in FIG. 10b and assuming a 2:1 step-down ratio n=2, the voltage $V_{N1}$ on $N_1$ winding is equal to output DC voltage V ($V_{N1}$=V), hence resulting in a DC voltage source V with respective polarity as in FIG. 11a. The volt-second balance on the resonant inductor $L_i$ during OFF-time interval then requires that $$\int V_{C_r} dt = V_r - 2V = 0 \qquad (9)$$

since the DC voltage across the resonant inductor voltage must be zero, as the resonant inductor cannot support any DC voltage across it and must be fully flux-balanced during this OFF-time interval. From (9) the summation of DC voltages around the loop in FIG. 11a results in a net zero DC voltage and hence in the equivalent circuit model of FIG. 11b in which the resonant capacitor $C_r$ has only a ripple voltage $\Delta v_r$ on it. In this equivalent circuit model the output capacitor C is shorted since it is much larger than the resonant capacitor $C_r$ as per:

$$C \gg C_r \qquad (10)$$

Finally, the switches are replaced with ideal short circuits to result in the final simple series resonant circuit model of FIG. 11c.

Figure 12A:
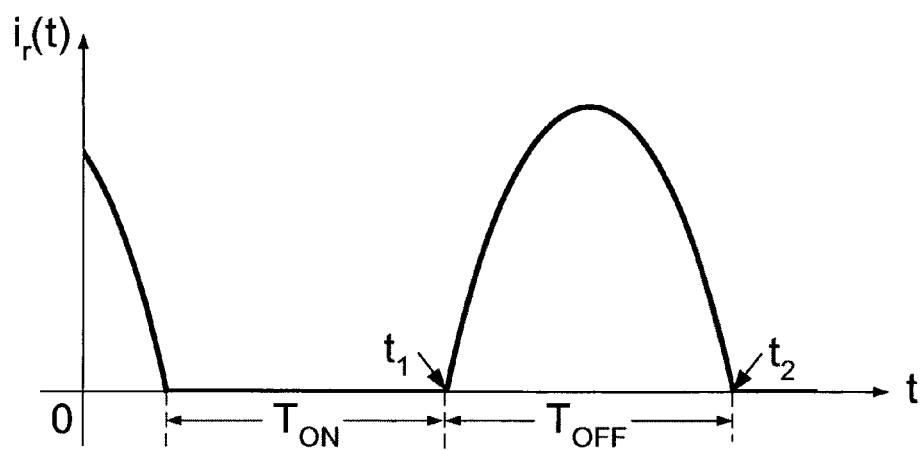

Note that the series connection of the active switch $S_2$ and current rectifier CR is left in the circuit model of FIG. 11b in order to confirm that the resonant current can flow only in one direction, that is, in the direction permitted by the current rectifier CR. Therefore, only a positive half-cycle of the sinusoidal resonant current can flow in the actual converter as illustrated by the theoretical prediction of the resonant current waveform shown in FIG. 12a. Thus, the resonant current must seize to flow at the instant $t_2$ shown in FIG. 12a when half-cycle resonant current reaches zero current level. Because resonant current is a symmetrical sinusoidal waveform, the resonant inductor current $i_r$ must also start at zero current level at the beginning instant at $t_1$ shown also in theoretically predicted resonant current waveform of FIG. 12a. Note, however, that this resonant inductor current is the same as the current of the active switch $S_2$, which, therefore, has a zero current level at the two instances $t_1$ and $t_2$. This now explains, the previously mentioned unorthodox feature of the converter in allowing an inductor to be placed in series with the active switch branch, here $S_2$ switch, discussed earlier with respect to FIG. 8a. The undesirable high voltage spikes of FIG. 8b are prevented since the energy stored on resonant inductor is at the switching instances depleted to zero. This also leads to a very desirable characteristic of the switch $S_2$ that it turns OFF and turns ON at zero current levels. However, it will be also shown in later section that this switch $S_2$ can actually be turned-OFF even before the end of resonant current flow, without any harm to converter operation.

Figure 12B:
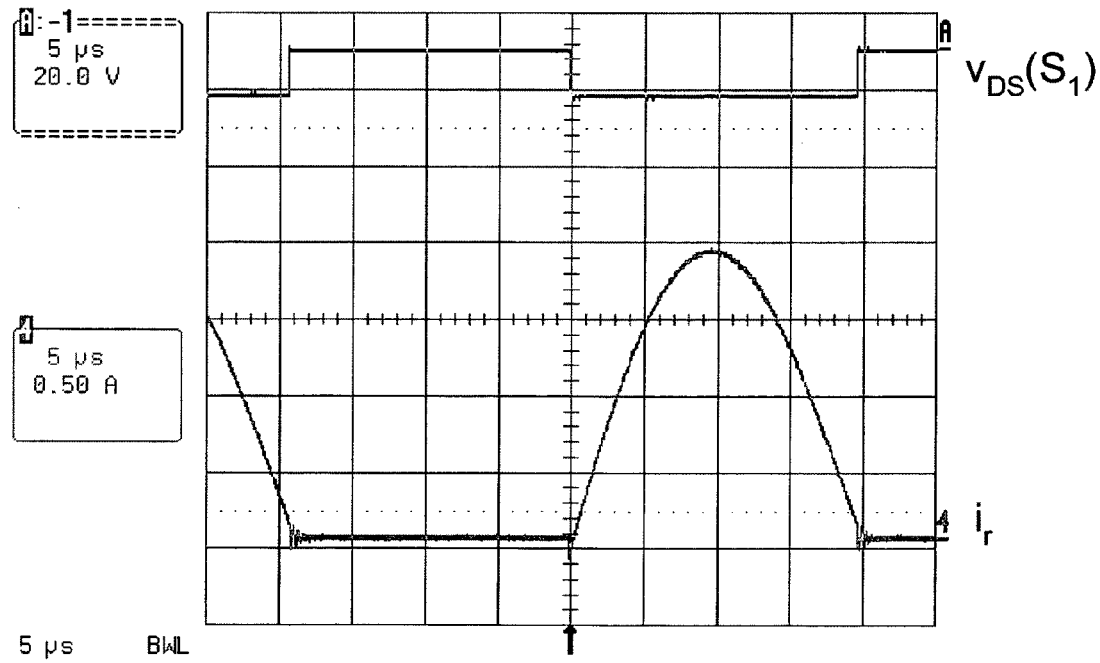

This key feature of the present invention is experimentally confirmed with the resonant current $i_r$ measurement displayed in FIG. 12b showing one half-cycle resonant current and the respective zero current crossings.

The switch turn-OFF losses are often the major switching losses, Thus, one of the desirable design constraints placed initially is to have the OFF-time interval $T_{OFF}$ equal to half-time resonant interval $T_{rh}$, that is:

$$T_{OFF} = T_{rh} = T_R/2 \qquad (11)$$

where $T_r$ is the resonant period given by:

$$T_r = 1/f_r \qquad (12)$$

and $f_r$ is the resonant frequency. This will result in variable switching frequency of operation. However, we will show later that this condition can be relaxed as the switch $S_2$ can, in fact, be turned OFF before or after that zero current switching instance $t_2$ without unwanted consequences so that the simpler constant switching frequency and variable duty ratio D control of output voltage could also be implemented.

The New Hybrid-Switching Method

Figure 13A:
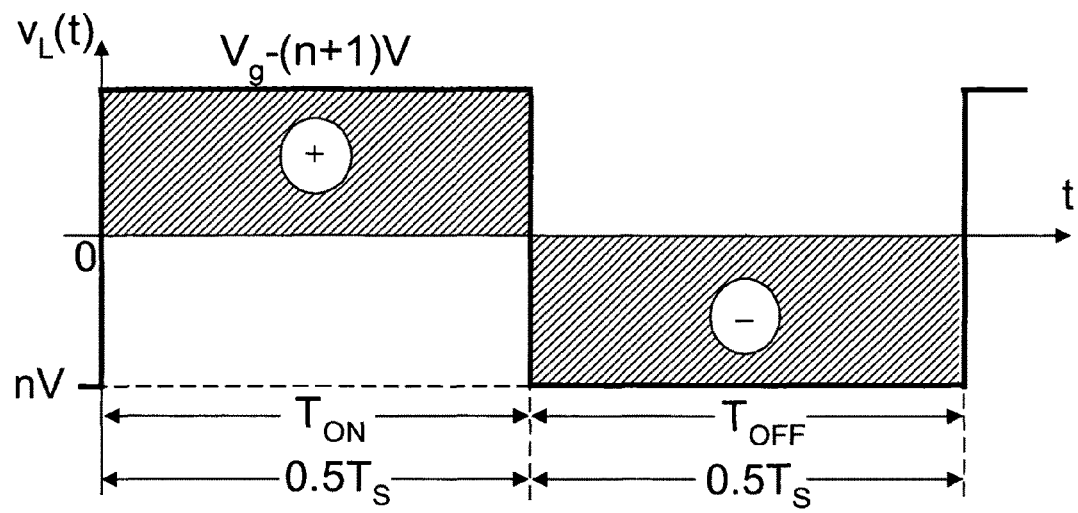
Figure 13B:
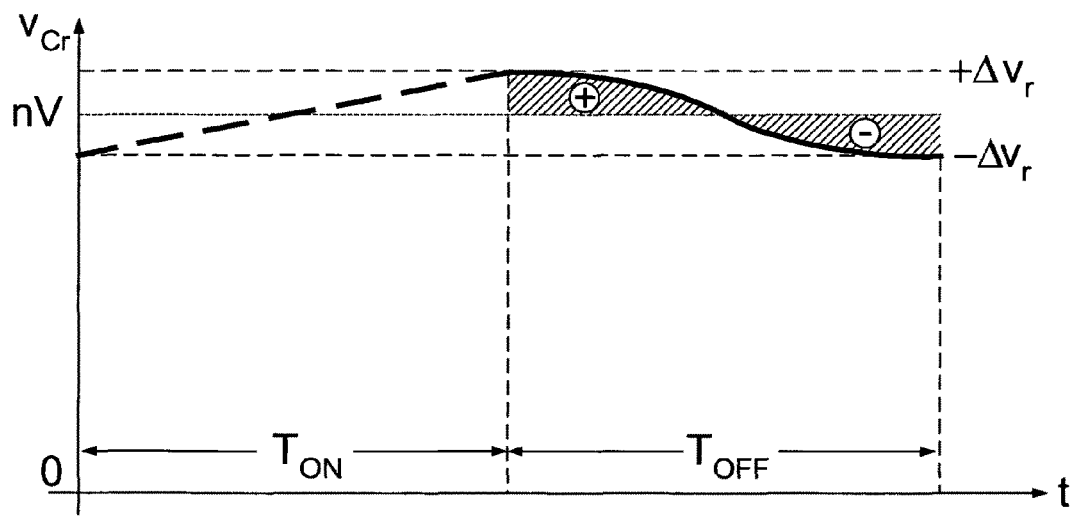
Figure 13C:
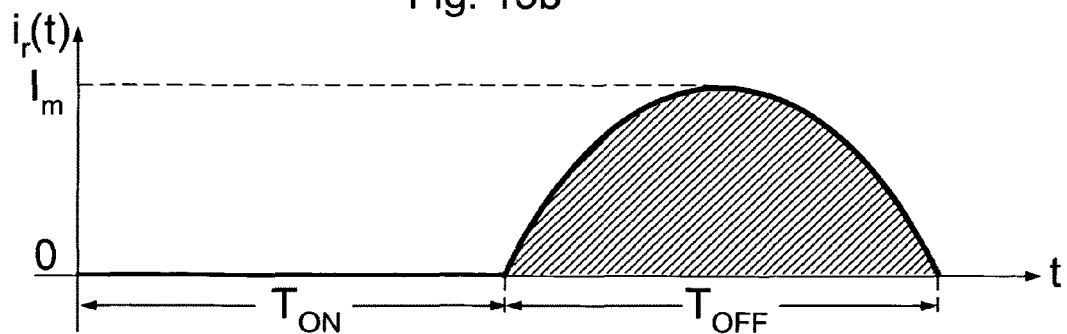

The new hybrid-switching method can now be explained with the reference to FIG. 13a, FIG. 13b and FIG. 13c. From (9) and the circuit model in FIG. 9a the voltage waveform on the total winding (across both $N_1$ and $N_2$ windings combined) of the hybrid transformer can be deduced as in FIG. 13a to have a typical waveform associated with the square-wave switching of conventional square-wave PWM converters in which volt second balance on inductors and transformers extend over the full switching period $T_S$. However, the other magnetic component, the resonant inductor $L_r$ is fully flux-balanced during the turn-OFF time interval $T_{OFF}$ only, as seen by the ac ripple voltage on the resonant capacitor $C_r$ displayed in FIG. 13b by the shaded area representing co-sinusoidal ac voltage ripple variation, as the analytical model in later section will confirm.

Finally, the half-sinusoidal resonant inductor current $i_r$ is shown in FIG. 13c during same OFF-time interval. Thus, the OFF-time interval is the interval during which the resonance takes place (per circuit model in FIG. 11c) between the resonant capacitor $C_r$ and resonant inductor L.

Note that the resonant capacitor $C_r$ plays a dual role as the energy storage and energy transfer capacitor as in regular PWM square-wave converters, such as the Ćuk (1,2) and the SEPIC converters (2). However, here capacitor discharge interval is not liner but resonant. For example, during the ON-time interval the resonant capacitor $C_r$ displays the characteristic linearly increasing ac ripple voltage as displayed in FIG. 13b by the dotted lines identical to square-wave switching converters using energy storage and transferring capacitor (1,2). Therefore, the capacitor $C_r$ plays a dual role, that of the regular PWM energy storage and transfer capacitor as in square-wave converters during the ON-time interval when it is charged by a constant current source of the hybrid transformer magnetizing inductance and the resonant discharge role during the OFF-time interval when it is discharged in a resonant fashion by forming a series resonant circuit with the resonant inductor during the OFF-time. The proposed name of hybrid-switching method for this new switching method then reflects this dual nature of the capacitor $C_r$ playing partly a role as in square-wave switching during ON-time interval and resonant role during the OFF-time interval. Clearly, the instantaneous voltage on this capacitor must be continuous at the switching transition resulting in the capacitor ripple voltage at the end of ON-time interval being equal to the ripple voltage at the beginning of the OFF-time interval.

Another characteristic of this hybrid-switching method not present in any other resonant methods is that despite the clear presence of the resonance, the usual dependence of the DC voltage gain M on resonant component values $L_r$ and $C_r$ as well as on the load current is completely absent and the conversion gain M is dependent on duty ratio D only. From the above it is obvious how in this new hybrid-switching conversion method both capacitive and inductive energy storage and transfers are taking place simultaneously in transferring power from the source to the load using both resonant current and square-wave current switching.

Note the marked difference with respect to the energy transfer in the conventional buck converter of FIG. 1a and tapped-inductor buck converter of FIG. 3a in which there is no capacitive energy storage and transfer and resonance, but only inductive energy storage and transfer, which must take the burden for transferring full load current. As the capacitive energy transfer is much more efficient and in addition much more compact than the inductive energy transfer (see Resonant Analysis Section below), one clearly should expect the significant efficiency improvements and size reduction due to use of both capacitive and inductive energy transfer of the hybrid-switching converter of FIG. 6a.

Evaluation of DC Voltage Gain

We now turn to evaluation of the DC voltage gain first. We assume a duty ratio control D of the main switch $S_1$.

Flux Balance on Two Magnetic Components

First the flux balance on the resonant inductor $L_r$ obtained previously for n=2 case can be now generalized for an arbitrary turns ratio n to:

$$\int V_{Cr} dt = V_r - nV = 0 \tag{13}$$

We then apply the second flux balance criteria, the flux balance on the winding N (equality of the shaded areas in FIG. 13a) to obtain:

$$\int V_g D - (n+1)VD = nV(1-D) \tag{14}$$

$$M = D/(n+D) \tag{15}$$

Note a remarkable result (15). Despite the presence of the resonance, owing to the hybrid-switching method described above, the DC voltage gain M is only a function of the duty ratio D and the hybrid transformer turns ratio n and is NOT a function of resonant component values nor the load current I. All other prior-art switching methods employing one or more resonant inductors resulted in the heavy dependence on the resonant component values as well as the DC load current. Therefore, the output voltage of the converter in FIG. 6a can be regulated against both input voltage and load current changes employing the same simplicity of the Pulse Width Modulated (PWM) control via duty ratio D.

Up until now, the resonant converters were intrinsically tied to the control and regulation via changing switching frequency relative to the fixed resonant frequency (which spanned the entire switching cycle) so the conventional resonant converters were a-priori excluded from the regulation via PWM duty ratio control. The present invention actually confirms that PWM duty ratio control is not only possible but also advantageous in this new type of hybrid switching converters employing the resonant currents flowing only during a switching subinterval, such as ON-time interval and not during the entire switching interval as in conventional resonant converter.

Resonant Circuit Analysis

Resonance Equations for OFF-Time Interval

In FIG. 13b and FIG. 13c we already anticipated the salient time domain voltage waveforms on the resonant capacitor $C_r$ as consisting of a DC value $V_r$ and superimposed ripple voltage with linear increase during the ON-time and co-sinusoidal decrease during the OFF-time With the continuous transition between the two intervals with magnitude of the ripple at the transition instant designated as $\Delta v_r$. The actual time domain of resonant inductor current $i_r(t)$ is also anticipated in FIG. 13c.

We now undertake to solve the pertinent resonance equations, which will describe analytically such time domain solutions. The derived analytical results could then be used to calculate the component values needed for optimum operation of the converter.

From the resonant circuit model of FIG. 11c, we can now write the resonant equations:

$$L_r di_r/dt = v_r \tag{16}$$

$$C_r dv_r/dt = -i_r \tag{17}$$

whose solutions are:

$$i_r(t) = I_m \sin \omega_r t \tag{18}$$

$$v_r(t) = R_N I_m \cos \omega_r t \tag{18}$$

where $R_N$ is characteristic impedance, $\omega_r$ is radial resonant frequency, $f_r$ resonant frequency and $T_r$ resonant period given by:

$$R_N = \sqrt{L_r/C_r} \tag{20}$$

$$\omega_r = 1/\sqrt{L_r C_r} \tag{21}$$

$$T_r = 1/f_r = 2\pi\sqrt{L_r C_r} \tag{22}$$

Note the importance of the quantity $T_r$. From the equivalent circuit model in FIG. 11c for the converter of FIG. 6a with current rectifier CR, the resonant current $i_r$ has in its path the transistor and a diode connected in series. Such a combination is acting like a composite voltage bi-directional, current uni-directional switch, which can block the voltage of either polarity but conducts the current only in the diode current direction. As the above analysis revealed the voltage bi-directional feature of this composite switch is needed because the resonant inductor is excited by the AC ripple voltage of the resonant capacitor which by nature is voltage bi-directional, so the switch has to be able to handle it, even though the AC ripple voltage is small in magnitude. This large sinusoidal resonant current $i_r$ will only be able to flow in positive directions, as its negative direction is being prevented by unidirectional current property of the diode. This will stop the sinusoidal resonant current flow at zero current level, and allow only a positive half-cycle of the resonant current to flow as illustrated in FIG. 13c as discussed before.

Resonant Inductor Size

Note from the equivalent circuit model of FIG. 11c that the resonant inductor $L_r$ voltage excitation is determined by a small AC ripple voltage $\Delta v_r$ and not large voltage excitations determined by $V_{Cr}$ as seen in FIG. 13b. Therefore AC flux excursions that resonant inductor $L_r$ is subjected to are much smaller by two orders of magnitude than of the hybrid transformer (FIG. 13a) as seen by the comparison of their respective shaded areas. For example, the voltage excursions applied to resonant inductor $L_r$ are limited to only the AC ripple voltage $\Delta v_r$ which is typically 10 times smaller than DC value (10% relative ripple). This is shown in the time-domain waveform of the resonant capacitor $C_r$ on FIG. 13b. This is required by the continuity that instantaneous capacitor voltage must satisfy at the transition point from ON-time interval to OFF-time interval, so that the voltage at the end of ON-time interval must be equal to the voltage at the beginning of OFF-time interval, resulting in same $\Delta v_r$.

As seen from FIG. 13b, the voltage excitation is not only much smaller (see shaded area) and not even square-wave, but instead co-sinusoidal in shape with magnitude $+\Delta v_r$ at the beginning of the OFF-time interval and $-\Delta v_r$ at the end of OFF-time interval resulting in another factor of four of flux and total flux reduction of 40 times. Therefore, the resonant inductor can be 40 times smaller in size than comparable PWM inductor. This will result in the resonant inductor $L_r$ being much smaller than magnetizing inductance of the hybrid transformer and consequently much smaller in size. Nevertheless, despite its small value and small size, the resonant inductor will conduct the sinusoidal resonant current as illustrated in FIG. 13c whose magnitude $I_m$ can be rather large as it is directly related to the DC load current and the operating duty ratio as the next Resonant Circuit model will reveal.

Resonant Capacitor Size

Resonant capacitor size is also rather small and typically comparable to the size of the resonant inductor. This comes as a result of two facts:
1. Current multiplayer chip capacitor has a rather small footprint size (1210 case size) and large ripple current rating of 3 A per single chip capacitor and 47 µF capacitance with 5V voltage rating. Thus paralleling a number of them raises the total current handling capacity to desired level of tens of Amperes.
2. The resonant capacitor at large steps-down ratio handles only a fraction of the load current, such as 20% or less as will be seen in later comparison examples. Thus, for a 30 A load current only 6 A ripple current capability is needed and two small chip capacitors in parallel will be adequate.

Comparison with Tapped-Inductor Buck Converter

The DC voltage gain M (15) can also be expressed in the following form:

$$M=D/n(1+D/n) \leq D/n \qquad (23)$$

The conversion gain of $M_i$ of a fully isolated transformer (not autotransformer) converter type would be expected to result in conversion gain $M_i$ given by:

$$M_i=D/n \qquad (24)$$

Thus, the voltage gain M of the present invention with hybrid transformer and step-down ratio n results in higher step-down conversion ratio than could be expected of the isolated converter types, such as the conventional forward converter type for example, with conversion gain (24). This is clearly attributed to the presence of the capacitive energy transfer, hybrid resonant switching, and the resonant current contribution to the load as per (9).

Figure 14A:
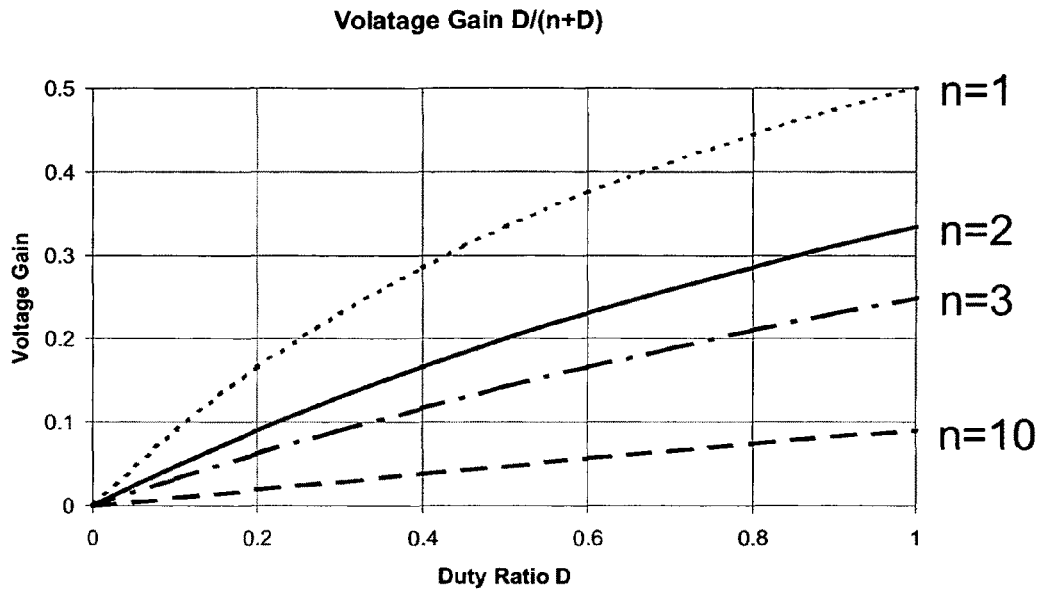
FIG. 14a shows the family of DC voltage gain characteristics for different hybrid transformer turns ratio's n in the converter of FIG. 6a and FIG. 14b compares the DC voltage gains of the converters in FIG. 3a for n=4 and converter in FIG. 6a for n=2.

The family of the DC voltage gains M with turns ratio n as a parameter are displayed in the graphs of FIG. 14a. The family of curves for tapped-inductor buck (FIG. 4b) for increasing turns ratio n go through the same point, gain M=1 for duty ratio D=1 showing a little additional conversion gain for n larger than 2. On the other hand, the family of the curves for the present invention of FIG. 6a have a DC conversion gains M which are for D=1 proportionally reduced thus resulting in much larger additional conversion ratio reduction with increased turns ratio n as seen in graphs of FIG. 14a.

Note also that the case of n=1 reduces hybrid transformer to a single inductor and is shown by the dotted line in FIG. 14a.

From the comparison of two families of curves it is also clear that the present invention provides for the same duty ratios the significantly larger step-down conversion ratios than tapped-inductor buck. For example, for D=0.5 and n=2 the tapped-inductor conversion ratio is 3 while for present invention conversion ratio is 5. At duty ratio D=2/3 and for n=2, the present invention results in four times reduction of the input voltage compared to two times reduction of the tapped-inductor buck, thus a factor of two higher reduction at the same duty ratio and for same turns ratio n=2. Hence 12V input would be reduced to quite low 3V output voltage with present invention while it would result in 6V output with tapped-inductor buck converter. This is clearly attributed to the presence of the capacitive energy transfer and resonance via the hybrid-switching method. Comparison with the ordinary buck converter leads to even larger reduction factor of 8/3=2.67 so 12V would result in 8V output voltage in ordinary buck converter operated at 2/3-duty ratio. Note that 8/3 higher conversion ratios over the buck converter is achieved by addition of only a single turn to make a two winding hybrid transformer compared to a single turn inductor in buck converter. The DC-bias of the buck converter with single turn is actually higher than the DC bias of the hybrid transformer.

Figure 2A:
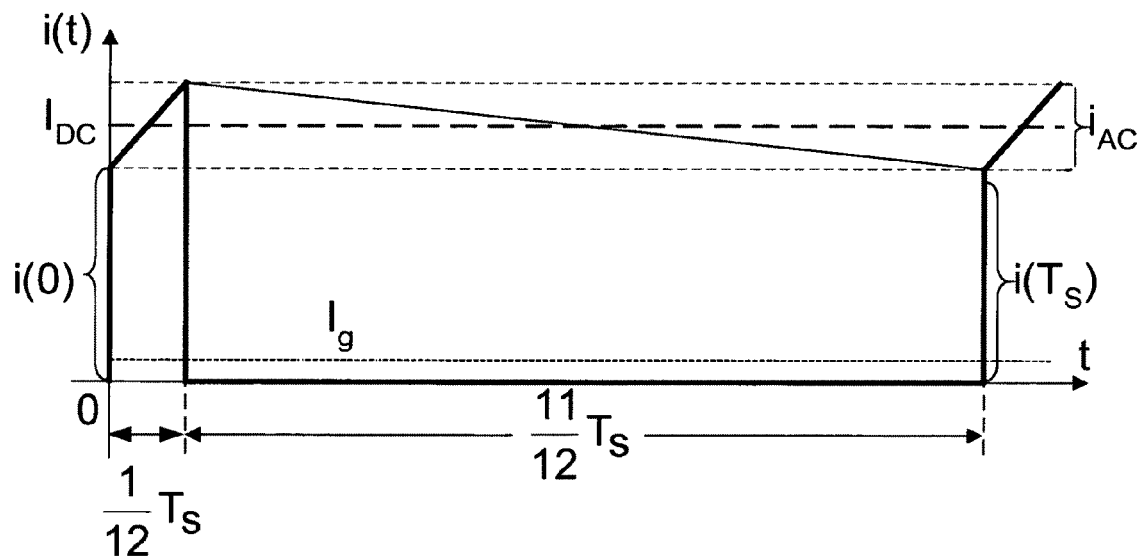
FIG. 2a shows input current of the buck converter in FIG. 1a when operated at large step-down conversion ratio and FIG. 2b shows the ac flux of the inductor in buck converter as a function of duty ratio D.
Figure 2B:
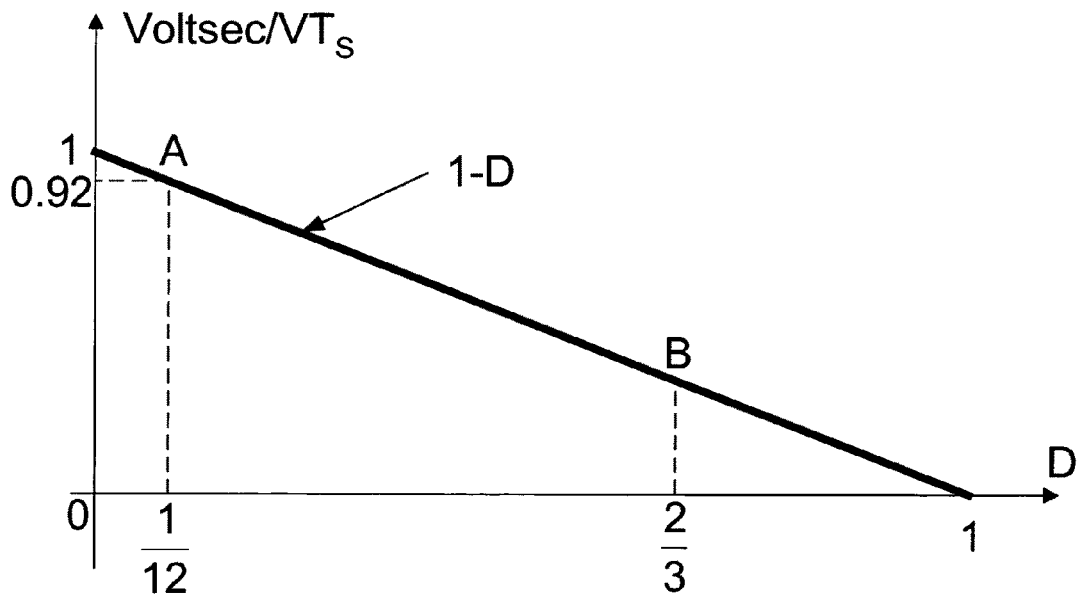

Note also that the operation at higher duty ratios is desirable as it leads directly to the reduction of the ac flux and magnetic size reduction as per graph in FIG. 2b and earlier discussion of the effect of duty ratio operating point on inductor size which now directly translates to corresponding size reduction of the hybrid transformer.

Figure 14B:
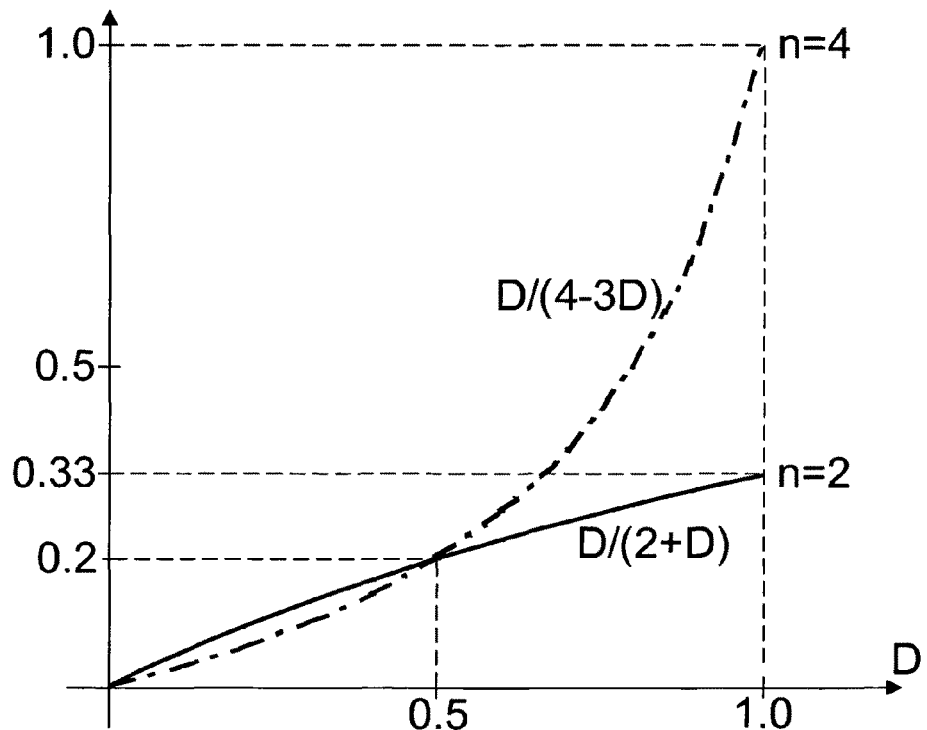

It is now also instructive to compare the operation of the two converter types having the same DC voltage gain at same DC operating duty ratio D point but using the appropriate turns ratios for each case. For example, the present invention with n=2 will result in 5:1 step-down conversion ratio while the tapped-inductor buck converter at duty ratio D=0.5 would need to operate with n=4 as seen at the intersection of the two curves displayed in FIG. 14b at D=0.5. This would clearly result in bigger magnetics sizes and higher magnetic losses of the tapped-inductor buck, due to higher number of turns needed (four instead of two) and corresponding higher DC ampere turns and bigger air-gap needed.

Figure 15A:
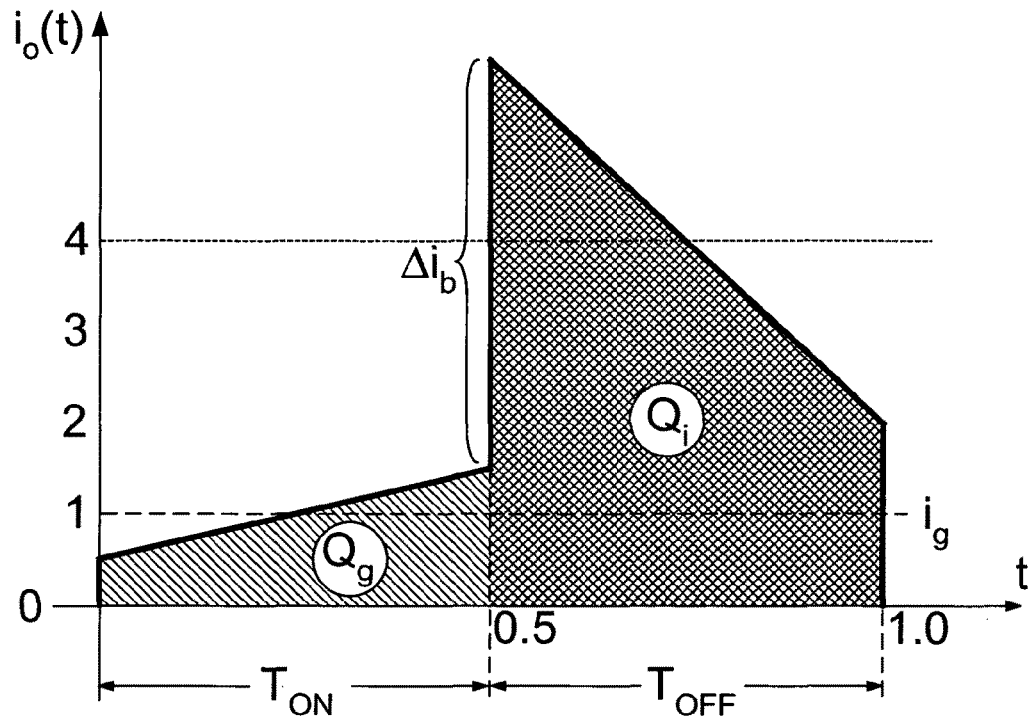
FIG. 15a illustrates the load current of the converter in FIG. 3a for n=4 and FIG. 15b illustrates the load current for the converter in FIG. 6a for n=2.
Figure 15B:
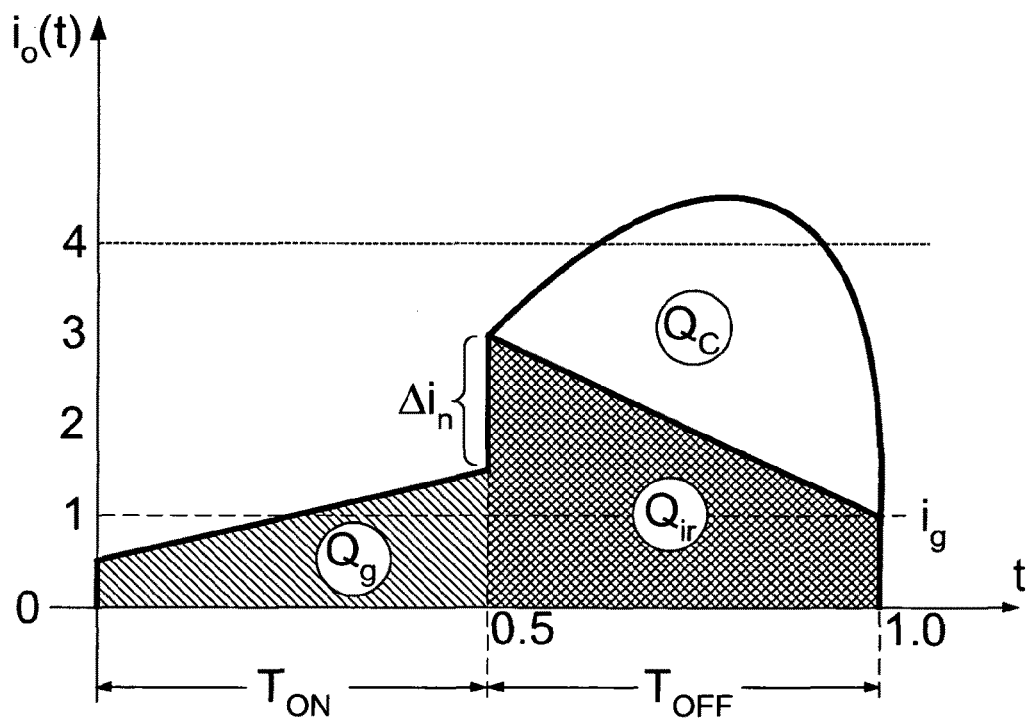

Additional disadvantages are also described here with respect to the comparison of the actual load currents in two cases displayed in FIG. 15a and FIG. 15b. As the present invention has the direct resonant capacitor discharge into the load, its hybrid transformer will have additional reduction of magnetics size due to smaller air-gap needed. Note also that the primary turns $N_1$ in the present invention do NOT contribute any DC-bias as the resonant capacitor current is by definition charge-balanced resulting in no net DC current contribution to the transformer. Thus, the turns $N_1$ could be actually increased as well as turns ratio n without a DC-bias penalty on the hybrid transformer design but with the benefit of increased inductance value and hence much reduced turn-OFF current of the main switch compared to the tapped-inductor buck converter as seen by comparing FIG. 15a and FIG. 15b.

Finally, the tapped-inductor buck converter load current has a much larger step-up at the transition from ON-time to OFF-time interval as seen by comparison of the load currents in two cases displayed in FIG. 15a and FIG. 15b showing three times higher current step-up in equivalent tapped-inductor buck converter. This abrupt change of the current results in the power loss proportional to the current jump due to energy stored in the leakage inductance of the hybrid transformer.

Even with the same leakage inductance, the power loss will be nine times lower in present invention due to square-law dependence on the magnitude of the current step.

Reduction of Turn-OFF Losses of the Main Input Switch

As explained in introduction with reference to FIG. 2a the turn-OFF current in buck converter is equal to the peak load current, resulting in high turn-OFF losses of the input switch of the buck converter, which in fact, are by far dominant losses in the buck converter, especially at very high switching frequency of 1 MHz, since these losses are proportional to frequency. As seen in FIG. 15b the peak turn-OFF current for present invention with 2:1 turns ratio and at 50% duty ratio is four (4) times lower than the peak load current of the buck converter reducing turn-OFF losses of main switch by a factor of 4 or more. With 4:1 turns ratio, such reduction of turn-OFF losses is even more dramatic.

Hybrid Transformer Charge Transfer

Figure 16A:
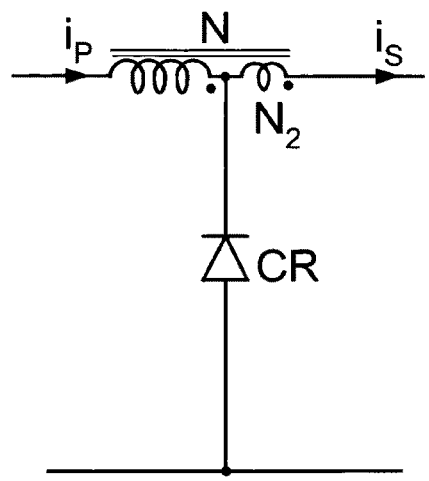
FIG. 16a shows the hybrid transformer for the converter in FIG. 6a, and FIG. 16b shows the primary current of hybrid transformer in FIG. 16a and FIG. 16c shows the secondary current of the hybrid transformer of FIG. 16a displaying the inductive energy storage and transfer only.

We now review the energy transfer from input to output through the hybrid transformer for the special case of n=2 and duty ratio D=0.5 as illustrated in FIG. 16a. The two distinct energy transfers, the inductive and the capacitive energy storage and transfer, are analyzed separately and then their results combined using the principle of superposition.

Figure 16B:
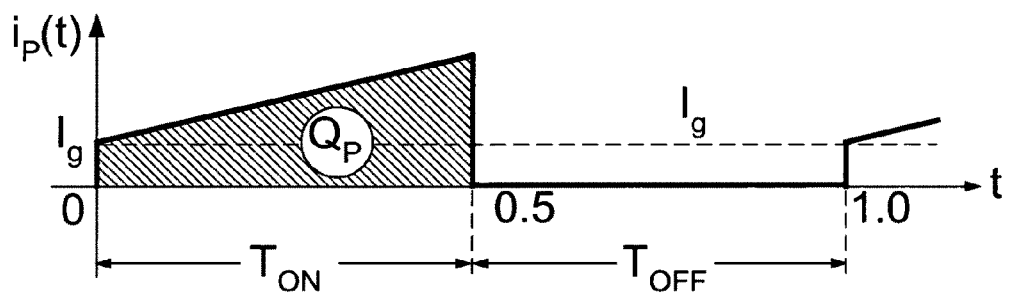
Figure 16C:
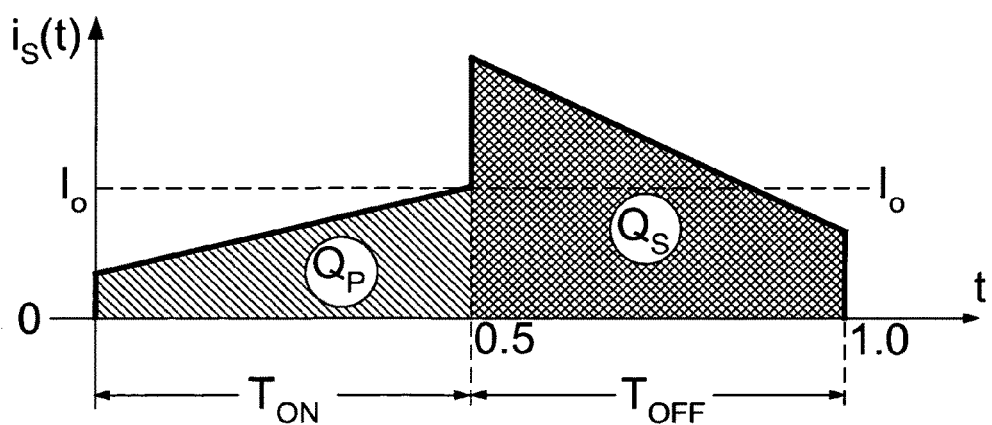

First shown in FIG. 16b and FIG. 16c is the inductive energy storage and transfer trough the tapped-inductor energy transfer with secondary charge designated as $Q_S$ (the cross-shaded area) being twice larger than the primary charge designated as $Q_P$ and shown with single shading lines. This inductive energy storage and transfer is also taking place in the tapped-inductor buck converter. Note that all the DC bias contribution to the hybrid transformer originates from this inductive tapped-inductor energy transfer. Thus, it is now appropriate to calculate this DC bias $I_{DC}$ relative to the DC load current I to get:

$$I_{DC}/I = Mn/D \quad (25)$$

Where M is the DC voltage gain (reduction) and n is turns ratio. Thus, for example, for n=4 and D=0.5, DC gain is M=1/9 and (25) results in 8/9. Thus interesting result is obtained. Despite the large number of turns DC bias in the hybrid transformer of present invention is actually smaller than the DC bias $I_{DC}$ in the single inductor buck converter.

Figure 17A:
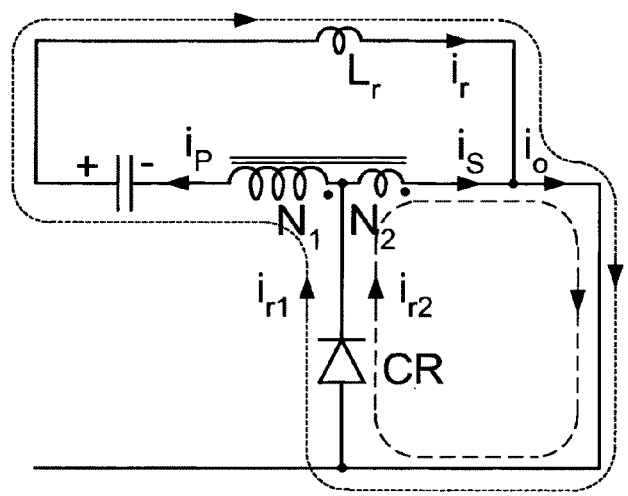
FIG. 17a shows the linear switched network for converter of FIG. 6a for the OFF-time interval $T_{OFF}$.

However, in the present invention, an additional capacitive energy transfer is taking place through the $N_1$ to $N_2$ hybrid transformer as shown in equivalent circuit model of FIG. 17a. Note that this time the $N_1$ winding conducts the resonant current designated as loop current $i_{r1}$ which flows into the dot connection of the primary winding from the current rectifier CR. Unlike the tapped-inductor buck current which has no such current flow and zero contribution during OFF-time interval, this resonant current $i_{r1}$ produces in hybrid transformer secondary winding current $i_{r2}$ flowing out of the dot-marked secondary terminal. Clearly due to respective windings having 1:1 turns ratio as $N_1=N_2=1$ the magnitudes of these currents are also in 1:1 ratio so that $$i_{r2} = i_{r1} = i_r \quad (26)$$

Figure 17B:
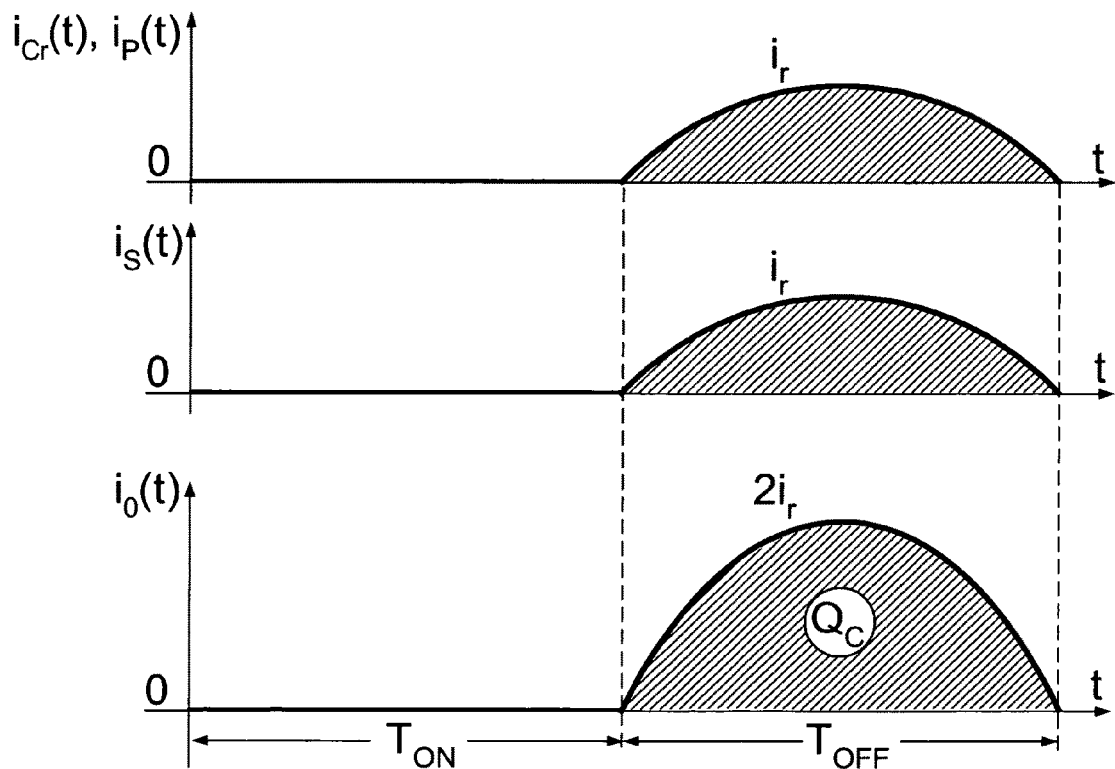
FIG. 17b illustrates the time-domain waveforms of primary current, secondary current and load current for the converter of FIG. 6a during the OFF-time interval $T_{OFF}$.

This result is illustrated by the current waveforms displayed in FIG. 17b. Due to the above directions of the currents (into and out of dotted marked terminals) their Ampere-turns (product of number of winding turns and their respective winding currents) are subtracting. As they are also identical in magnitude the net zero DC Ampere-turns are obtained, thus no DC bias is introduced with this resonant current energy storage and transfer to the load during OFF-time interval.

Note how the load current $i_0$ is equal to current rectifier CR current $I_{CR}$ that has the magnitude of $2i_r$ before splitting in half having one half $i_{r1}$ part flowing as resonant inductor $L_r$ current and the other $i_{r2}$ part flowing as the secondary current of the hybrid transformer to be reunited as $2i_r$ flowing into the load again.

Thus, a completely new phenomenon not heretofore observed in other conventional converters is taking place. The hybrid transformer serves the normal function of the 2:1 voltage step-down (and respective 1:2 current step-up) for the inductive current flow operating as a tapped-inductor type of magnetic coupling, but serves in addition as an ac transformer from the primary $N_1$ to secondary side $N_2$ for resonant capacitor discharge current. This is clearly being amplified more when the turn's ratio m is larger than one. For example, for m=3 (n=4), the current amplification is three times from primary $N_1$ to secondary $N_2$ side. Adding also another resonant current directly going to the load, this results in 4 times effective resonant capacitor discharge current going into the load. Note also that the inductive energy transfer through the tapped-inductor, as described previously in FIG. 16b and FIG. 16c separately, has on its own four times current amplification from primary to secondary. Taking the two charge transfers together, the input current (charge) during ON-time interval is magnified 8 times on the secondary, which flows to the load. Clearly, this results in the total output charge (and output DC load current) being nine (9) times larger than input charge or an effective 9:1 DC current conversion ration from DC input current to DC output current. This corresponds obviously to an effective 9:1 step down DC voltage conversion ratio which is easily verified by equation (14) which for n=4 and D=0.5 gives M=1/9 or 9:1 step-down conversion. This will convert input voltage of 12V to 1.33V output voltage, which is typically needed by the modern microprocessors loads. Compare this operation at 50% duty ratio to the one required for common buck converter of approximately 0.1 duty ratio. Thus 5 times smaller duty ratio is required for conventional buck converter to achieve same 9 to 1 step-down voltage conversion ratio. Note also how the ripple current requirement of the resonant capacitor is only a small fraction of the load current. For this 9 to 1 step-down conversion, resonant capacitor rms current needed is in 10% to 15% range of the DC load current.

Figure 18:
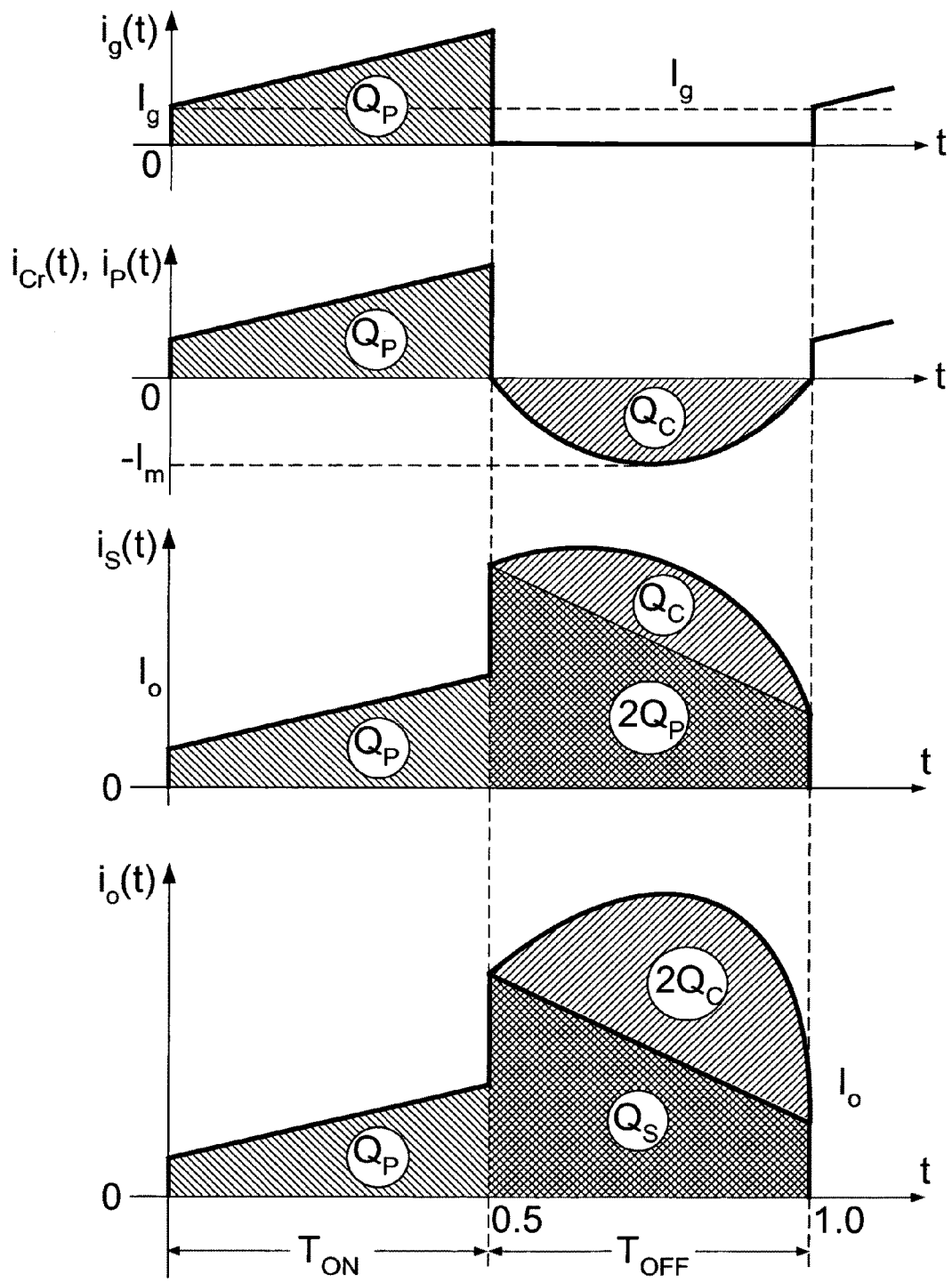
FIG. 18 shows the characteristic current waveforms for the converter of FIG. 6a for n=2.

This charge transfer is illustrated in the characteristic current waveforms in FIG. 18 showing the respective distribution of charges for the case of n=2 and D=0.5 with the current waveforms listed from top to bottom as: input current, resonant capacitor current which is also current in $N_1$ turns, the secondary current of hybrid transformer and finally the output current.

We can now complete the resonant design equations by finding the equation for the peak magnitude $I_m$ of the resonant current $i_r$ (t). The second waveform in FIG. 18 shows the resonant capacitor current which must be charge-balanced in steady-state so that positive shaded area marked $Q_P$ (capacitor charge during ON-time interval) must be equal to the capacitor discharge during the OFF-time interval, which is equal to shaded area marked $Q_C$. Note also that when the sine wave is converted to an equivalent area square-wave, the ratio of the sine-wave peak $I_m$ to equivalent square-wave magnitude is $\pi/2$. Using this and from finding from the input current waveform the average input DC current $I_g$ we get:

$$I_m = (\pi/2)I_g/(1-D) \quad (27)$$

The source current can be easily correlated to DC load current and above equation expressed in terms of DC load current I. This completes the resonant design equations.

Voltage Stresses of the Three Switches

Figure 19A:
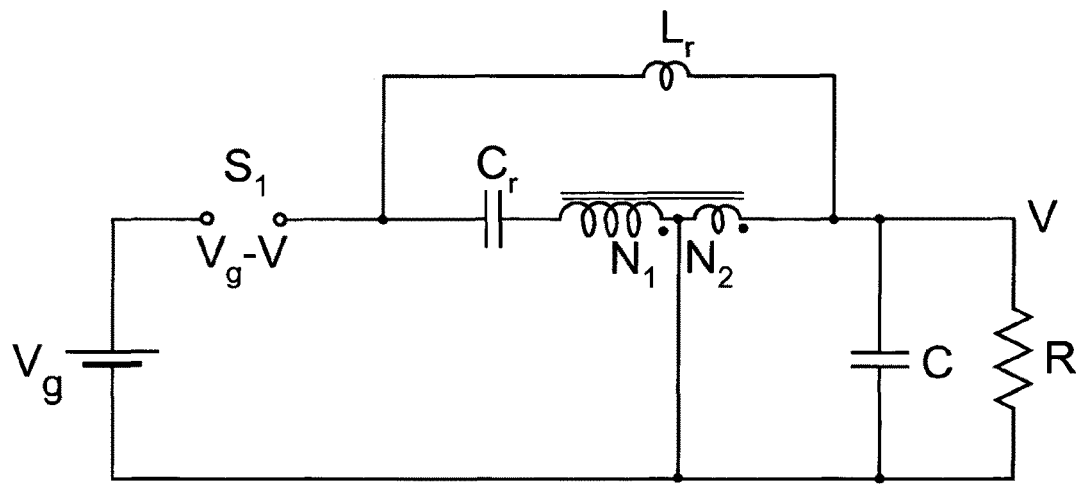
FIG. 19a illustrates converter circuit of FIG. 6a when switch $S_1$ is OFF during OFF-time interval thus displaying the blocking voltage of the $S_1$ switch and FIG. 19b illustrates converter circuit during ON-time interval, when $S_2$ and CR switches are OFF displaying their blocking voltages.
Figure 19B:
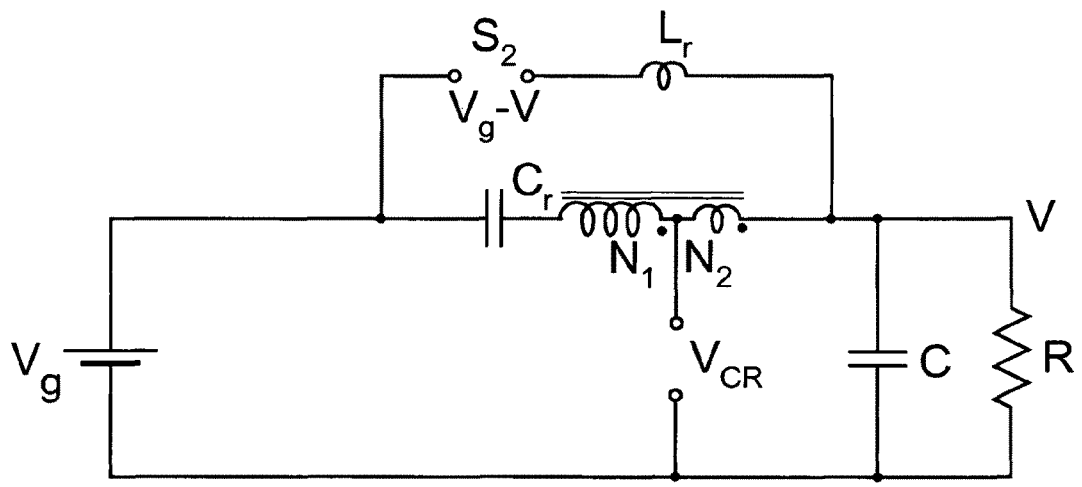

From the derived DC currents in all branches one can also derive analytical expressions for the rms currents in various branches so that the conduction losses of the three switches could be calculated. What remains is to determine the voltage stresses of all three switches so that the proper rated switching devices could be selected. From the circuit diagram for OFF-time interval in FIG. 19a and for ON-time in FIG. 19b the following blocking voltages can be evaluated:

$$S_1: V_{S1}=V_g-V \quad (28)$$

$$S_2: V_{S2}=V_g-V \quad (29)$$

$$CR: V_{CR}=(V_g-V)/n \quad (30)$$

Both active switches have lower voltage stresses than the comparable buck converter. However, note in particular large voltage stress reduction for the rectifier switch CR that conducts most of the power for the large step-down. For example, for 12V to 1V conversion and n=4, the blocking voltage of the rectifier switch is $V_{CR}$=11/4 V=2.75V. This is to be compared with the blocking voltage of 12V for comparable buck converter or a factor of 4.4 reductions in voltage stress of the switch, which processes by far the most of the power to the load for high step-down conversion and is critical for overall efficiency.

Experimental Verification

The experimental prototype was built to verify basic operation of the converter and to highlight the salient features of the key waveforms. The following were the operating conditions: $V_g$=24V, I=3 A, $T_{OFF}$=20 μsec is constant with duty ratio D and switching frequency variable while turns ratio n was used as a variable parameter, since two hybrid transformers were used with n=2 and n=4 turns ratio.

Figure 20A:
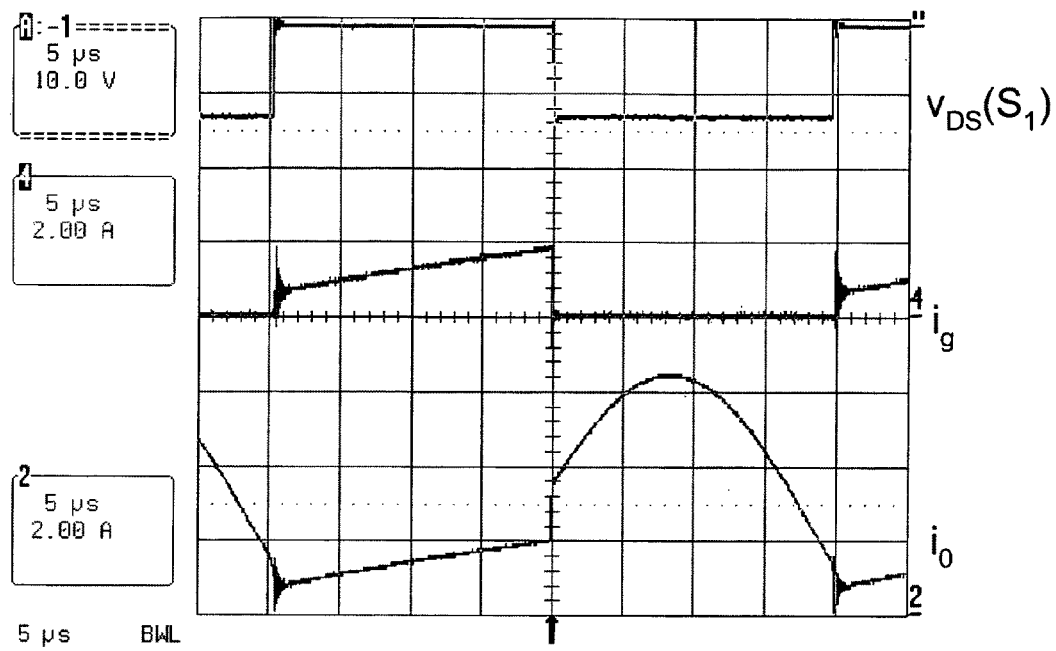
FIG. 20a illustrates the input and output current waveforms for the converter of FIG. 6a with n=2 and D=0.5

In the first experiment 2:1 step-down hybrid transformer was implemented and the measured output voltage of 4.67V corresponds very closely to the predicted voltage of 4.8V at duty ratio D=0.5 since the theoretical step-down conversion ratio is 5. The input current and output current are shown in FIG. 20a. The duty ratio is then changed to 0.2 and the output voltage measured as 2V.

Figure 20B:
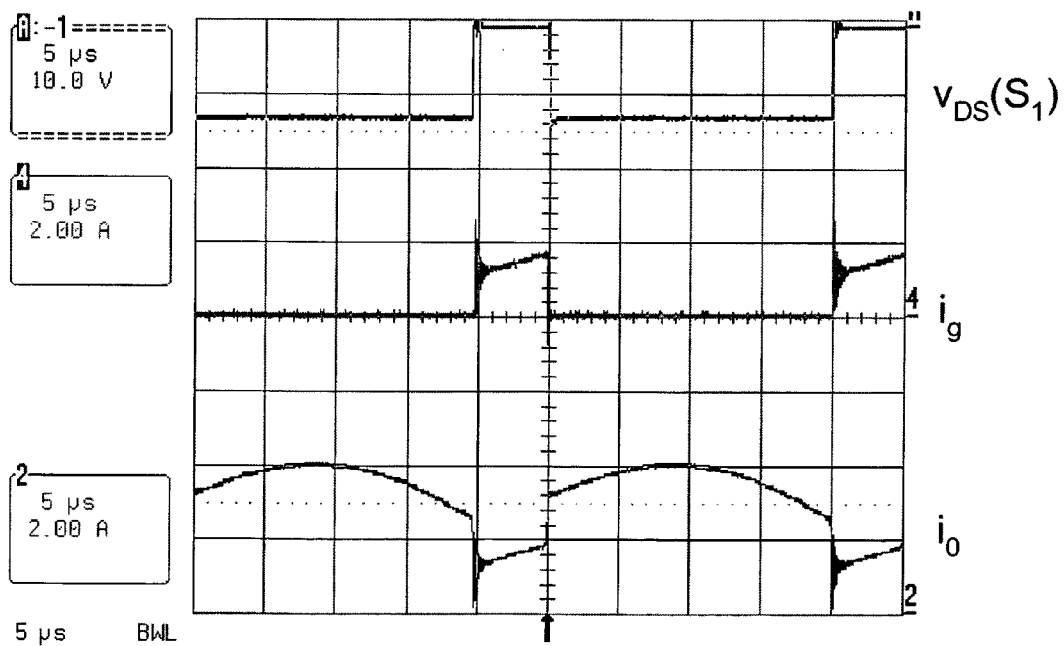
FIG. 20b illustrates the input and output current waveforms for the converter of FIG. 6a with n=2 and D=0.2

The corresponding input and output current waveforms are shown in FIG. 20b. Note the rounding off of the load current, which results in reduced ripple voltage on the output as seen in FIG. 20b. During the dominant OFF-time interval (80% of the time) the output current shape is symmetrical with a small ripple current above the DC average current during that interval. This clearly will result in reduced output voltage ripple due to the beneficial shape of the output ripple current even without using any additional phase shifted modules usually needed in multiphase buck converters for reduction of the output voltage ripple.

Figure 21A:
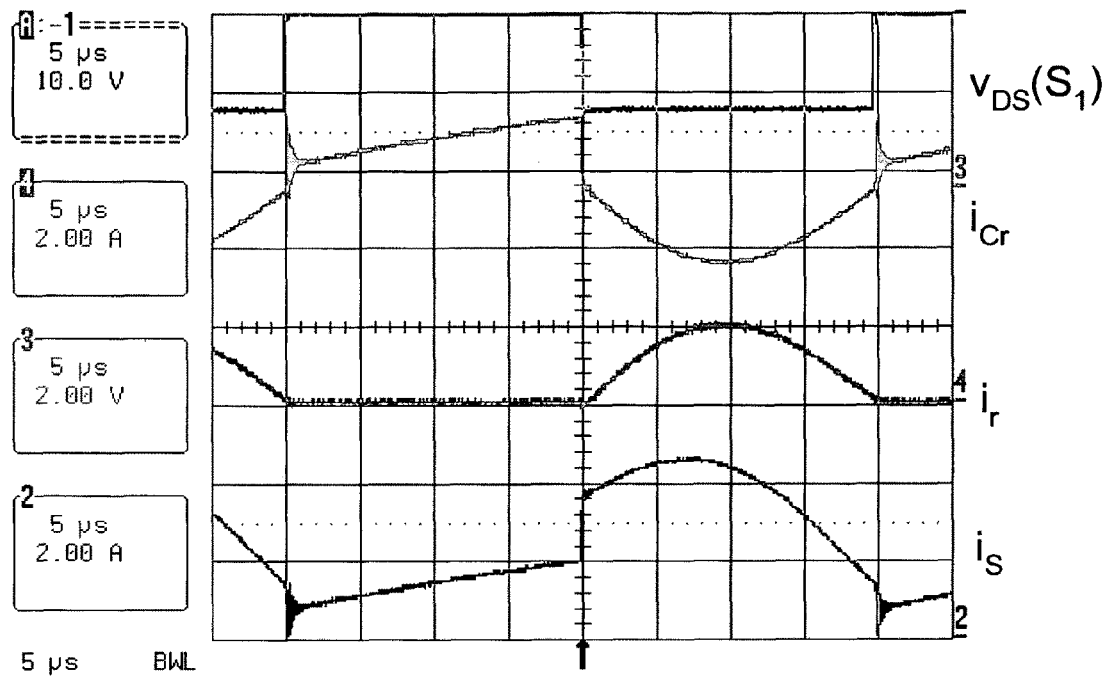
FIG. 21a illustrates the resonant capacitor, resonant inductor and hybrid transformer secondary currents for the converter of FIG. 6a with n=2 and D=0.5
Figure 21B:
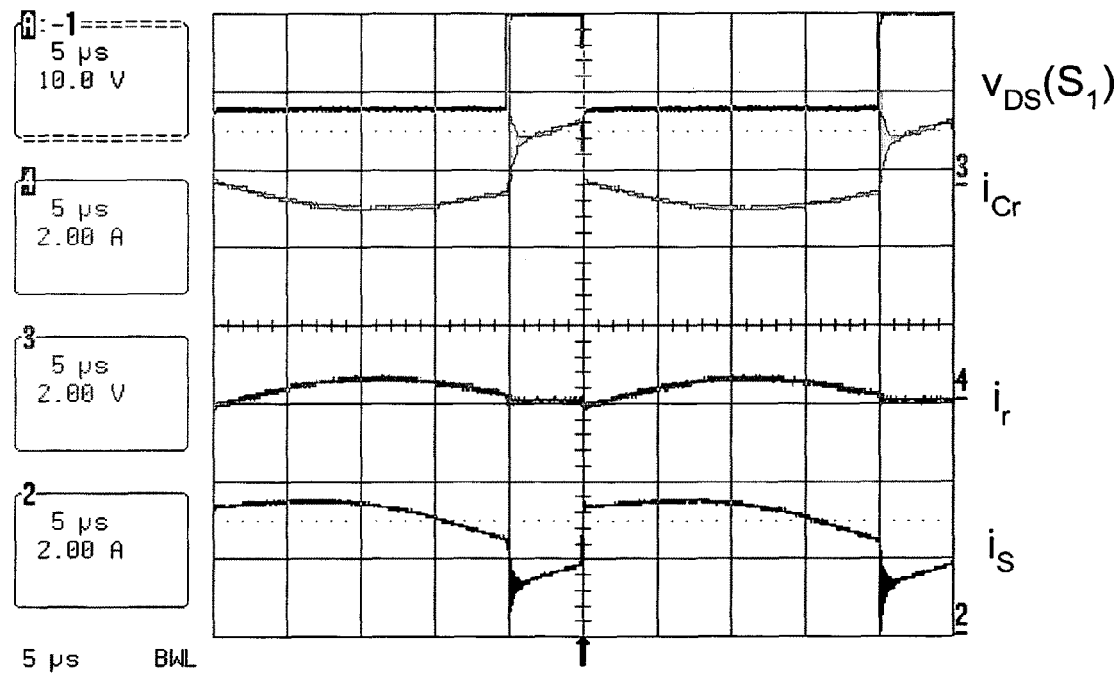
FIG. 21b illustrates the resonant capacitor, resonant inductor and hybrid transformer secondary currents for the converter of FIG. 6a with n=2 and D=0.2.

FIG. 21a shows the salient features at 50% duty ratio of the remaining three key current waveforms: resonant capacitor current, resonant inductor current and the hybrid transformer secondary current. Note that the load current is the sum of the resonant inductor current and the hybrid transformer secondary current. FIG. 21b shows the same waveforms measured at D=0.2 duty ratio. Note again the rounding off of the hybrid transformer secondary current.

The measurements below were conducted with the hybrid transformer turns ratio changed to n=4. The much larger step-down conversion ratio of 9 to 1 at 50% duty ratio is confirmed as well as 17 to 1 at 0.25 duty ratio.

Figure 22A:
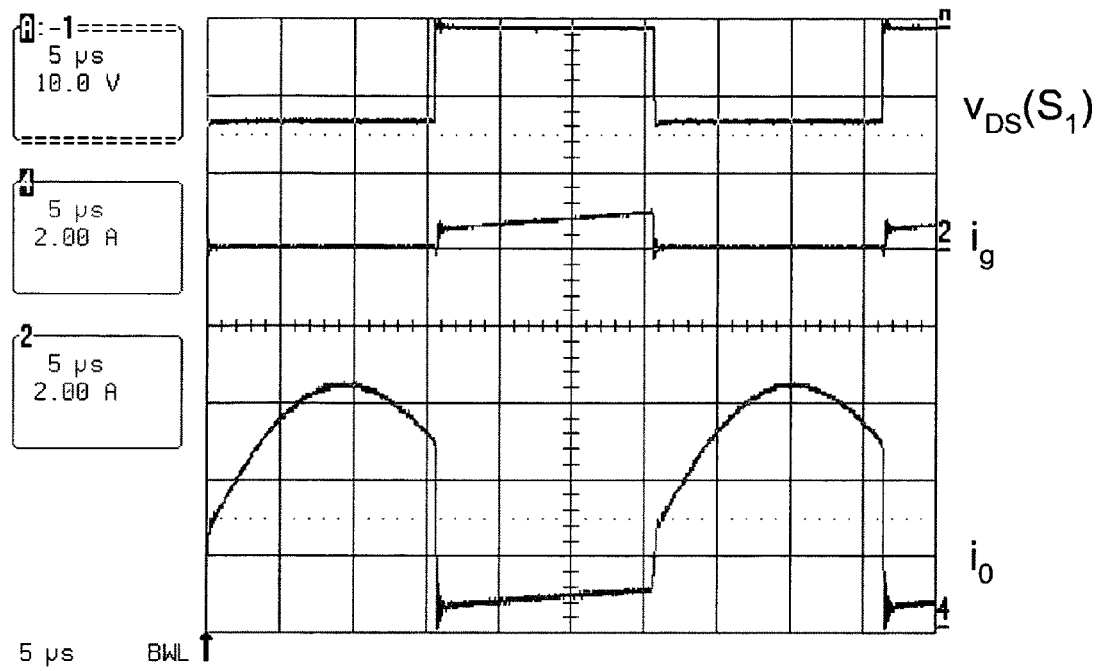
FIG. 22a illustrates the input and output currents for the converter of FIG. 6a with n=4 and D=0.5
Figure 22B:
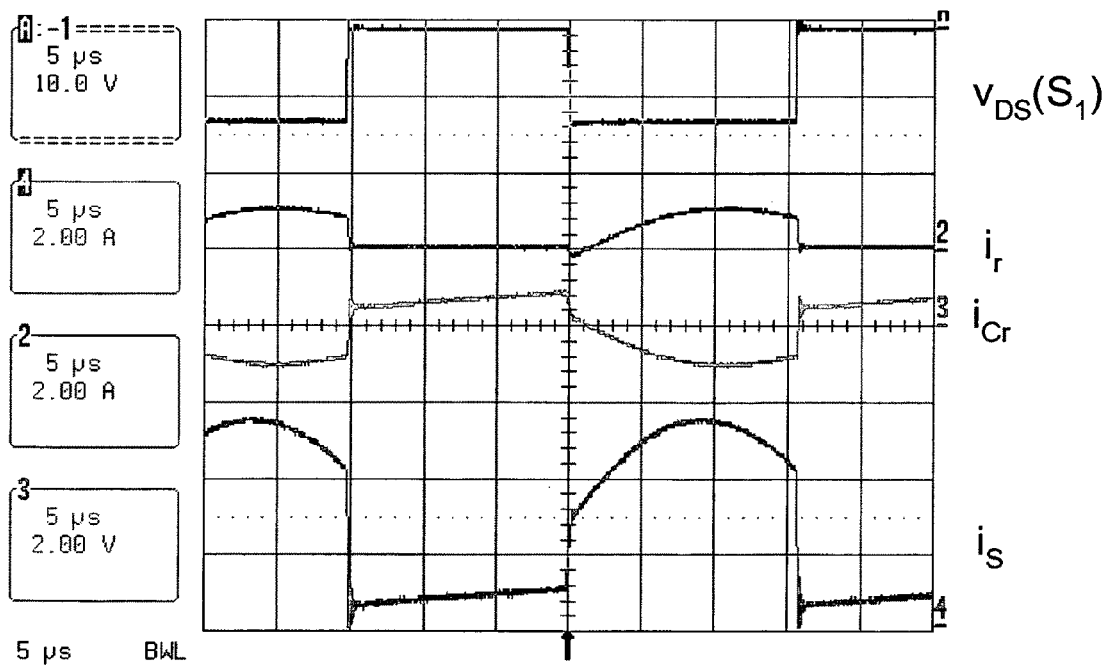
FIG. 22b illustrates the resonant inductor, resonant capacitor, and hybrid transformer secondary current for the converter of FIG. 6a with n=4 and D=0.5
Figure 23A:
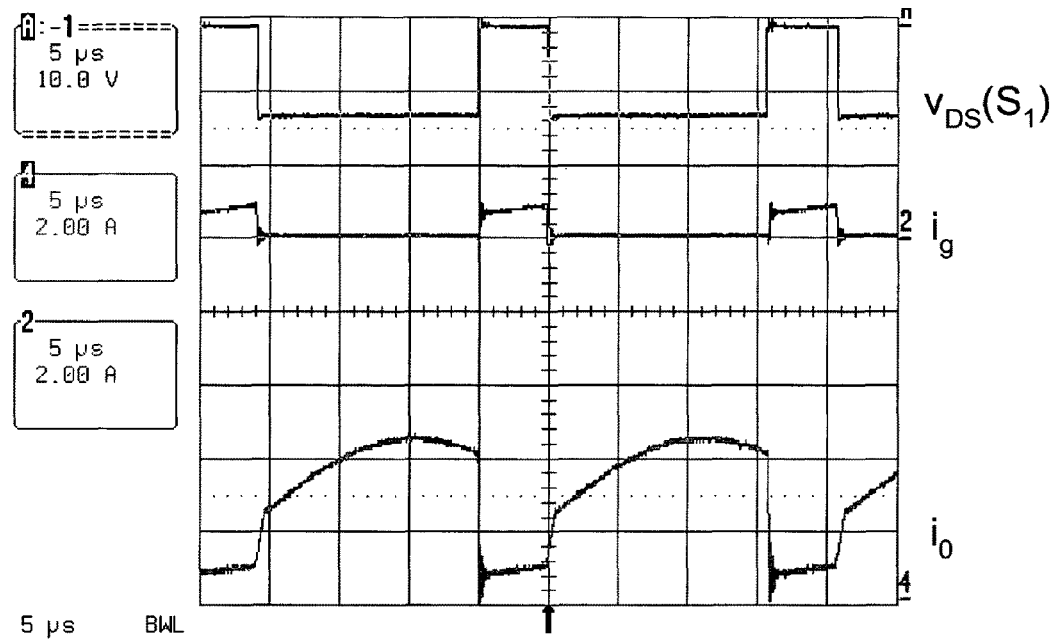
FIG. 23a illustrates the input and output currents for the converter of FIG. 6a with n=4 and D=0.25
Figure 23B:
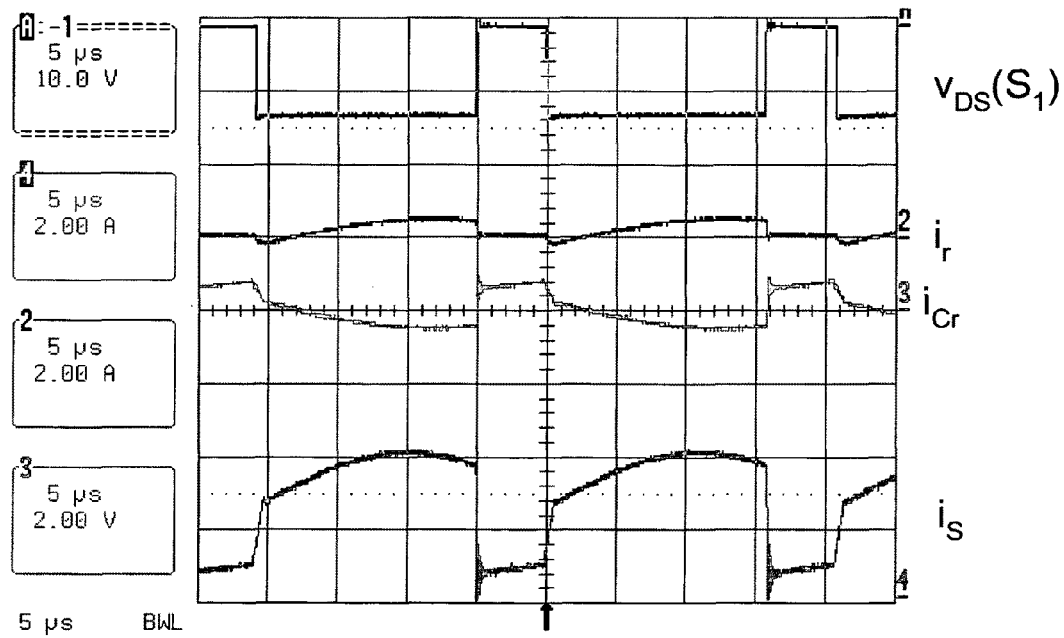
FIG. 23b illustrates the resonant inductor, resonant capacitor, and hybrid transformer secondary current for the converter of FIG. 6a with n=4 and D=0.25.

FIG. 22a illustrates at 50% duty ratio the input and output current waveforms, while FIG. 22b shows the resonant inductor current, resonant capacitor current and the hybrid transformer secondary currents respectively. FIG. 23a and FIG. 23b show the same waveforms but when operating at 0.25 duty ratio.

Figure 24A:
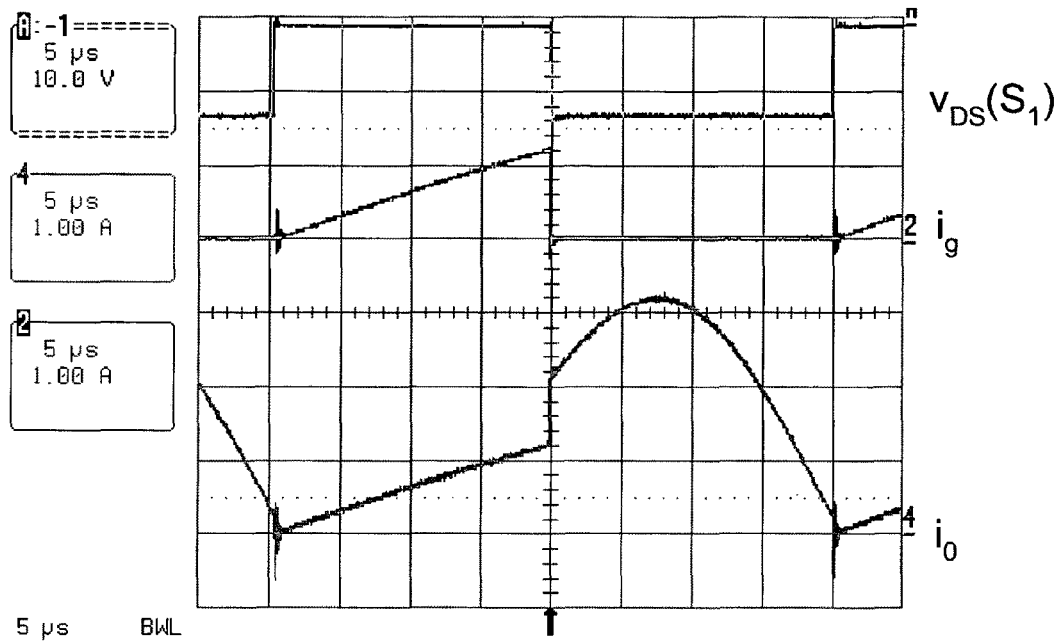
FIG. 24a illustrates the input and output currents for the converter of FIG. 6a with n=2 and D=0.5 and for 1.5 A load current
Figure 24B:
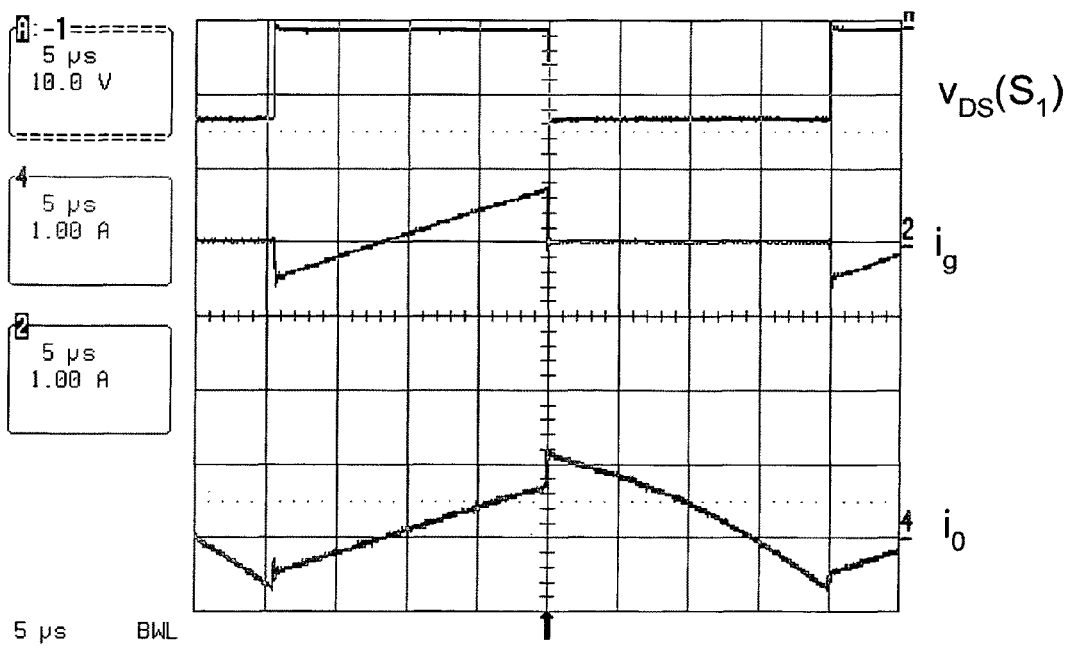
FIG. 24b illustrates the input and output currents for the converter of FIG. 6a with n=2 and D=0.5 for the light load of 0. A.

Finally the measurement was conducted to operate the converter at the boundary between the continuous and discontinuous conduction mode. However, since here all three switches are MOSFET transistors, the discontinuous inductor current mode is prevented as illustrated by the measurements below. FIG. 24a illustrates the operation at the boundary, when load current reaches zero at two instances. This was taking place at approximately 50% of the full load current or 1. A. Further decrease of the load current to 0.5 A resulted in the current waveforms shown in FIG. 24b which shows that both input and output instantaneous current could go below zero current level without changing the mode of operation to discontinuous inductor current mode (DICM). This is due to the fact that all three switches were implemented by the MOSFET transistors so that DICM mode is prevented and the DC conversion gain continue to depend on the duty ratio only and was independent of the load current.

Comparison with the Buck Converter

Figure 25A:
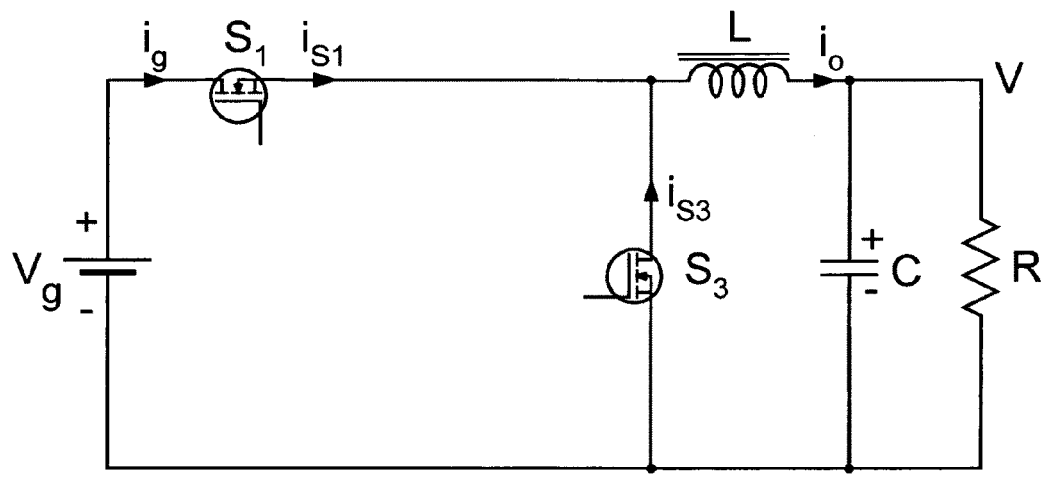
FIG. 25a illustrates a prior-art buck converter implemented with two controllable MOSFET transistors and FIG. 25b illustrates the converter of FIG. 6a with n=2 and with three controllable MOSFET transistors.
Figure 25B:
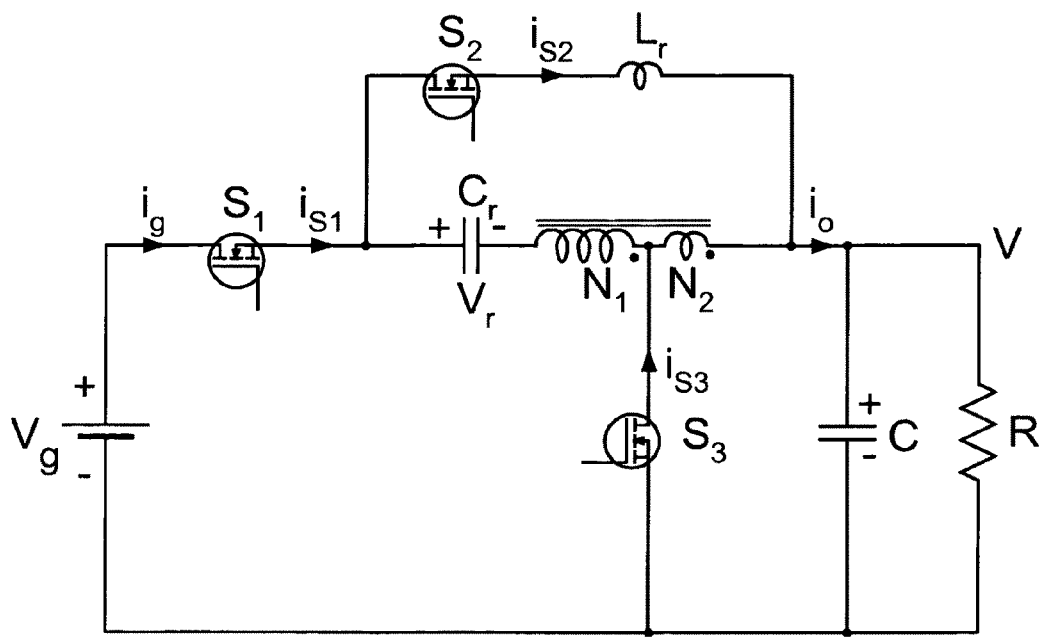

It is interesting now to make the comparison of the buck converter with two switches and a single inductor shown in FIG. 25a with the present invention with three switches and an hybrid transformer shown in FIG. 25b. At first it may appear that the simplicity of the buck converter with two switches only and a single inductor instead of the hybrid transformer would be more efficient, smaller and lower cost. None of these are correct as the detailed optimized experimental designs in the experimental section confirms. Here a few waveforms using the same experimental set-up as in previous measurements are made to compare the characteristic waveforms of both converters and measure the rms currents in the switches of the two converters and thus compare their conduction losses.

Conduction Loss Comparison

Figure 26A:
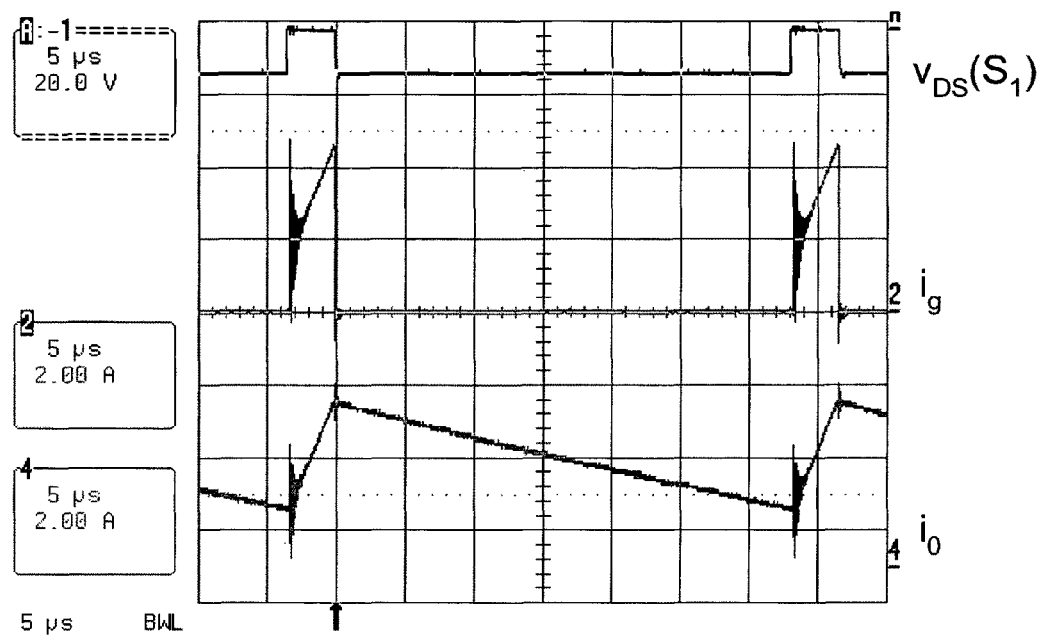
FIG. 26a illustrates the input and output current waveforms in the buck converter of FIG. 25a for 24V to 2V conversion and FIG. 26b illustrates the currents of switch $S_1$ and switch $S_3$ for the buck converter of FIG. 25a for 24V to 2V conversion.
Figure 26B:
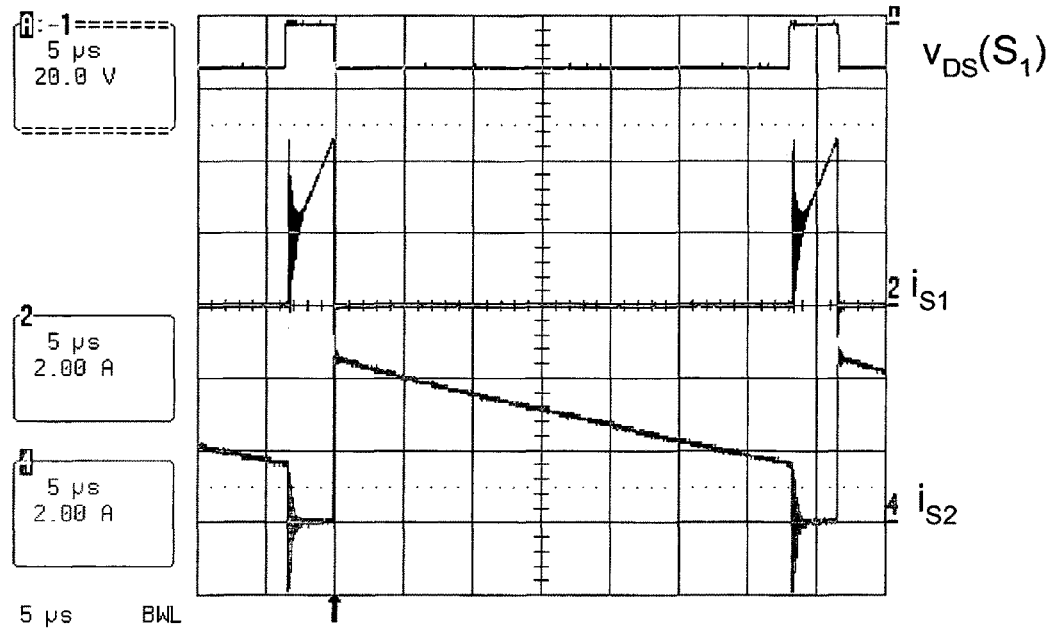
Figure 27A:
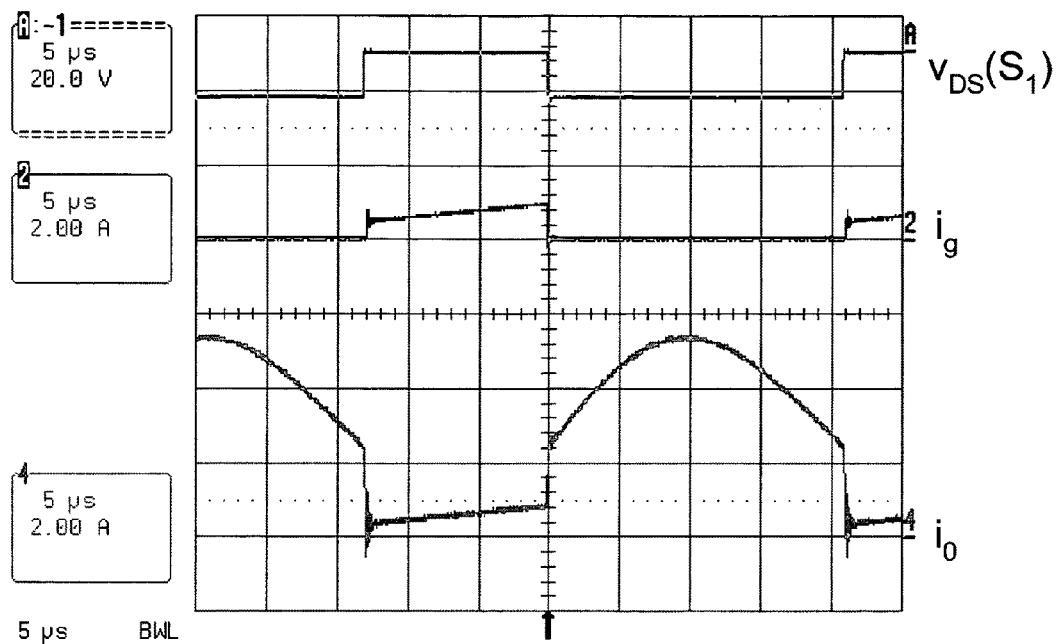
FIG. 27a illustrates the input and output current waveforms for converter in FIG. 25b and for 24V to 2V conversion with n=4.
Figure 27B:
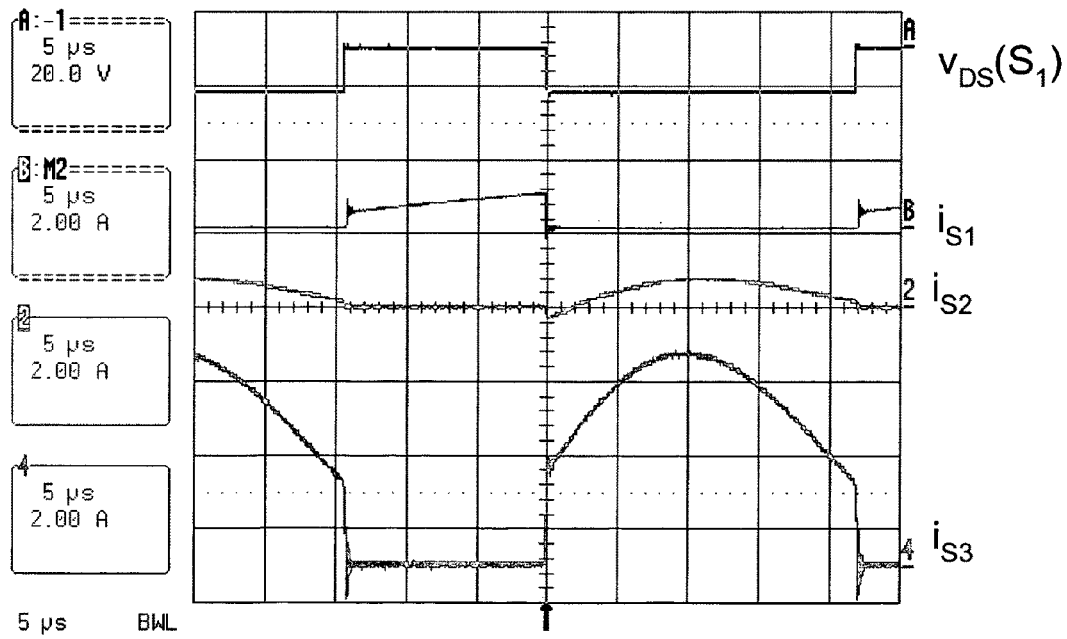
FIG. 27b illustrates the currents of switch $S_1$, switch $S_2$ and switch $S_3$ for the converter of FIG. 25b for 24V to 2V conversion with n=4.

FIG. 26a illustrates operation of the buck converter with 12V to 1V step-down conversion. Note a very small duty ratio measured to be 0.1 and a rather large inductive ripple current. Note also a large peak turn-OFF current of 4.25 A exceeding the load current of 3 A. FIG. 26b illustrates the synchronous rectifier current, which carries most of conduction losses. The converter of present invention (FIG. 7a) is built with turns ratio n=4. The measured current waveforms are illustrated in FIG. 27a and FIG. 27b. Note that the converter now needs to operate at duty ratio D=0.4 or four times higher duty ratio than the buck converter.

Note also the much-reduced peak turn-OFF current of 1 A when compared to higher than 4 A peak current of the buck converter. This will result in large reduction of the turn-OFF losses of at least four times.

It is now very instrumental to compare the measurements of the mean values and rms values of the input and output currents for two converters operating with the same 12 to 1 step down, that is converting 24V source voltage to 2V output voltage. The measurements should be interpreted relative to the DC load current of 3 A, so that the actual DC load current conditions could simply be scaled-up by the same ratio for any other load current in practical applications. Table I compares the input and output current measurement and Table II compares the switch rms current measurement.

TABLE I

| | Ig (mean) | Ig (rms) | $I_0$ (mean) | $I_0$ (rms) | Ig (peak) |
|---|---|---|---|---|---|
| Buck converter | 0.28 A | 0.97 A | 2.98 A | 3.09 A | 4 A |
| Present invention | 0.27 A | 0.45 A | 2.99 A | 3.65 A | 1 A |

TABLE II

| | $S_1$ (rms) | $S_2$ (rms) | $S_3$ (rms) | $i_{C_r}$ (rms) |
|---|---|---|---|---|
| Buck converter | 0.99 A | 0 | 2.87 A | 0 |
| Present invention | 0.45 A | 0.41 A | 3.61 A | 0.5 A |

Even though the buck converter has only two switches compared to the three switches of the present invention, the input switch in the buck converter, due to more than two times higher rms current, has loss comparable or higher than the two switches $S_1$ and $S_2$ in present invention. Although the synchronous rectifier switch in buck converter has a lower rms current, this is fully compensated by the fact that in the present invention this switch has a blocking voltage more than 4 times lower than the buck converter. Thus, substantial reduction of these dominant conduction losses could be achieved by use of lower rated voltage devices. Alternatively, for the same conduction losses, the synchronous rectifier switch in present invention could be implemented with a much smaller silicon area than the comparable switch in the buck converter as the silicon area reduction is proportional to square of reduced blocking voltage.

Size and Cost of Resonant Capacitor and Resonant Inductor

An argument could be made that the present invention uses an additional resonant capacitor and resonant inductor, which might impact the cost and size and cause additional sizable losses. However, a quick look at the typical practical applications with large step-down conversion such as 12V to 1V reveals that the resonant components are both negligible in terms of the size and their impact on losses. For example, the rms current of the above example is measured to be 0. A, which is 6 times lower than the DC load current. Hence for a 30 A typical load a 5 A resonant capacitor with 5 A rms ripple current rating is needed. This is easily met with two chip capacitors with 1210 package each with 3 A ripple current rating. The same applies to a resonant inductor that can be implemented in most application due to its 45 A DC current capability, 25 nH inductance, very small footprint and small profile. This is obviously made possible by the hybrid switching method in which resonant inductor is excited by the very small ripple voltage on the resonant capacitor resulting in 40 times or smaller size of the resoant inductor than the buck inductor.

Comparison of the Hybrid Transformer with the Buck Inductor

Finally we compare the size of the hybrid transformer and the buck inductor needed for the large step-down applications. First we compare this for the case of 2:1 turns ratio hybrid transformer, meaning that only one additional turn is used as compared to the single inductor buck made with one turn. Note that the buck converter must operate at 20% duty ratio to result in the same step-down conversion ratio of 5 to 1 that is achieved in the converter of FIG. 6a operating at 50% duty ratio.

First note that the flux of both inductor and hybrid transformer are following the same graph of FIG. 2b applicable also to 1 turn hybrid transformer secondary. The key difference is operation at different duty ratio, which leads to 8/5 or 1.6 time higher AC flux in the buck converter inductor for the same DC output voltage.

Note also that the present invention has DC saturation current of the hybrid transformer substantially lower than the output DC current and therefore lower DC-bias than comparable single-turn buck inductor. For example, in the above case only the current flowing through the secondary one turn of the hybrid transformer effects the DC-bias of the hybrid transformer, since the $N_1$ turns of the primary are charge balanced and do not add anything to DC-bias irrespective how many turns are used, such as 4, 6 or more. Only $N_2=1$ turn effects overall DC-bias. For the above example, at 50% duty ratio, the average of the hybrid transformer secondary current over the whole switching interval $T_S$ a is $I_{DC}=\frac{1}{2}\times 3QT_S=1.5QT_S$ since the direct contribution of resonant inductor to the load does not count. Q is the charge stored in the resonant capacitor during the ON-time interval. However this current does count for the load current which can be evaluated over the whole interval as $I=\frac{1}{2}QT_S+\frac{1}{2}4QT_S=2.5QT_S$. The net result is that $I=2.5/1.5\ I_{DC}=1.7\ I_{DC}$ that is hybrid transformer DC-bias is approximately 1.7 times lower than the output DC load current. Thus, seemingly impossible result is obtained that the single turn inductor in the buck converter has actually 1.7 times higher DC-bias than hybrid transformer of the present invention regardless of how many turns $N_1$ it uses.

Both 1.6 times lower AC flux and 1.7 times lower DC-bias of the hybrid transformer lead directly to combine factor of 2.72, which can be used to reduce the size of the hybrid transformer relative to the buck inductor size. Alternatively a much better strategy is to keep the same size and reduce the operating switching frequency by a factor of almost 3 times. Note that with the reduction of the frequency comes also the proportional reduction of the core losses, which make it possible to even further reduce the switching frequency and allow operation at higher flux density. Practical factor of 4 of reduction of switching frequency is feasible. Thus, the present invention can still operate at the 150 kHz switching range (and operating in optimum frequency range for chip capacitors), while the comparable buck converter would need to operate at 600 kHz or higher to result in the same size. Clearly previously discussed two times larger turn-OFF losses will now become 8 times larger due to operation at 4 times higher switching frequency.

The reduced DC-bias of the hybrid transformer as compared to a buck inductor should not come as a surprise due to the presence of the capacitive energy transfer, which is lacking in the buck converter. In fact the above comparison will become even more favorable for the present invention when the operation is made at duty ratio above 50% due to the increased capacitive energy transfer contribution to the load at higher duty ratios.

Other Switch Implementations

Figure 28A:
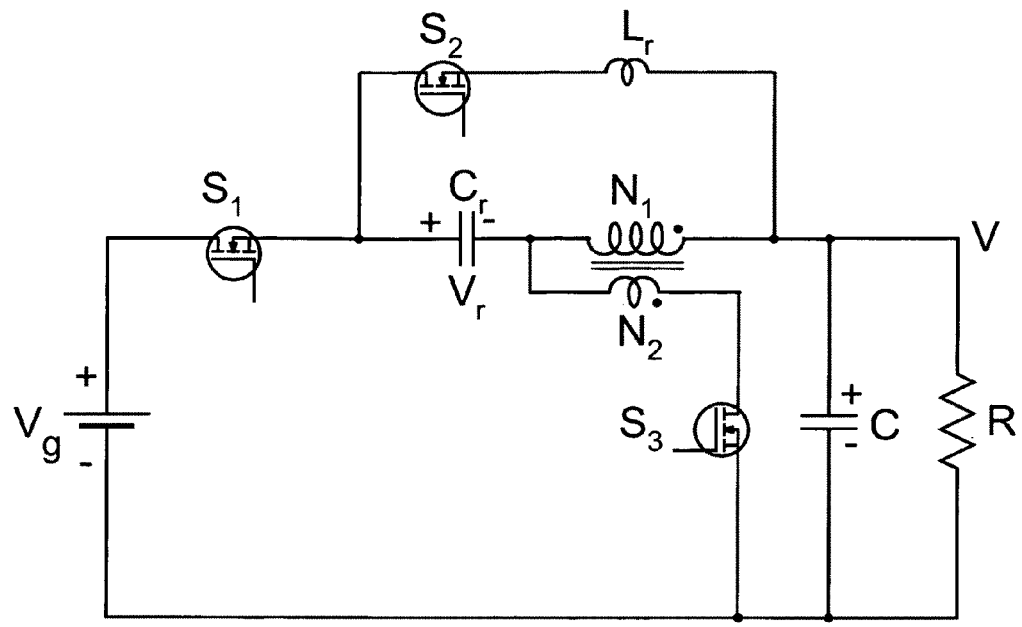
FIG. 28a illustrates one embodiment of converter in FIG. 6a with hybrid transformer replaced by a non-isolated transformer and FIG. 28b illustrates another embodiment of converter in FIG. 6a with hybrid transformer replaced by a non-isolated transformer.
Figure 28B:
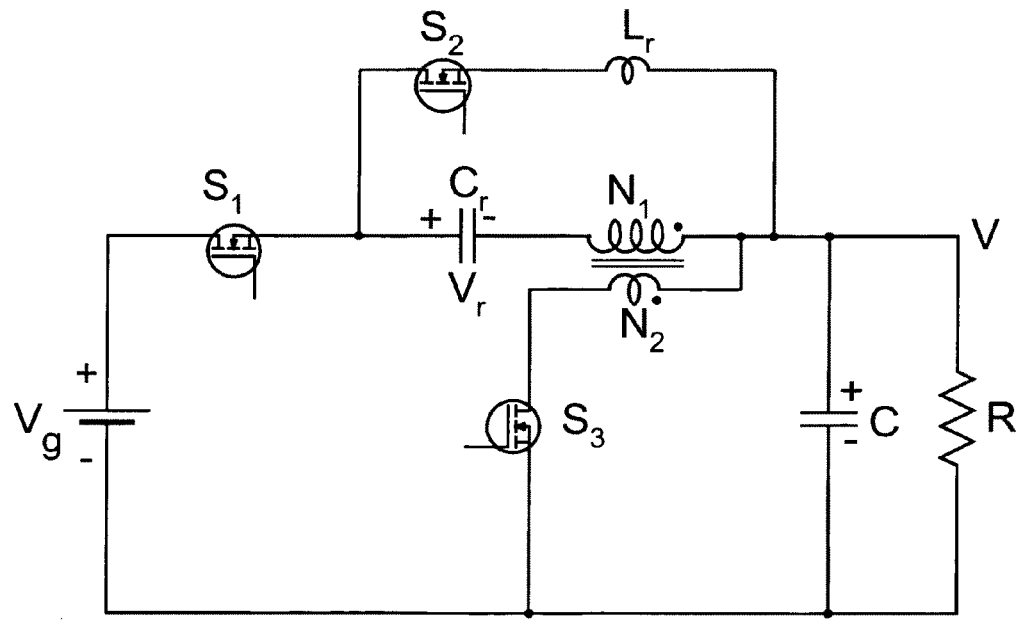

Hybrid transformer can be replaced by a transformer with two separate windings to result in two extensions illustrated in FIG. 28a and FIG. 28b.

Figure 29A:
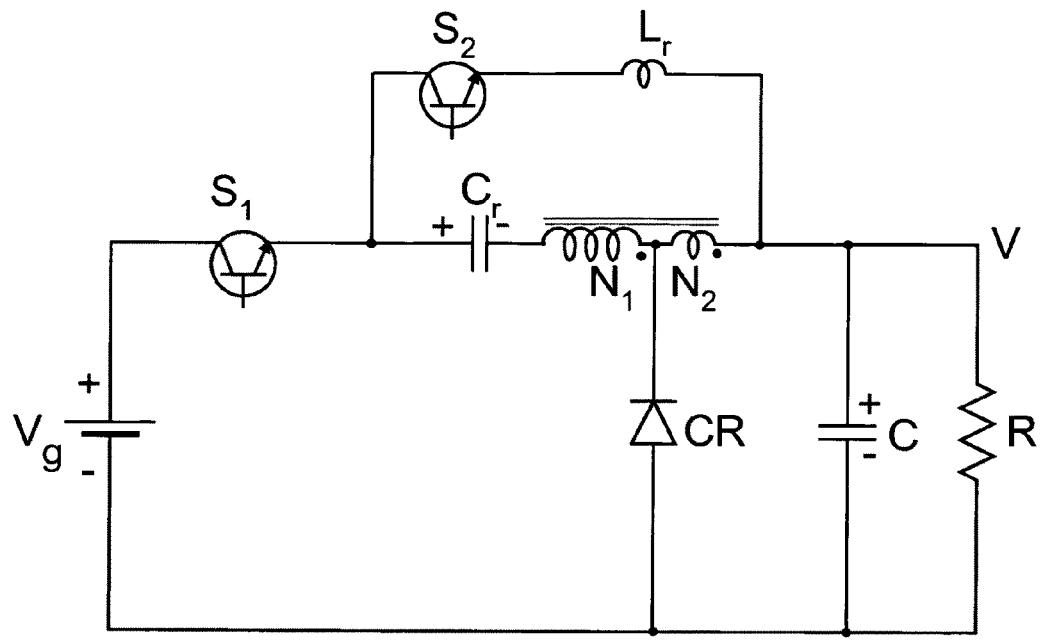
FIG. 29a illustrates one embodiment of converter in FIG. 6a with bipolar transistor implementation and FIG. 29b illustrates another embodiment of converter in FIG. 6a with IGBT and RBIGBT transistors implementation.
Figure 29B:
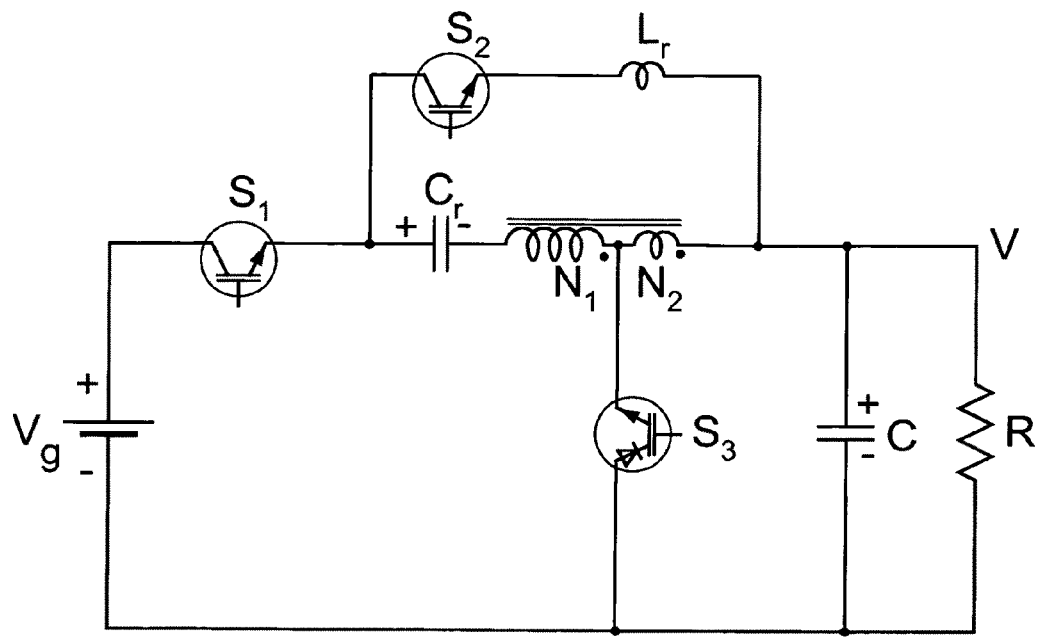

Other switch implementations are possible using different semiconductor switch technologies. For example, FIG. 29a shows implementation with bipolar transistors and FIG. 29b shows implementation with two IGBT transistors and one RBIGBT transistor.

Other Embodiments

Figure 30A:
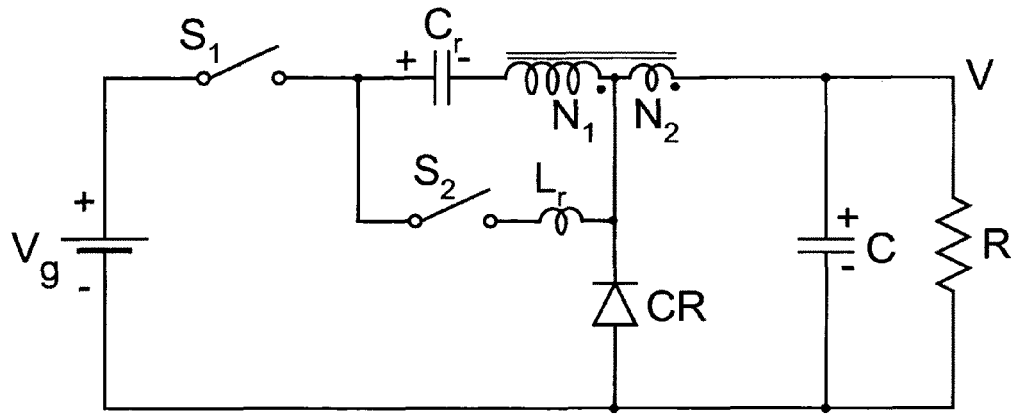
FIG. 30a illustrates another embodiment of present invention.

An alternative converter topology could be obtained by connecting the branch with second switch $S_2$ and the resonant inductor of basic converter in FIG. 6a to nodes other than the output voltage such as, for example, connecting the resonant inductor to the tap of the tapped-inductor and not to the output terminal to result in another converter embodiment shown in FIG. 30a. This configuration has a disadvantage that the resonant current does not directly contribute to the load as in previous case, but does keep the same contribution through the hybrid transformer. However, it does have an advantage, that the resonant current does not flow through the rectifier CR and thus results in reduced conduction losses of the rectifier.

Figure 30B:
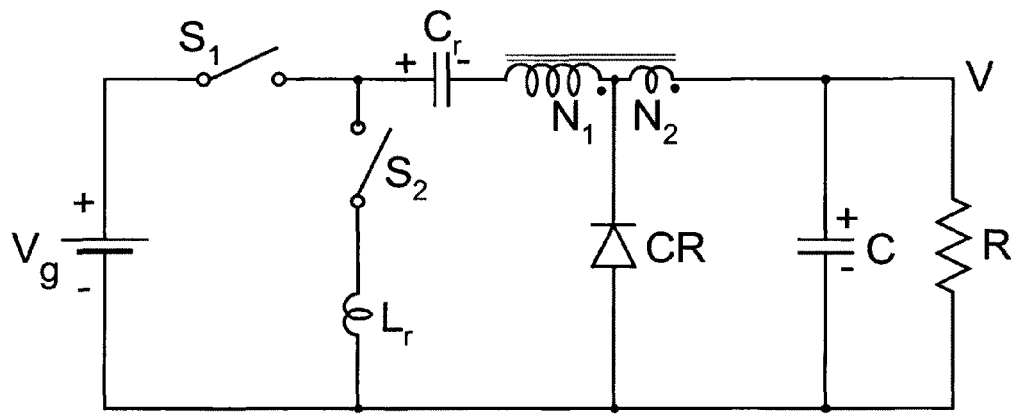
FIG. 30b shows yet another embodiment of the present invention and FIG. 30c shows the practical MOSFET transistor implementations along with corresponding high side driver and direct drive for converter of FIG. 30b.
Figure 30C:
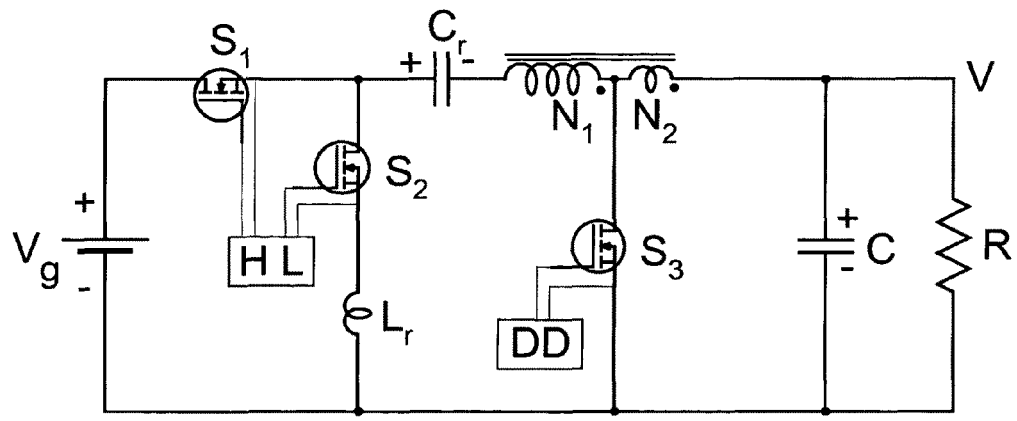
Figure 31A:
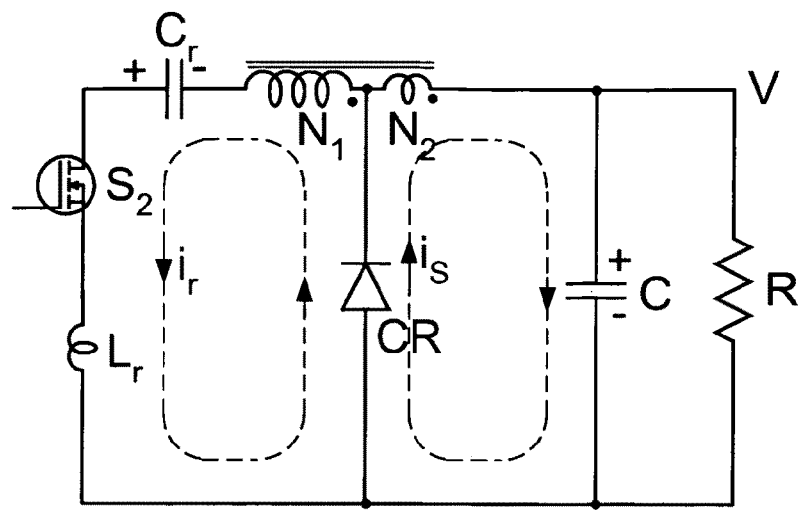
FIG. 31a illustrates the converter circuit for OFF-time interval for the converter in FIG. 30b.
Figure 31B:
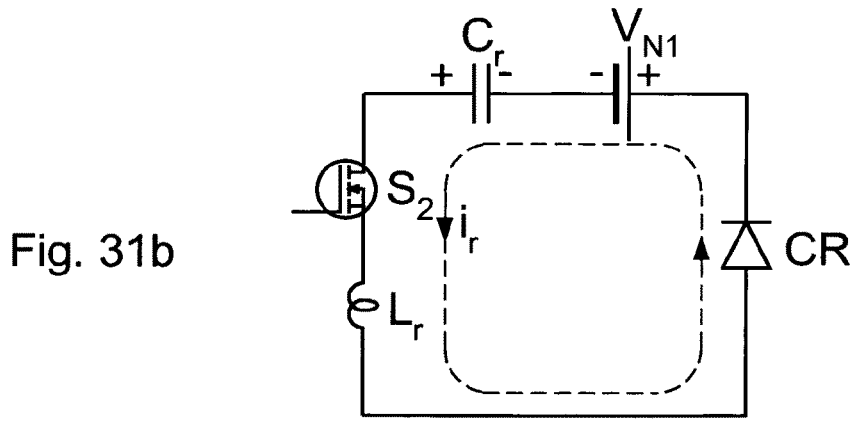
FIG. 31b illustrates a simplified circuit model with voltage source $V_{N1}$.
Figure 31C:
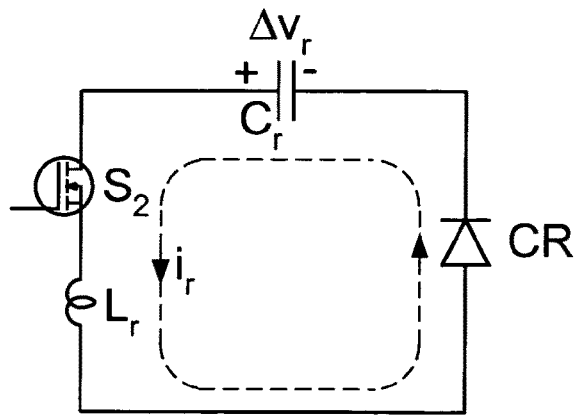
FIG. 31c shows ac circuit model in which DC components are eliminated and FIG. 31d shows the final linear resonant circuit model applicable for OFF-time interval.
Figure 31D:
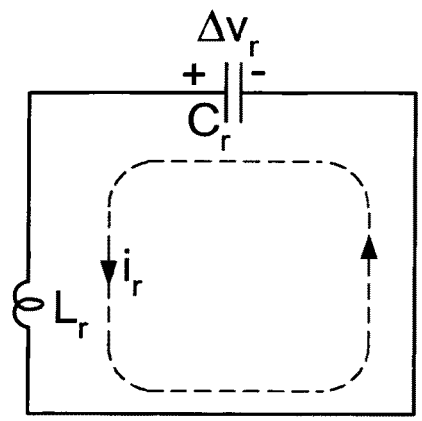

Yet another embodiments is obtained when the resonant inductor is connected to the ground as shown in FIG. 30b. The implementation of converter in FIG. 30b with all MOSFET transistors is shown in FIG. 30c. This practical implementation shows additional advantages:

a) simple drive for $S_1$ and $S_2$ switches using the high-side driver and direct drive for synchronous rectifier switch $S_3$.

b) protection of the load from switch $S_1$ failing short and staying in short condition.

Those skilled in the art could also find other beneficial placements of the resonant inductor, which would also employ above combined inductive and capacitive energy storage and transfer which is the main feature of the present invention.

Protection of the Load

The converter extension of FIG. 30b has one important practical advantage over both buck converter and autotransformer buck due to the presence of the resonant capacitor $C_r$ in series with the load and the position of the branch with the resonant inductor and active switch $S_2$ which provides an overvoltage protection of the load from a single point failure (shorting of the main switch $S_1$).

In the buck converter, shorting of the main switch will cause that the input 12V voltage will be directly applied to low 1V output and result in damage to the expensive loads such as microprocessors.

This cannot happen in this extension of the present invention, since shorting of the input switch will not cause the damage to the load. After a small transient spike the output voltage will be reduced to near zero output voltage as the resonant capacitor and output capacitor serve as an effective capacitive divider. Since the output capacitor value is many times (at least ten times) higher in value than the resonant capacitor, the output voltage will be limited to 1/10 of input voltage or 1.2V.

Equally important, a single-point failure of the resonant capacitor (its shorting) will not result in the catastrophic destruction either as the present invention of FIG. 30b will continue to operate as a modified buck converter.

Modeling and Analysis

Figure 32A:
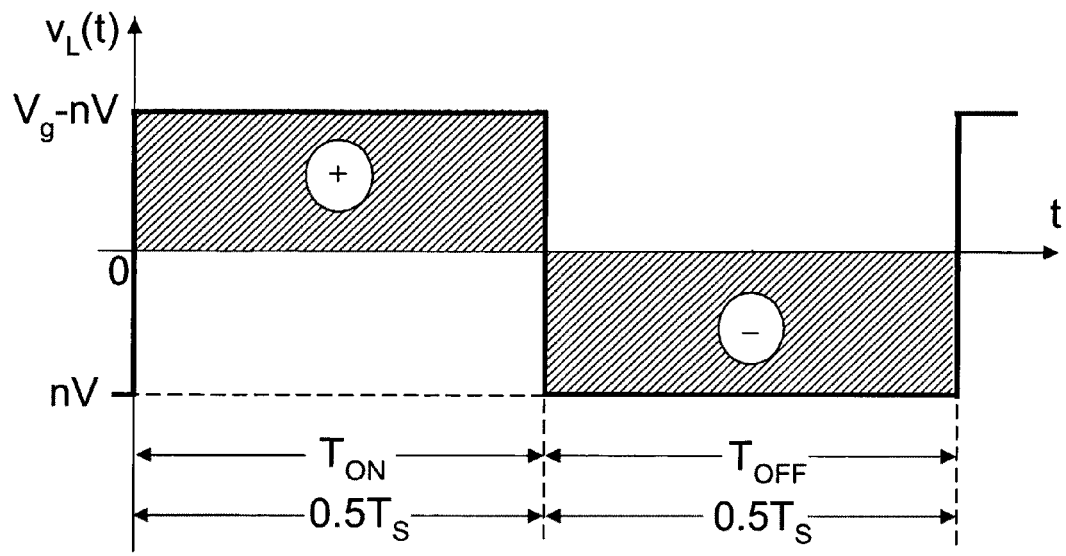
FIG. 32a illustrates a voltage waveform across N turns of hybrid transformer of the converter in FIG. 30b.
Figure 32B:
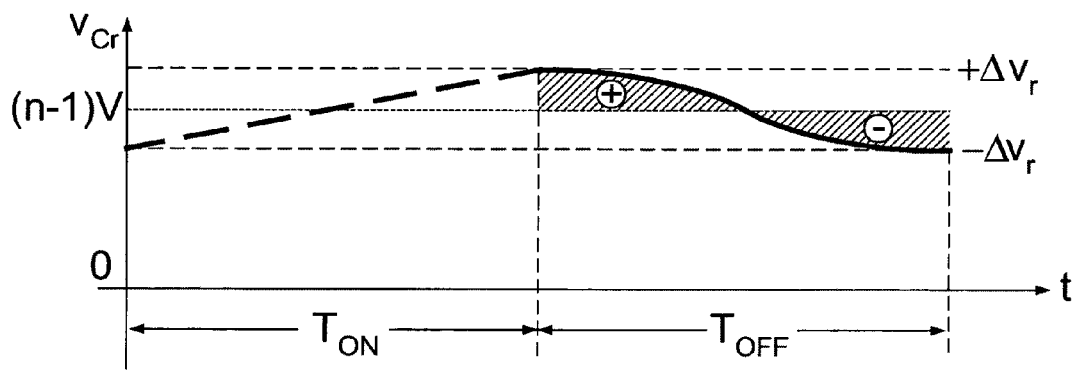
FIG. 32b shows the resonant capacitor voltage waveform and FIG. 32c shows the resonant inductor current waveform of the converter in FIG. 30b.
Figure 32C:
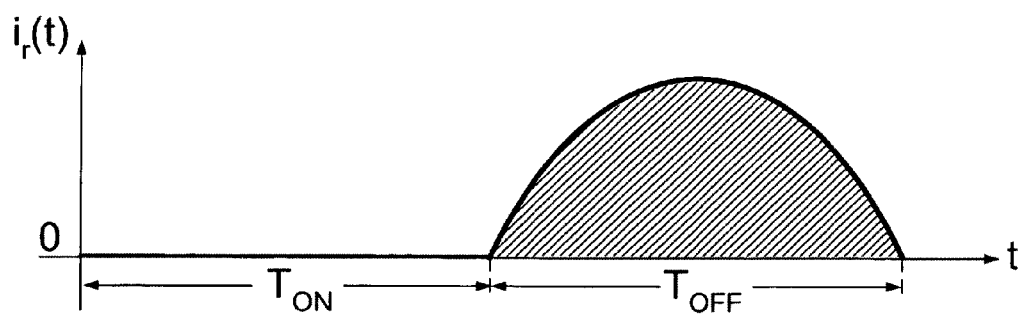

Equivalent circuit model analysis of converter in FIG. 30b follows the same as for converter in FIG. 6a, but this time using the equivalent circuit models in FIGS. 31a-d which can be used to find the voltage waveforms on the hybrid transformer as shown in FIG. 32b and the instantaneous voltage on the resonant capacitor $C_r$ as shown in FIG. 32b and the resonant inductor current $i_r$ as shown in FIG. 32c. Note the main difference is that the resonant capacitor voltage $V_{Cr}$ has now different DC steady state value, which is evaluated next.

Evaluation of DC Voltage Gain

We now turn to evaluation of the DC voltage gain for the converter topology in FIG. 30b. We assume a duty ratio control D of the main switch $S_1$.

Flux Balance on Two Magnetic Components

First the flux balance on the resonant inductor $L_r$ can be now shown for an arbitrary turns ratio n to:

$$\int v_r dt = V_r - (n-1)V = 0 \qquad (31)$$

We than apply the second flux balance criteria, the flux balance on the hybrid transformer (equality of the shaded areas in FIG. 32a) to obtain:

$$V_g D - nVD = nV(1-D) \qquad (32)$$

$$M = D/n \qquad (33)$$

Figure 36A:
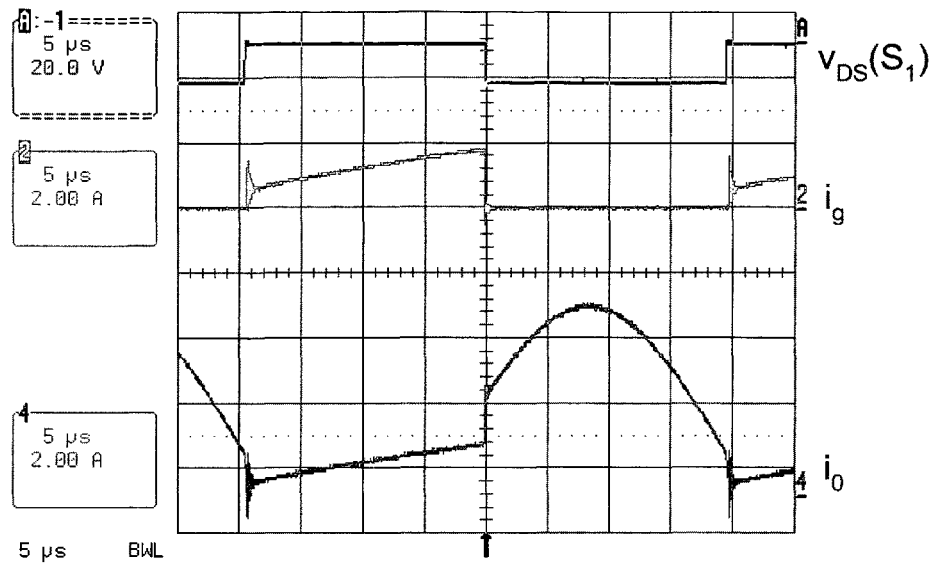
FIG. 36a shows the input and output current waveforms for the converter of FIG. 6a for n=2 and FIG. 36b shows the input and output current waveforms for the converter of FIG. 30b for n=2.

Note that the converter in FIG. 36a has the same DC conversion characteristic given by (33).

Figure 33A:
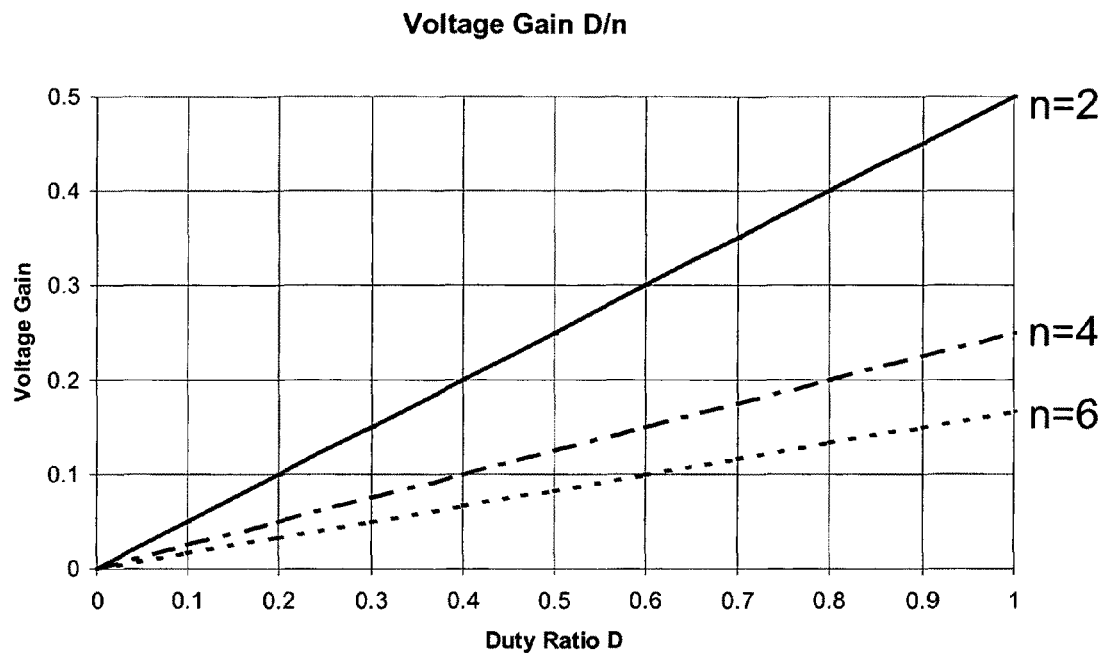
FIG. 33a shows the family of the DC voltage gain plots obtained for different hybrid transformer turns ratio's n for the converter of FIG. 30b
Figure 33B:
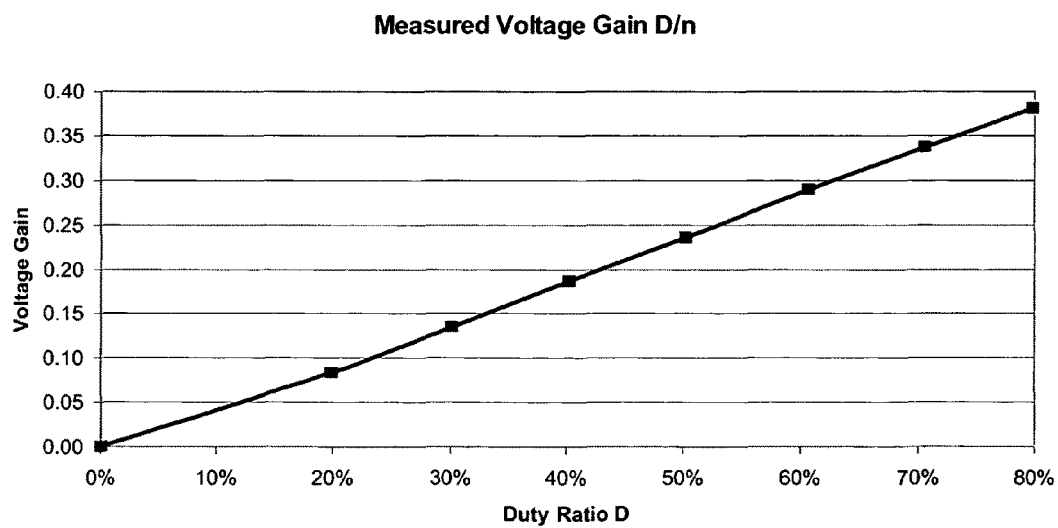
FIG. 33b shows the experimental DC voltage gain verification for n=2.

The family of the DC conversion gains as a function of duty ratio for different turns ratios n is shown in graphs in FIG. 33a. Note once again a remarkable result (33). Despite the presence of the resonance, owing to the hybrid-switching method described above, the DC voltage gain M is only a function of the duty ratio D and the hybrid transformer turns ratio n and is NOT a function of resonant component values nor the load current I. All other switching methods employing one or more resonant inductors result in the heavy dependence on the resonant component values as well as the DC load current. Furthermore, equation (33) shows a linear dependence of DC voltage gain on duty ratio D, just like in ordinary buck converter, except with the additional reduction ratio equal to hybrid transformer turns ratio n. Linearity of the DC voltage gain as a function of duty ratio could be used to the advantage in some applications, such as amplifiers consisting of two such converters as it would lead to distortion free linear amplification. Thus, the linearity of the DC voltage gain is experimentally confirmed for the case of n=2 and illustrated with measurement results shown in FIG. 33b.

Resonant Circuit Analysis

The same resonant circuit model is obtained for this case (FIG. 30a), so the same resonant equations derived previously for the original circuit of FIG. 6a apply equally well for this converter topology. Clearly, the DC voltage gains of the two topologies are different as seen by comparing their analytical equations (14) and (31). We will now analyze and make quantitative comparison for same duty ratio operating point of D=0.5 and the same n=2 turns ratio.

Hybrid Transformer Charge Transfer

Figure 34A:
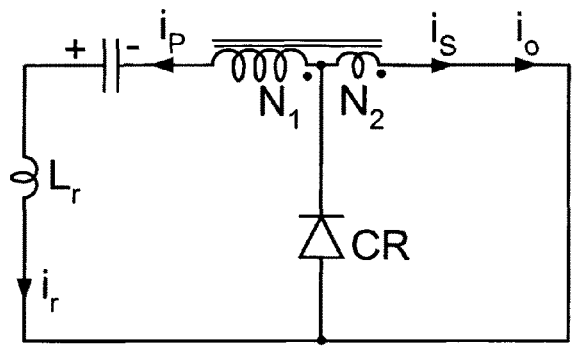
FIG. 34a shows the converter circuit of FIG. 30b for the OFF-time interval and FIG. 34b illustrates the time-domain current waveforms of the hybrid transformer primary current, secondary current and the load current for the converter of FIG. 30b.

We now review the energy transfer from input to output through the hybrid transformer for the special case of n=2 and duty ratio D=0.5 for the hybrid transformer of FIG. 34a. The two distinct energy transfers through the hybrid transformer are analyzed separately; the inductive and the capacitive energy storage and transfer, and then their results combined using the principle of superposition First, the inductive energy storage and transfer trough the hybrid transformer did not change from the previous topology. The same inductive energy storage and transfer is also taking place in the tapped-inductor buck converter.

However, there is now a change in the capacitive energy transfer through the hybrid transformer as modeled by the equivalent circuit model of FIG. 34a. Note that this time the primary winding conducts the resonant current designated as loop current $i_d$, which flows into the dot-marked connection of the $N_1$ primary winding. This current $i_r$ is transformed to hybrid transformer secondary and flows into the load through the current rectifier CR. Unlike the tapped-inductor buck current which had no such resonant current flow, this resonant current $i_d$ results in the resonant current $i_{r2}$ flowing out of the dot-marked terminal of the hybrid transformer secondary winding and into the load. Clearly due to respective windings having 1:1 turns ratio as $N_1=N_2=1$ the magnitude of these resonant currents is also in 1:1 ratio so that $$i_{r2}=i_{r1}=i_r=i_0 \tag{34}$$

Figure 34B:
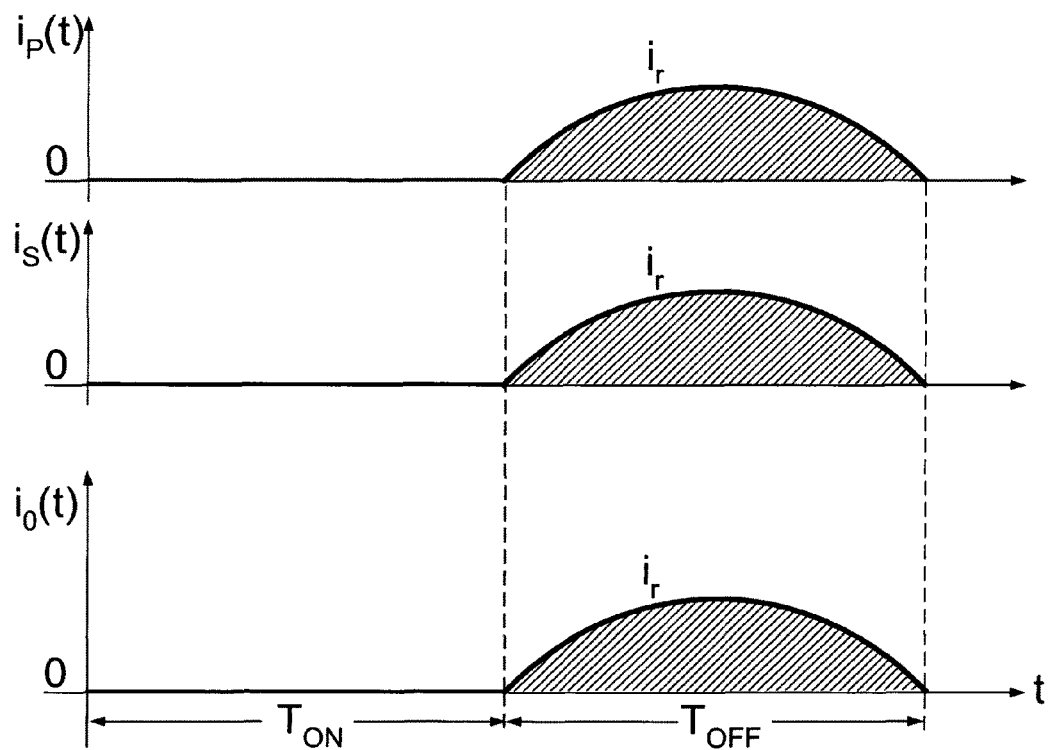

This result is illustrated by the current waveforms displayed in FIG. 34b.

Note, however, that there is no resonant current $i_{r1}$ contribution to the load, since this current is now NOT delivered to the load, but is instead circulating internally in the converter (actually sent to ground lead). As the result, the output current is equal to the current of the secondary of the hybrid transformer during OFF-time interval and not twice that value in previous case. Therefore, there is less current delivered to the load in this converter topology owing to the absence of the direct resonant current contribution to the load. Consequently, the DC voltage conversion ratio will always be higher in this case.

However, once again, a new phenomenon not heretofore observed in other conventional converters is taking place. The hybrid transformer serves the regular function of the voltage step-down (and respective current step-up) for the inductive current flow, but serves in addition as a resonant current amplifier with turn ratio m amplification from primary to secondary winding. Due to the absence of the direct resonant current flow to the load, this results in one time effective amplification of the primary hybrid transformer current as seen in waveforms for $i_S$ in FIG. 35. Note also that the inductive energy transfer through the hybrid transformer, has on its own two times current amplification from primary to secondary. Taking the two charge transfers together, the input current (charge) during ON-time interval is magnified 3 times on the secondary, which flows to the load. Clearly, this results in the output charge being four (4) times larger than input charge or an effective 4:1 DC current conversion amplification from DC input current to DC output current. This corresponds obviously to an effective 4:1 step down DC voltage conversion ratio which is easily verified by equation (33) which for n=2 and D=0.5 gives M=1/4 or 4:1 step-down conversion. This will convert input voltage of 12V to 3V output voltage.

Figure 35:
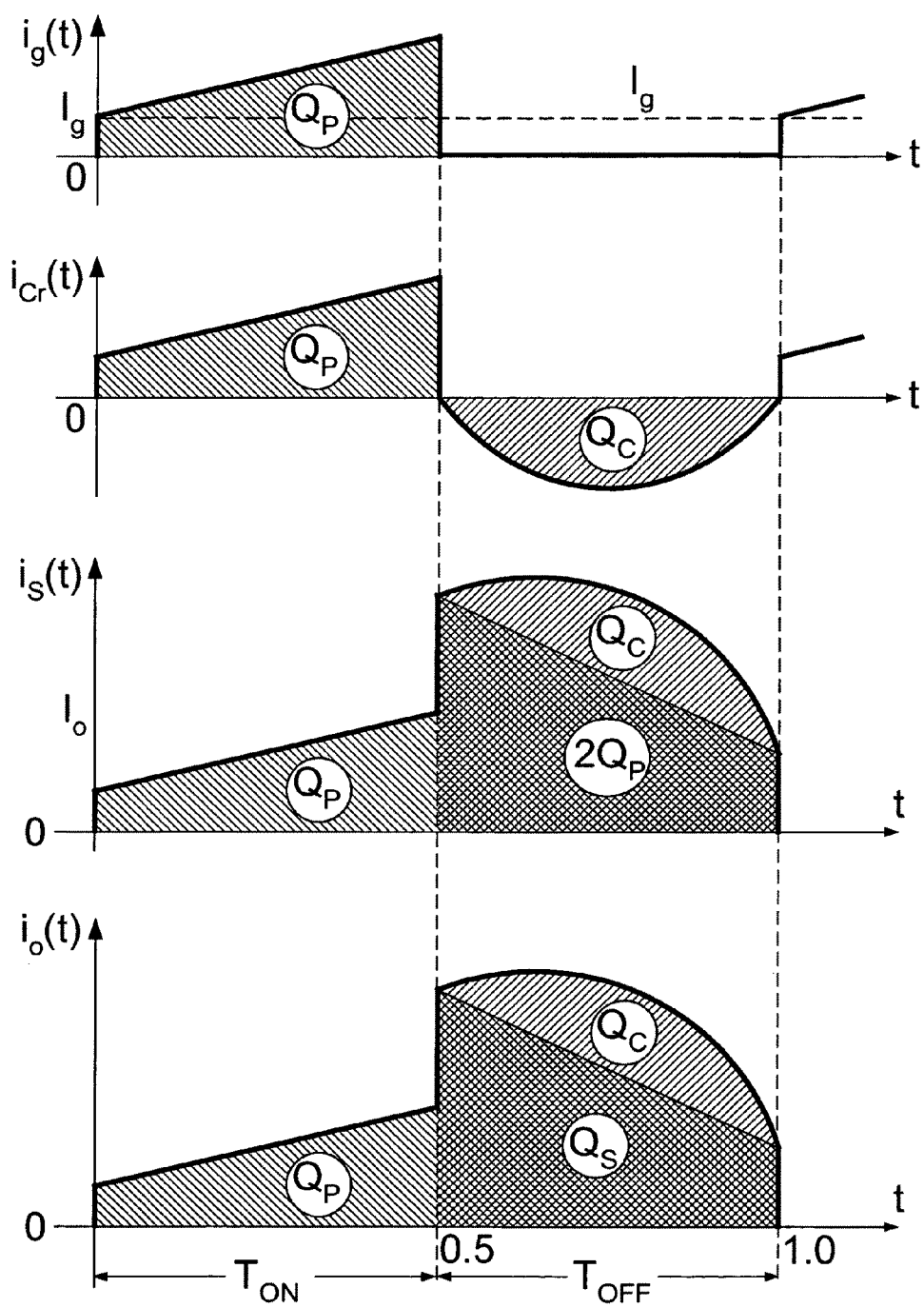
FIG. 35 shows the characteristic current waveforms for the converter of FIG. 30b for n=2.

This charge transfer is illustrated in the characteristic current waveforms in FIG. 35 showing the respective distribution of charges for the case of n=2 and D=0.5 with the current waveforms listed from top to bottom as: input current, resonant capacitor current which is also a current in $N_1$ turns of hybrid transformer, the secondary current of hybrid transformer and finally the output current.

Experimental Comparison of Two DC Voltage Gains

Figure 36B:
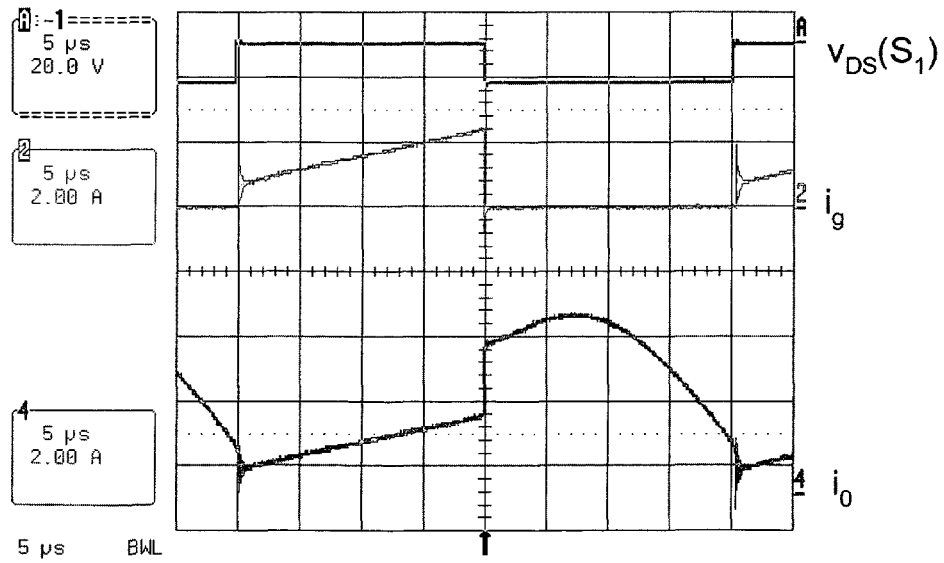

We now compare the DC voltage gains of two topologies. FIG. 36a shows the input and output current of the original converter of FIG. 6a and FIG. 36b show the same waveform when the connection of the branch with resonant inductor to ground node is made (FIG. 30b). The DC output voltage measurement confirmed the corresponding DC voltage conversion gains predicted by (15) and (33). Moreover, the comparison of the load currents shows that converter of FIG. 6a had indeed a higher load current and that their difference is indeed the resonant inductor $L_r$ current $i_{r2}$.

Voltage Stresses of the Three Switches

Figure 37A:
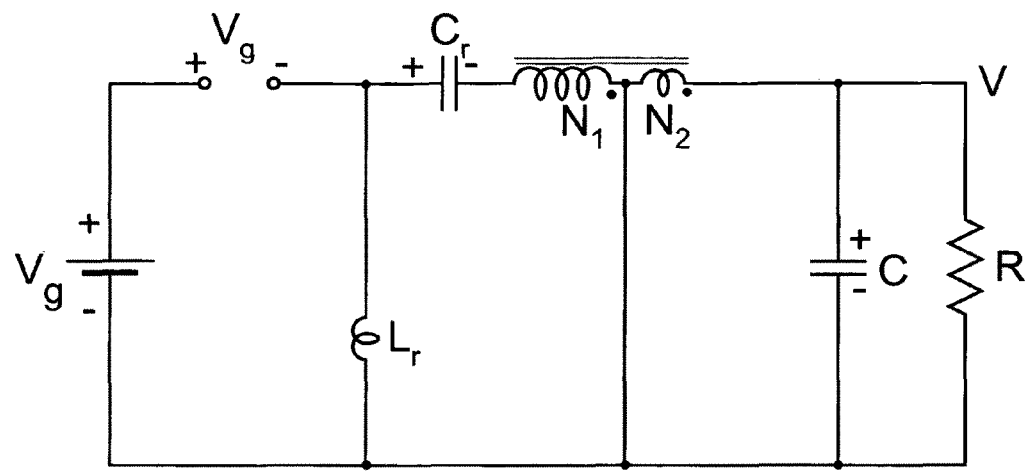
FIG. 37a illustrates converter circuit of FIG. 30b when switch $S_1$ is OFF during OFF-time interval thus displaying the blocking voltage of the $S_1$ switch and FIG. 37b illustrates converter circuit during ON-time interval, when $S_2$ and $S_3$ switches are OFF displaying their blocking voltages.
Figure 37B:
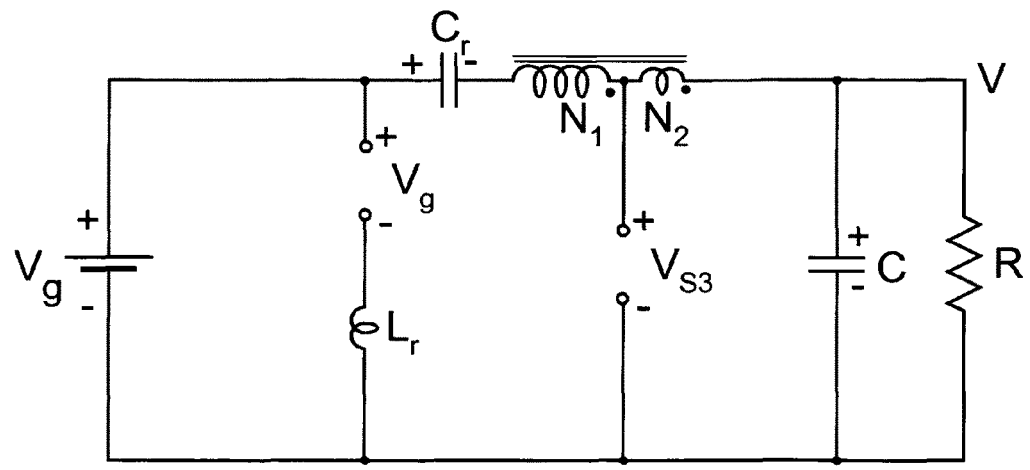

Let us now evaluate the voltage stresses in the converter of FIG. 30b. From the circuit diagram for OFF-time interval in FIG. 37a and for ON-time in FIG. 37b the following blocking voltages can be evaluated:

$$S_1: V_{S1}=V_g \tag{35}$$

$$S_2: V_{S2}=V_g \tag{36}$$

$$S_3: V_{S3}=V_g/n \tag{36}$$

Both active switches have voltage stresses equal to the input voltage as in a buck converter. However, note in particular large voltage stress reduction for the synchronous rectifier switch $S_3$ that conducts most of the power for the large step-down. For example, for 12V to 1V conversion and n=4, the blocking voltage of the synchronous rectifier switch is $V_{S3}=12/4$ V=3V. This is to be compared with the blocking voltage of 12V for comparable buck converter or a factor of 4 times reduction in voltage stress of the switch.

Voltage Regulation Via Duty Ratio Control

The converters of present invention in FIG. 6a and FIG. 30b and their various implementation have a number of distinguishing characteristics when compared to other resonant switching converters:

a) they contain one separate resonant inductor which is fully fluxed balanced during OFF-time interval and its value together with the resonant capacitor value is used to determine the optimum turn-OFF-time interval.

b) they contain a hybrid transformer which provides the transfer of both inductive and capacitive input energy storage to the output. This hybrid transformer is flux balanced over the entire switching period.

c) the first two features result in unorthodox switching converter topology consisting of three switches only.

d) has the DC voltage gain dependent on the duty ratio only despite the half-wave sinusoidal resonant current present in the converter which is essential for its operation.

All other converters based on resonance have a DC voltage gain not only dependent on the resonant component values, but also of not being suitable for the duty ratio control. In these resonant converters the output voltage is controlled in a resonant circuit fashion by changing the ratio of switching frequency to the resonant frequency, which is not capable to regulate the output voltage over even the modest change in DC load currents due to high dependence on the resonance Q factor. However, the present invention employs the very simple duty ratio control of the output voltage and is independent on the load current and resonant component values.

The optimal control method introduced so far is constant OFF-time, variable ON-time control which ultimately means also a variable switching frequency. However, for the practical step-down conversion ratios, such as 4:1 and higher as used in experimental examples, the change of the ON-time interval is relatively small from the nominal value, so that even though a variable switching frequency is employed, the change of switching frequency is also small. However, if so desired, a constant switching frequency and variable duty ratio could be employed at the minor sacrifice in efficiency due to presence of zero coasting intervals and somewhat increased values of rms currents.

Experimental Verification of Efficiency

Prototype of a 48V to 1V and 1.5V Converter with 35 A Load

Figure 38A:
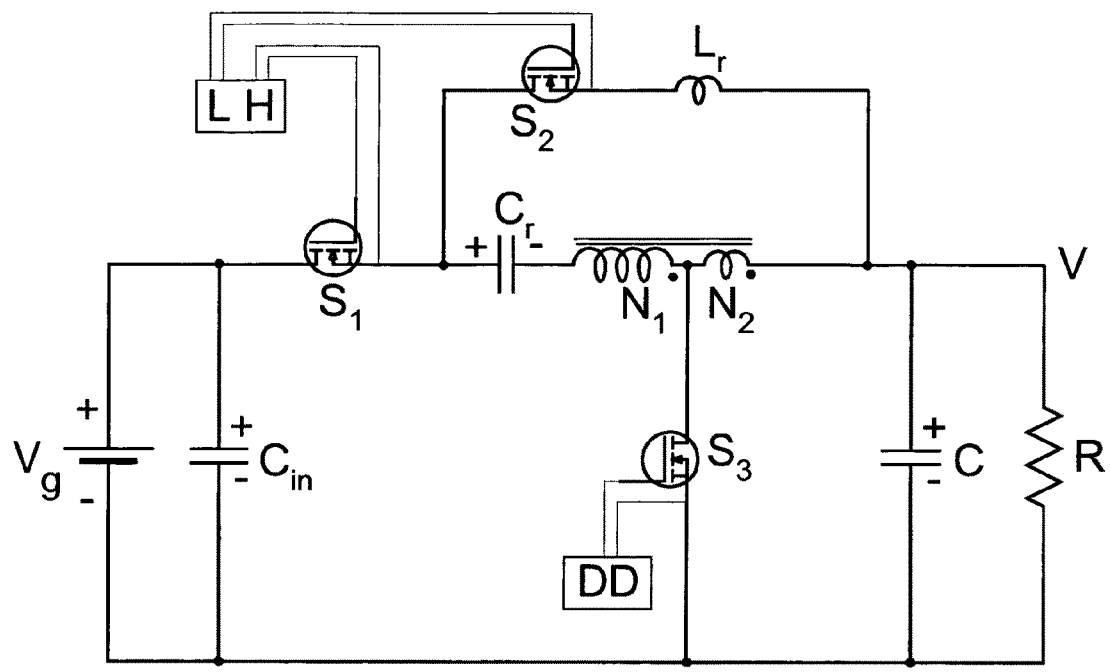
FIG. 38a illustrates the simplified schematic of the experimental prototype optimized for efficiency and FIG. 38b shows the state of the switches.
Figure 38B:
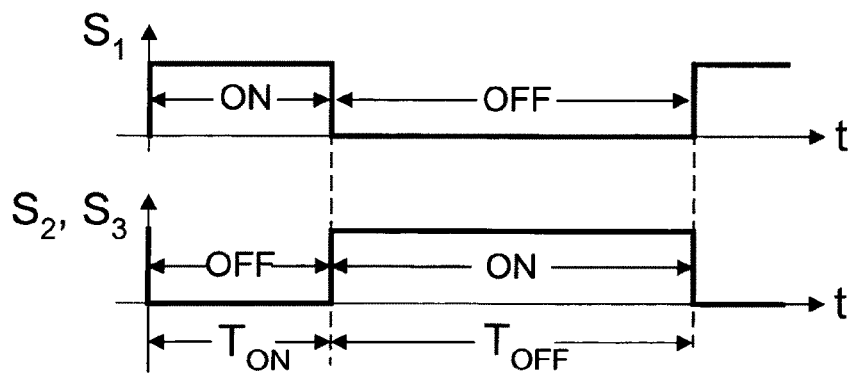

To demonstrate ultra high efficiency, the step-down converter with hybrid transformer and a resonant inductor was built with the power stage shown in schematics of FIG. 38a and with following specifications and component values:

Specifications: 48V to 1.5V, 52 W converter and 48V to 1V, 35 W converter

Figure 39A:
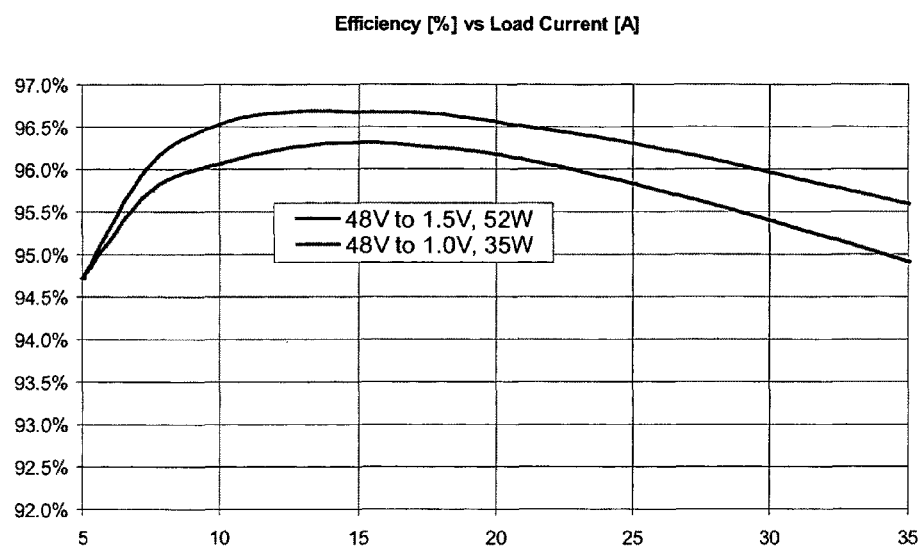
FIG. 39a shows the efficiency measurements for the converter of FIG. 38a and FIG. 39b shows the corresponding power loss measurements for two cases: 48V to 1V and 48V to 1.5V conversion.
Figure 39B:
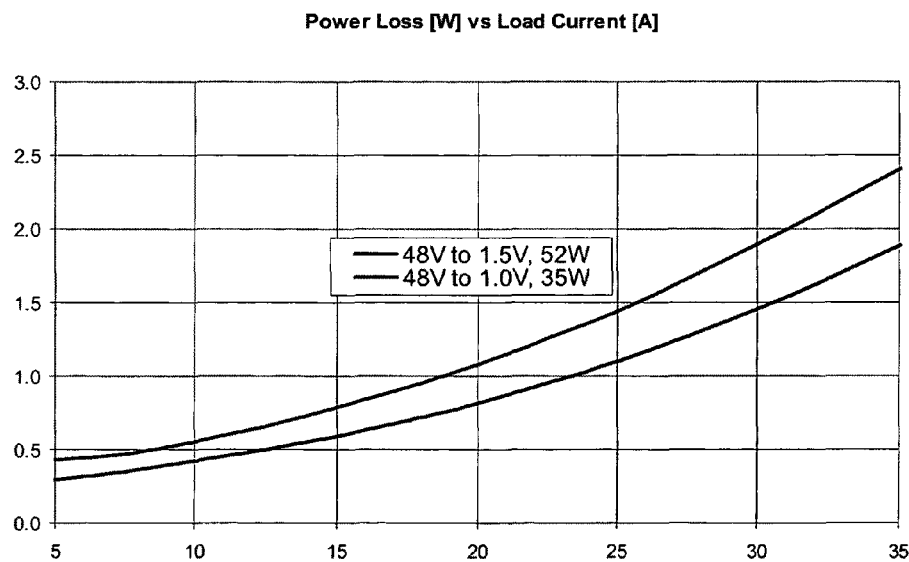

Components:

MOSFETS transistors:
$S_1$=IRFH5006; 60V; 4.1 mΩ
$S_2$=IRFH5006
$S_3$=3×IRFH55250; 25V; 1.2 mΩ
Input capacitor: 8×10 µF Output capacitor: 12×47 µg
Resonant capacitor: 3×2.2 µF
Resonant inductor: 2 µH (RM4 core)
Hybrid transformer: 9:1 turns ratio Ls: 0.65 µH (core cross-section 52 mm²)
Resonant and switching frequency: 50 kHz Graph of the efficiency and power loss as a function of the load current are shown in FIG. 39a and FIG. 39b for 48V to 1 and 48V to 1.5V conversion for load currents from 5 A to 3 A.

Prototype of a 12V to 1.5V and 1V Converter with 35 A Load

Figure 40A:
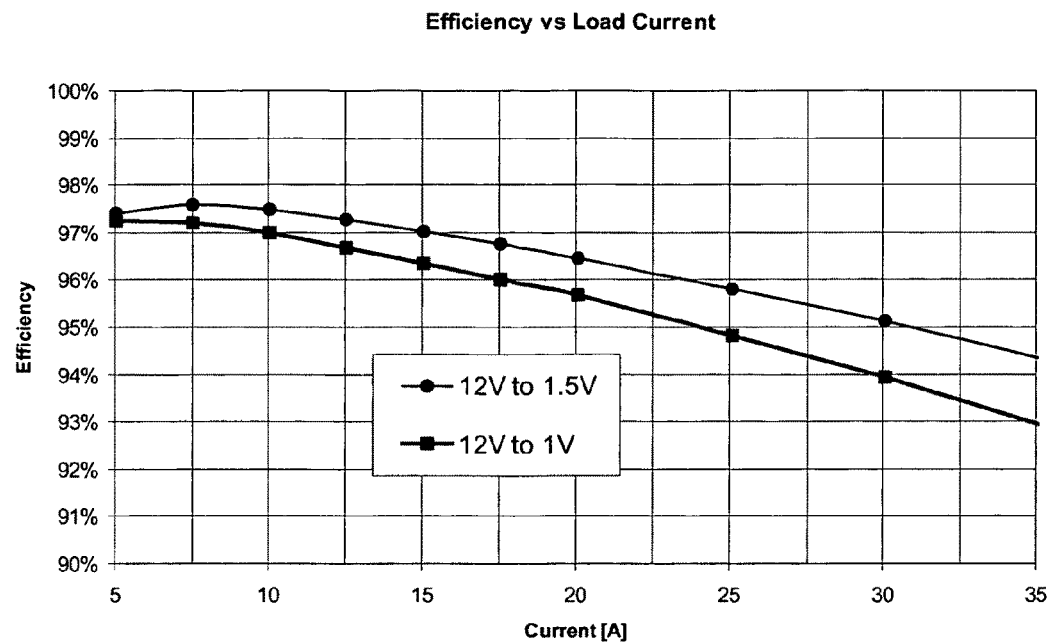
FIG. 40a shows the efficiency measurements for the converter of FIG. 38a and FIG. 40b shows the corresponding power loss measurements for two cases: 12V to 1V and 12V to 1.5V conversion.
Figure 40B:
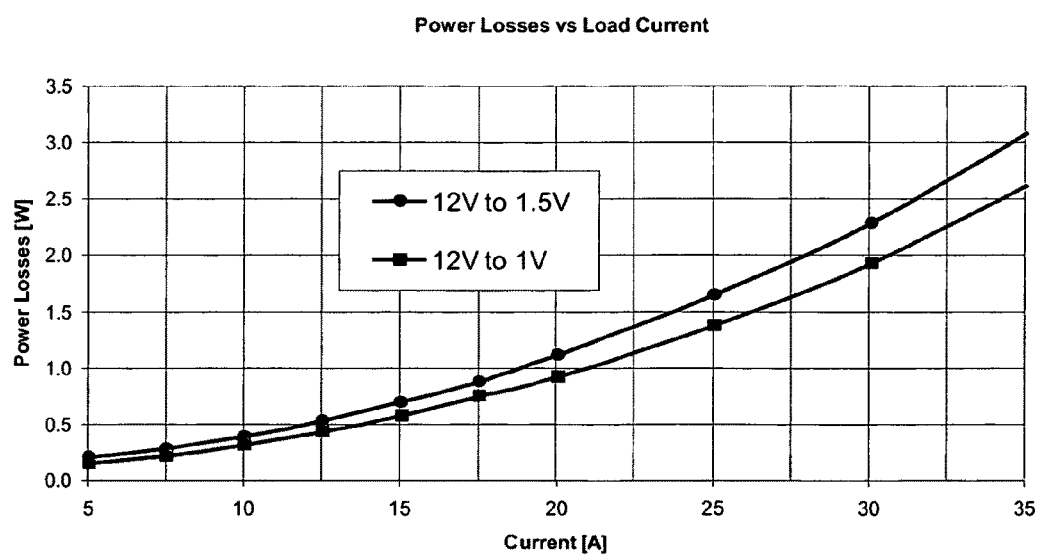

To verify ultra high efficiency of the converter for standard 12V input voltage and low output voltages, the step-down converter with hybrid transformer and a resonant inductor was built with the power stage shown in schematics of FIG. 38a and with following specifications and component values:
Specifications: 12V to 1.5V, 52 W converter and 12V to 1V, 35 W converter
Components:
MOSFETS transistors:
$S_1$=IRFH55250; 25V; 1.2 mΩ
$S_2$=3×IRFH55250; 25V; 1.2 mΩ
$S_3$=IRFH55250
Input capacitor: 8×10 µF
Output capacitor: 12×47 µg
Resonant capacitor: 3×2.2 µF
Resonant inductor: 1.2 µH (RM4 core)
Hybrid transformer: 5:1 turns ratio Ls: 0.65 µH (core cross-section 52 mm²)
Resonant and switching frequency: 50 kHz Graph of the efficiency and power loss as a function of the load current are shown in FIG. 40a and FIG. 40b for 12V to 1V and 12V to 1.5V conversion for load currents from 5 A to 35 A.

Efficiency Measurement of the Buck Converter

Figure 41A:
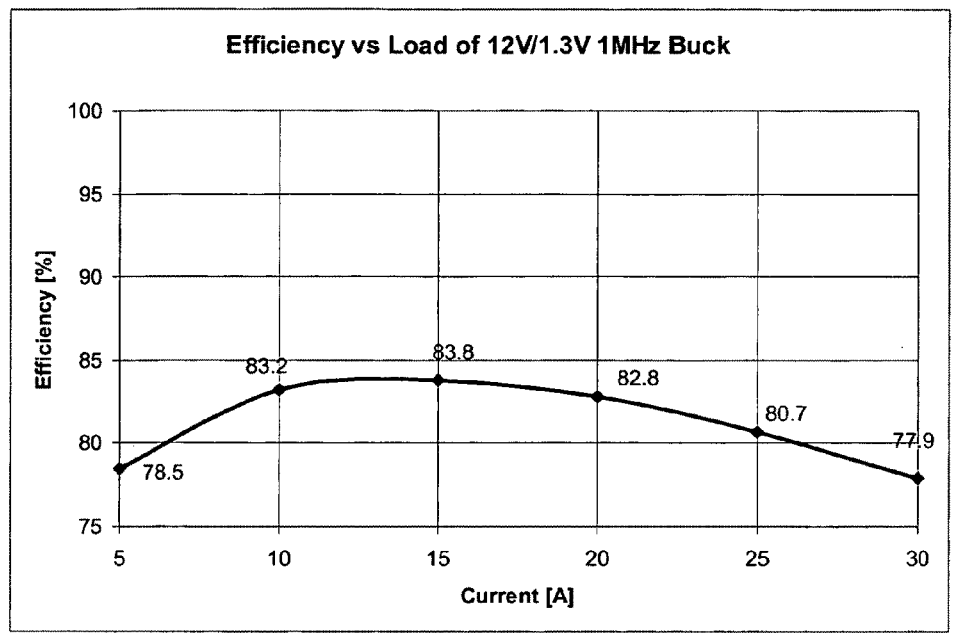
FIG. 41a shows the efficiency measurement for 12V to 1.3V, 30 A buck converter reported in (6)
Figure 41B:
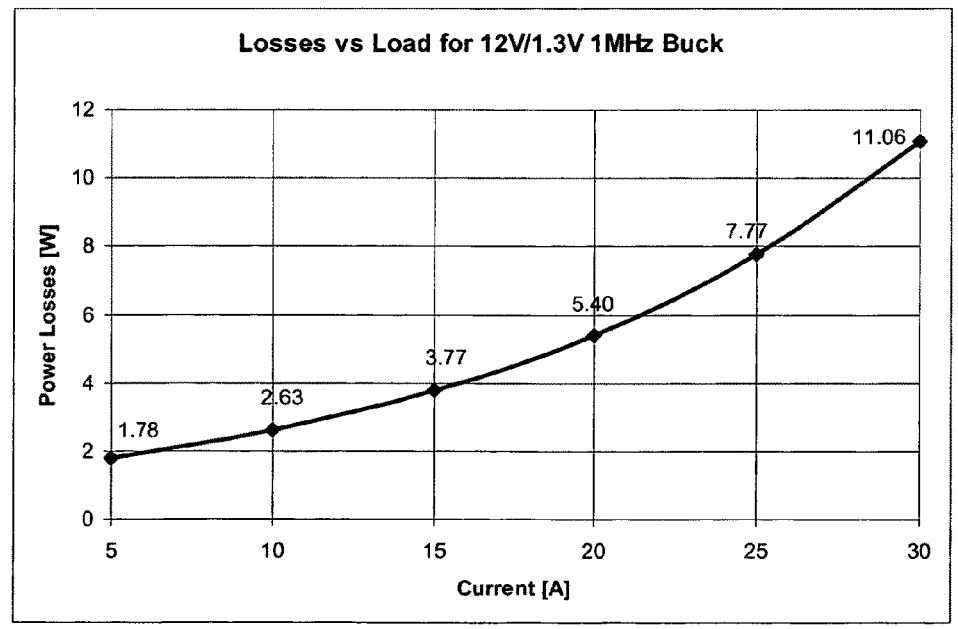
FIG. 41b shows the corresponding loss measurements.

It is now instructive to compare the obtained efficiency results on breadboard prototype of the present invention with the recently published data for the buck converter (6), which are repeated here and displayed in graphs of efficiency in FIG. 41a and graph of power loss in FIG. 41b. Note that at the 30 A load, the total loss is reduced from 11 W to 2.25 W or by a factor of four times.

Two-Phase Extension

The common method to reduce the output voltage ripple in the buck converter is to use a multi-phase buck converter with several buck converters (typically four phases) are operated in parallel but phase shifted by a quarter of period to result in reduced ripple current and reduced output ripple voltage.

Figure 42A:
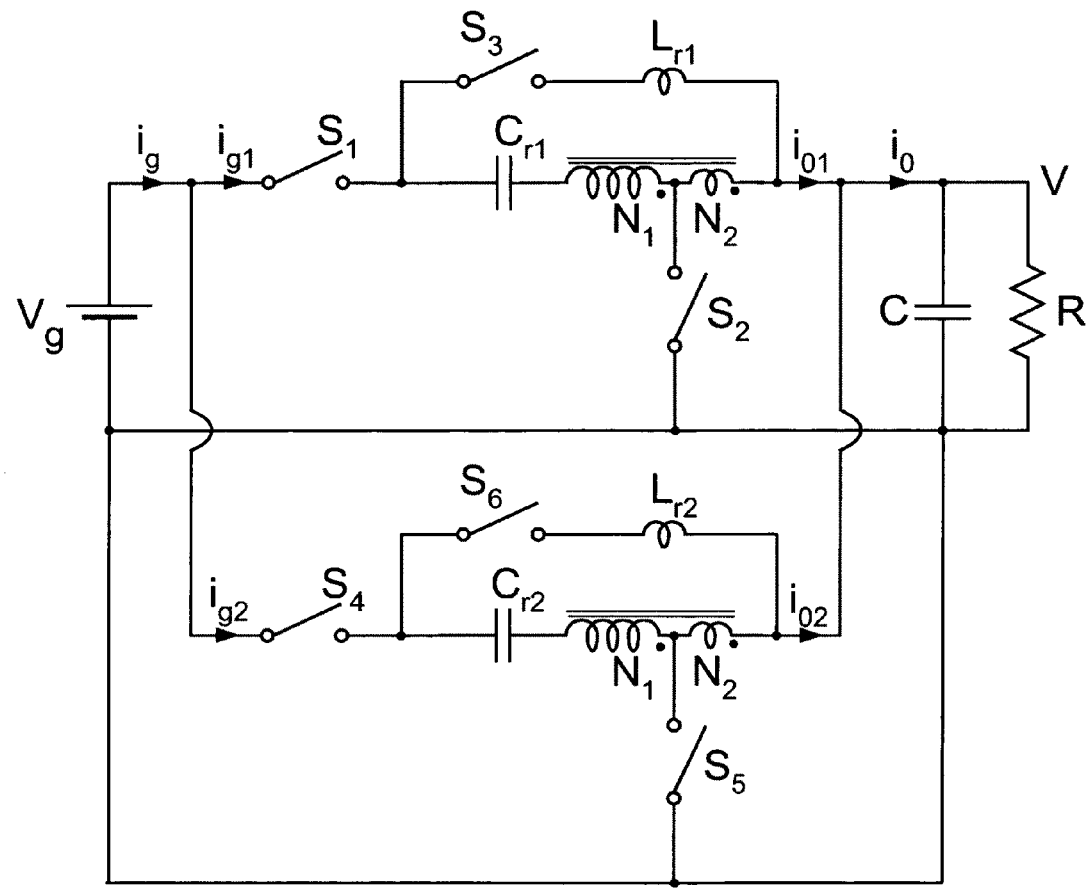
FIG. 42a shows the two-phase extension of the present invention in which two modules are operating at 50% duty ratio and in parallel but phase shifted for half a period in order to obtained the reduced output ripple voltage and FIG. 42b shows the respective diagram of the state of all the switches.
Figure 42B:
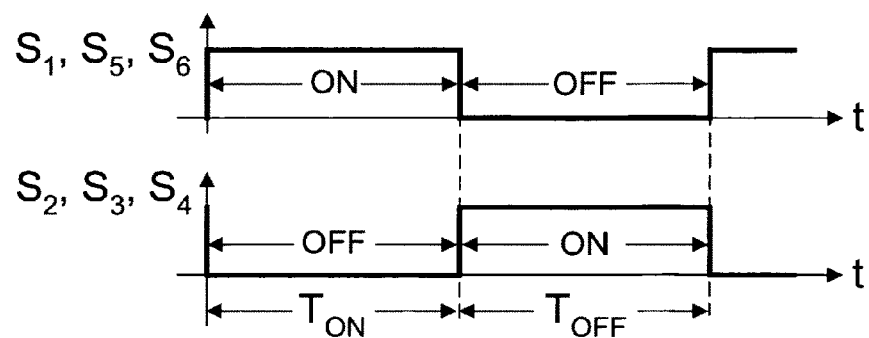
Figure 43A:
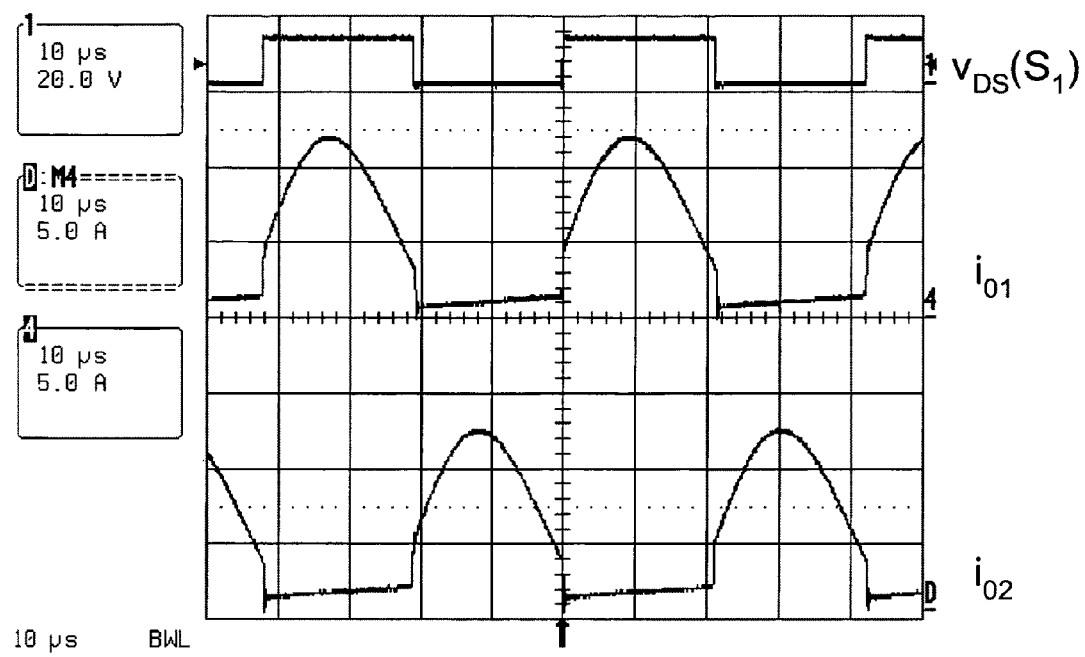
FIG. 43a shows the output current waveforms of the two modules in FIG. 42a with each module carrying a 5 A load current for a total of 10 A load current and operating from 24V input and n=4 hybrid transformer turns ratio which results in 2.35V output voltage
Figure 43B:
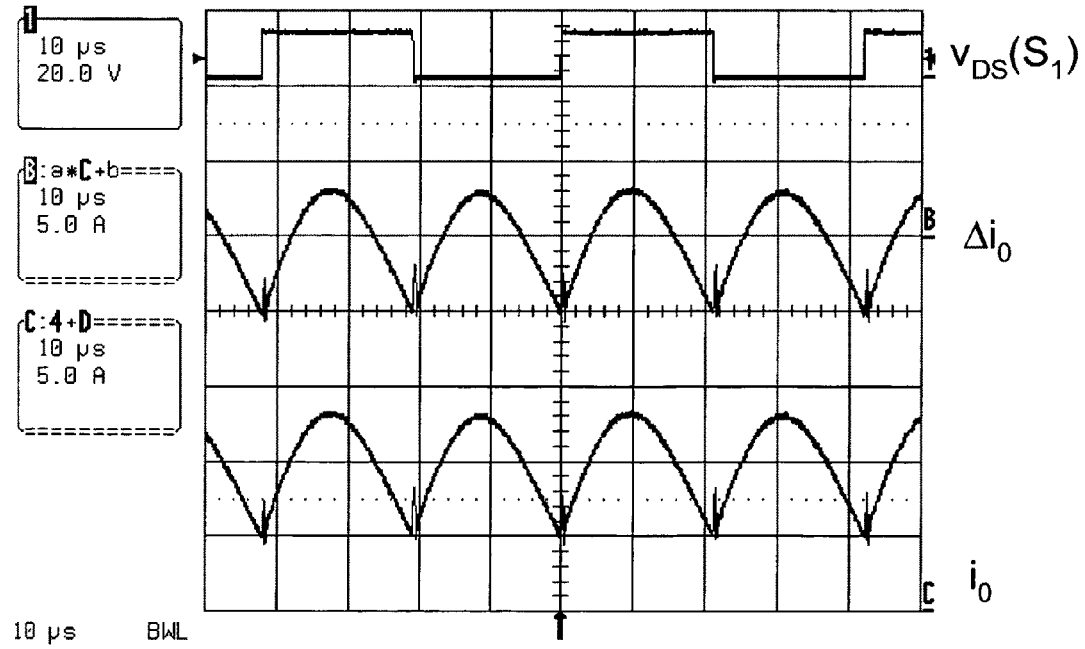
FIG. 43b shows the total output current waveform and output ripple current under the same conditions.

The same method could be also implemented to the present invention which shows two modules operated in parallel but shifted in phase for a half a switching period as illustrated in the Two-Phase Extension of FIG. 42a and with switch states as in FIG. 42b. The converters are operated at a 50% duty ratio and 5 A load current of each module and with n=4 hybrid transformer turns ratio to result in 2.35V output from 24V input voltage source. The output currents $i_{o1}$ and $i_{o2}$ of individual modules are displayed in FIG. 43a. Note, as expected, a 4 to 1 jump in each individual load current at the transition from ON-time to OFF-time interval. This jump in a current is eliminated from the total output current as seen in the current $i_o$ of the output displayed in FIG. 43a as the bottom trace. Also shown in FIG. 43b as the middle trace is the output ripple current $\Delta i_o$, which is measured to have 2.5 A rms current, compared to 10 A total DC load current. Therefore, in general four times lower rms current is obtained than 10 A DC load current delivered. Thus for practical implementations with 30 A load current at 1.5V output, the rms ripple current requirement needed is 7.5 A. The typical small size multiplayer chip capacitor with 47 µF has about 3 A rms current capability. Thus, only three such capacitors in parallel will satisfy ripple current requirements despite a large 30 A DC load current delivered. Furthermore the reduced ripple current magnitude is also being filtered out more effectively as the ripple current has the frequency equal to twice the switching frequency as seen in the output ripple current waveforms in FIG. 43b. Finally, the optimum switching frequency could be in the range of 100 kHz to 150 kHz where the multiplayer chip capacitors behave resistively and have their lowest ESR (Equivalent Series Resistance). After that frequency, the impedance of these chip capacitors stops being resistive and starts become inductive, which is not desirable for output voltage fast current transients as it results in additional voltage spikes and overshoots. The conclusion is that the Two-phase extension of the present invention is sufficient to provide the desirable high efficiency, low output voltage ripple and fast transient performance as there is no need to go to higher number of phase as in the buck converter increasing both cost and complexity.

CONCLUSION

A three-switch step-down converter with a resonant inductor, a resonant capacitor and a hybrid transformer provides efficiency, size, cost and other performance advantages over the conventional buck converter and tapped-inductor buck converter.

Unlike buck converter and tapped-inductor buck converters, which use only inductive energy transfer, the present invention employs the capacitive energy transfer in addition to inductive energy transfer. The hybrid transformer performs the double duty simultaneously: transfers the input inductive energy storage to the load through a taped-inductor turns ratio n but also serves as a hybrid transformer to transfer the resonant capacitor discharge current to the load during OFF-time interval amplified by hybrid transformer turns ratio m.

Despite the presence of the resonant inductor current during the OFF-time interval, the output voltage is neither dependent on resonant component values nor on the load current as in conventional resonant converters but dependent on duty ratio D and hybrid transformer turn ratio n. Hence a simple regulation of output voltage is achieved using duty ratio control only.

The dual inductive and capacitive energy storage and transfer together with lower voltage stresses on the switches results in increased efficiency and reduced size and cost compared to buck converter and tapped-inductor buck converters.

The present invention also introduces a new hybrid switching method, which implements for the first time a use of odd number of switches, such as three in this case, which is strictly excluded from use in conventional Square-wave, Resonant and Quasi-resonant switching converters, which all require an even number of switches (2, 4, 6 etc.), operating as complementary pairs.

REFERENCES

1. Slobodan Cuk, "*Modelling, Analysis and Design of Switching Converters*", PhD thesis, November 1976, California Institute of Technology, Pasadena, Calif., USA.
2. Slobodan Cuk, R. D. Middlebrook, "*Advances in Switched-Mode Power Conversion*", Vol. 1, II, and III, TESLAco 1981 and 1983.
3. Vatche Vorperian, "*Resonant Converters*", PhD thesis, California Institute of Technology, Pasadena, Calif., USA;

4. Steve Freeland, "A Unified Analysis of Converters with Resonant Switches; II Input-Current Shaping for Single-Phase AC-DC Power Converters" PhD thesis, Oct. 20, 1987, California Institute of Technology, Pasadena, Calif., USA;
5. Dragan Maksimovic, "*Synthesis of PWM and Quasi-Resonant DC-to-DC Power Converters*", PhD thesis, Jan. 12, 1989, California Institute of Technology, Pasadena, Calif., USA;
6. Zhiiliang Zhang, Eric Mayer, Yan-Fei Liu and Paresh C. Sen "*A 1 MHz, 12V ZVS Nonisolated Full-Bridge VRM With Gate Energy Recovery*", IEEE Transaction on Power Electronics, vol. 25, No. 3, March 2010.

What is claimed is:

1. A switching DC-to-DC converter for providing power from a DC voltage source connected between an input terminal and a common terminal to a DC load connected between an output terminal and said common terminal, said converter comprising:
   a first switch with one end connected to said input terminal;
   a second switch with one end connected to another end of said first switch;
   a current rectifier switch with anode end connected to said common terminal;
   a resonant inductor with one end connected to another end of said second switch and another end of said resonant inductor connected to said output terminal;
   a resonant capacitor with one end connected to said another end of said first switch;
   a first winding of a hybrid transformer with an unmarked end connected to another end of said resonant capacitor and a dot-marked end connected to cathode end of said current rectifier switch;
   a second winding of said hybrid transformer with an unmarked end connected to said dot-marked end of said first winding, and a dot-marked end of said second winding connected to said output terminal;
   switching means for keeping said first switch ON and said second switch and said current rectifier switch OFF during $T_{ON}$ time interval, and keeping said first switch OFF and said second switch and said current rectifier switch ON during $T_{OFF}$ time interval, where said $T_{ON}$ time interval and said $T_{OFF}$ time interval are complementary time intervals within one switch operating cycle $T_S$;
   wherein said resonant inductor and said resonant capacitor form a resonant circuit during said $T_{OFF}$ time interval with a resonant current flowing through said first winding into said DC load;
   wherein a first turns ratio n of said hybrid transformer is a total number of turns of both said first winding and said second winding divided by a number of turns of said second winding of said transformer,
   wherein an input current during said $T_{ON}$ time interval stores an inductive energy in said first and said second winding and during said $T_{OFF}$ time interval said stored inductive energy is transferred to said DC load through said second winding by n times higher current than said input current,
   wherein a second turns ratio m of said hybrid transformer is the ratio between number of turns of said first winding and said second winding,
   wherein said resonant current in said first winding is amplified by said second turns ratio m of said hybrid transformer and sent to said DC load through said second winding of said transformer,
   wherein a duty ratio D is ratio between said $T_{ON}$ time interval and said switching operating cycle $T_S$, and
   wherein a DC-to-DC voltage step-down conversion ratio of said converter depends on said duty ratio D and said first turns ratio n of said hybrid transformer.

2. A converter as defined in claim 1,
   wherein said first switch and said second switch are semiconductor bipolar transistors;
   wherein said switching means include precise electronically controlling operation of said first switch relative to said second switch, whereby two transition intervals, a first transition interval and a second transition interval are created during which said first switch and said second switch are turned OFF, and
   whereby said first and said second transition intervals are adjusted to minimize switching losses of said first switch and said second switch.

3. A converter as defined in claim 2,
   wherein said first switch and said second switch are semiconductor MOSFET transistors, and
   whereby said first switch and said second switch have substantially reduced conduction losses.

4. A converter as defined in claim 3,
   wherein said current rectifier switch is a semiconductor MOSFET transistor,
   wherein said switching means keep said semiconductor MOSFET transistor ON during said $T_{OFF}$ time interval and OFF during said $T_{ON}$ time interval, and
   whereby said semiconductor MOSFET transistor has substantially reduced conduction losses.

5. A converter as defined in claim 1,
   wherein an additional converter, same as said converter in claim 1, is connected in parallel to said converter in claim 1;
   wherein both said converters operate at equal duty ratios of D=0.5;
   wherein said additional converter operates out of phase with said converter of claim 1 so that when said first switch is turned ON, a first switch of said additional converter is turned OFF, and
   whereby voltage at said DC load has substantially reduced ripple voltage.

6. A converter as defined in claim 1,
   wherein said unmarked end of said second winding is connected to said unmarked end of said first winding of said transformer, and said dot-marked end of said second winding is connected to said cathode end of said current rectifier switch;
   wherein said dot-marked end of said first winding of said hybrid transformer is connected to said output terminal,
   wherein a DC-to-DC voltage step-down conversion ratio of said converter depends on said duty ratio D and said second turns ratio m between said first winding and said second winding of said hybrid transformer.

7. A converter as defined in claim 6,
   wherein said unmarked end of said second winding of said hybrid transformer is connected to said cathode end of said current rectifier switch and said dot-marked end of said second winding of said hybrid transformer is connected to said output terminal;
   wherein a DC-to-DC voltage step-down conversion ratio of said converter depends on said duty ratio D and said second turns ratio m between said first winding and said second winding of said hybrid transformer.

8. A switching DC-to-DC converter for providing power from a DC voltage source connected between an input terminal and a common terminal to a DC load connected between an output terminal and said common terminal, said converter comprising:

a first switch with one end connected to said input terminal;
a second switch with one end connected to another end of said first switch;
a current rectifier switch with anode end connected to said common terminal;
a resonant inductor with one end connected to another end of said second switch and another end of said resonant inductor connected to cathode end of the said rectifier switch;
a resonant capacitor with one end connected to said another end of said first switch;
a first winding of a hybrid transformer with an unmarked end connected to another end of said resonant capacitor and a dot-marked end connected to said cathode end of said current rectifier switch;
a second winding of said hybrid transformer with an unmarked end connected to said dot-marked end of said first winding, and a dot-marked end of said second winding connected to said output terminal;
switching means for keeping said first switch ON and said second switch and said current rectifier switch OFF during $T_{ON}$ time interval, and keeping said first switch OFF and said second switch and said current rectifier switch ON during $T_{OFF}$ time interval, where said $T_{ON}$ time interval and said $T_{OFF}$ time interval are complementary time intervals within one switch operating cycle $T_S$;
wherein said resonant inductor and said resonant capacitor form a resonant circuit during said $T_{OFF}$ time interval with a resonant current flowing through said first winding of said hybrid transformer;
wherein a first turns ratio n of said hybrid transformer is a total number of turns of both said first winding and said second winding divided by a number of turns of said second winding of said hybrid transformer,
wherein an input current during said $T_{ON}$ time interval stores an inductive energy in said first and said second winding and during said $T_{OFF}$ time interval said stored inductive energy is transferred to said DC load through said second winding by n times higher current than said input current,
wherein a second turns ratio m of said hybrid transformer is the ratio between number of turns of said first winding and said second winding,
wherein said resonant current in the said first winding is amplified by the said second turns ratio m of said hybrid transformer and sent to said DC load through said second winding of said transformer,
wherein a duty ratio D is ratio between said $T_{ON}$ time interval and said switching operating cycle $T_S$, and
wherein a DC-to-DC voltage step-down conversion ratio of said converter depends on said duty ratio D and said first turns ratio n of said hybrid transformer.

9. A converter as defined in claim 8,
wherein said first switch and said second switch are semiconductor bipolar transistors;
wherein said switching means include precise electronically controlling operation of said first switch relative to said second switch, whereby two transition intervals, a first transition interval and a second transition interval are created during which said first switch and said second switch are turned OFF, and
whereby said first and said second transition intervals are adjusted to minimize switching losses of said first switch and said second switch.

10. A converter as defined in claim 9,
wherein said first switch and said second switch are semiconductor MOSFET transistors, and
whereby said first switch and said second switch have substantially reduced conduction losses.

11. A converter as defined in claim 10,
wherein said current rectifier switch is a semiconductor MOSFET transistor,
wherein said switching means keep said semiconductor MOSFET transistor ON during said $T_{OFF}$ time interval and OFF during said $T_{ON}$ time interval, and
whereby said semiconductor MOSFET transistor has substantially reduced conduction losses.

12. A converter as defined in claim 8,
wherein an additional converter, same as said converter in claim 8, is connected in parallel to said converter in claim 8;
wherein both said converters operate at equal duty ratios of D=0.5;
wherein said additional converter operates out of phase with said converter of claim 8 so that when said first switch is turned ON, a first switch of said additional converter is turned OFF, and
whereby voltage at said DC load has substantially reduced ripple voltage.

13. A converter as defined in claim 8,
wherein said unmarked end of said second winding is connected to said unmarked end of said first winding of said transformer, and said dot-marked end of said second winding is connected to said cathode end of said current rectifier switch;
wherein said dot-marked end of said first winding of said hybrid transformer is connected to said output terminal,
wherein a DC-to-DC voltage step-down conversion ratio of said converter depends on said duty ratio D and said second turns ratio m between said first winding and said second winding of said hybrid transformer.

14. A converter as defined in claim 13,
wherein said unmarked end of said second winding of said hybrid transformer is connected to said cathode end of said current rectifier switch and said dot-marked end of said second winding of said hybrid transformer is connected to said output terminal;
wherein a DC-to-DC voltage step-down conversion ratio of said converter depends on said duty ratio D and said second turns ratio m between said first winding and said second winding of said hybrid transformer.

15. A converter as defined in claim 8,
wherein said another end of said resonant inductor is connected to said common terminal.

16. A hybrid switching method for non-isolated large step-down DC-to-DC power conversion comprising:
providing a main controllable three-terminal switch conducting and supplying current to a DC load during an ON-time interval $T_{ON}$ and non-conducting during an OFF-time interval $T_{OFF}$ within a switching time period $T_S$ where D is a controllable duty ratio;
providing a complementary controllable three-terminal switch and a two-terminal current rectifier switch conducting and supplying current to said DC load during said OFF-time interval $T_{OFF}$ and non-conducting during said ON-time interval $T_{ON}$;
providing first and second winding of a hybrid transformer operating and being flux-balanced during the entire said switching time period $T_S$;

providing said hybrid transformer with a first turns ratio n being a ratio of the sum of said first and second winding turns divided by said second winding turns, providing said hybrid transformer with a second turns ratio m being a ratio between said first winding turns and said second winding turns, providing a resonant inductor operating and being flux-balanced during said OFF-time interval $T_{OFF}$;

providing said first and said second winding of said hybrid transformer store an inductive energy during said ON-time interval $T_{ON}$ and release said inductive energy through said second winding and said two-terminal current rectifier switch to said DC load during said OFF-time interval $T_{OFF}$;

providing a resonant capacitor which stores a capacitive energy during said ON-time interval $T_{ON}$ and releases said capacitive energy during said OFF-time interval $T_{OFF}$ by both a resonant current directly to said DC load through said first winding and by an amplified resonant current in said second winding by said turns ratio m of said hybrid transformer to said DC load;

providing said resonant inductor and said resonant capacitor form a resonant circuit during said OFF-time interval $T_{OFF}$ having a constant resonant period two times longer than said OFF-time interval $T_{OFF}$;

wherein a duty ratio D is ratio between said $T_{ON}$ time interval and said switching operating cycle $T_S$, and wherein a DC-to-DC voltage step-down conversion ratio of said converter depends on said duty ratio D and said first turns ratio n of said hybrid transformer, controlling said duty ratio D at constant switching frequency to regulate output DC voltage against input voltage and/or load current changes.

17. A hybrid switching method for non-isolated large step-down DC-to-DC power conversion as in claim 16 wherein a switching frequency is controlled to keep said OFF-time period constant and thereby improve efficiency.

18. A hybrid switching method for non-isolated large step-down DC-to-DC power conversion as defined in claim 16 wherein said main and said complementary controllable three-terminal switches are MOSFET transistors.

19. A hybrid switching method for non-isolated large step-down DC-to-DC power conversion as defined in claim 18 wherein said two-terminal current rectifier switch is replaced with a MOSFET transistor being turned ON and OFF as a synchronous rectifier to reduce conduction losses.

20. A hybrid switching method for non-isolated large step-down DC-to-DC power conversion as defined in claim 16 wherein two equal converters operate in parallel and out-of-phase at the same duty ratio D=0.5 providing substantially reduced voltage ripple at said output DC load.

* * * * *